(12) United States Patent
Futa et al.

(10) Patent No.: US 7,702,109 B2
(45) Date of Patent: Apr. 20, 2010

(54) CONTENT RECORDING/REPRODUCING SYSTEM, DISTRIBUTION DEVICE, REPRODUCING DEVICE, AND RECORDING DEVICE

(75) Inventors: Yuichi Futa, Osaka (JP); Masato Yamamichi, Ota (JP); Masami Yamamichi, legal representative, Ota (JP); Satomi Yamamichi, legal representative, Ota (JP); Keiko Yamamichi, legal representative, Maebashi (JP); Motoji Ohmori, Hirakata (JP); Masaya Yamamoto, Arcadia, CA (US); Makoto Tatebayashi, Takarazuka (JP)

(73) Assignee: Panasonic Corporation, Osaka (JP)

( * ) Notice: Subject to any disclaimer, the term of this patent is extended or adjusted under 35 U.S.C. 154(b) by 439 days.

(21) Appl. No.: 10/548,265

(22) PCT Filed: Mar. 11, 2004

(86) PCT No.: PCT/JP2004/003201

§ 371 (c)(1),
(2), (4) Date: Oct. 25, 2006

(87) PCT Pub. No.: WO2004/082207

PCT Pub. Date: Sep. 23, 2004

(65) Prior Publication Data

US 2007/0094505 A1    Apr. 26, 2007

(30) Foreign Application Priority Data

Mar. 11, 2003    (JP) ............................ 2003-065590

(51) Int. Cl.
*H04L 9/00* (2006.01)

(52) U.S. Cl. ............................ 380/277; 380/1; 380/44; 380/201; 380/203; 380/229; 380/271; 380/281; 380/284; 705/51; 705/57; 713/172; 713/176; 713/178; 713/189; 713/193; 726/1; 726/22; 726/27; 726/33

(58) Field of Classification Search .................. 713/176
See application file for complete search history.

(56) References Cited

U.S. PATENT DOCUMENTS 5,625,725 A    4/1997    Nakano et al.

(Continued)

FOREIGN PATENT DOCUMENTS

JP    2000-76141    3/2000

(Continued)

*Primary Examiner*—William R Korzuch
*Assistant Examiner*—Bryan Wright
(74) *Attorney, Agent, or Firm*—Wenderoth, Lind & Ponack, L.L.P.

(57) ABSTRACT

A content recording/reproducing system, which records and reproduces a sub-content relating to a main content, includes a distribution device, first and second recording media, a recording device and a reproducing device. The first recording medium that is non-rewritable prestores key data based on which a public key is derivable, and the main content. The distribution device outputs verification information that includes the sub-content and is generated by applying a digital signature to relative information relating to the sub-content based on a secret key corresponding to the public key. The recording device acquires and records the verification information on the second recording medium that is rewritable. The reproducing device acquires the key data from the first recording medium and the verification information from the second recording medium, derives the public key from the key data, verifies the verification information using the public key, and reproduces the sub-content if the verification succeeds.

41 Claims, 30 Drawing Sheets

U.S. PATENT DOCUMENTS

| | | |
|---|---|---|
| 6,574,609 B1 * | 6/2003 | Downs et al. .................. 705/50 |
| 6,782,190 B1 | 8/2004 | Morito |
| 7,426,494 B2 * | 9/2008 | Ohmori et al. ................. 705/51 |
| 2002/0066025 A1 | 5/2002 | Sato et al. |
| 2003/0051237 A1 | 3/2003 | Sako et al. |
| 2004/0039911 A1 * | 2/2004 | Oka et al. ................... 713/175 |

FOREIGN PATENT DOCUMENTS

| | | |
|---|---|---|
| JP | 2002-109826 | 4/2002 |
| JP | 2002-116976 | 4/2002 |
| JP | 2002-189481 | 7/2002 |

* cited by examiner

FIG. 2
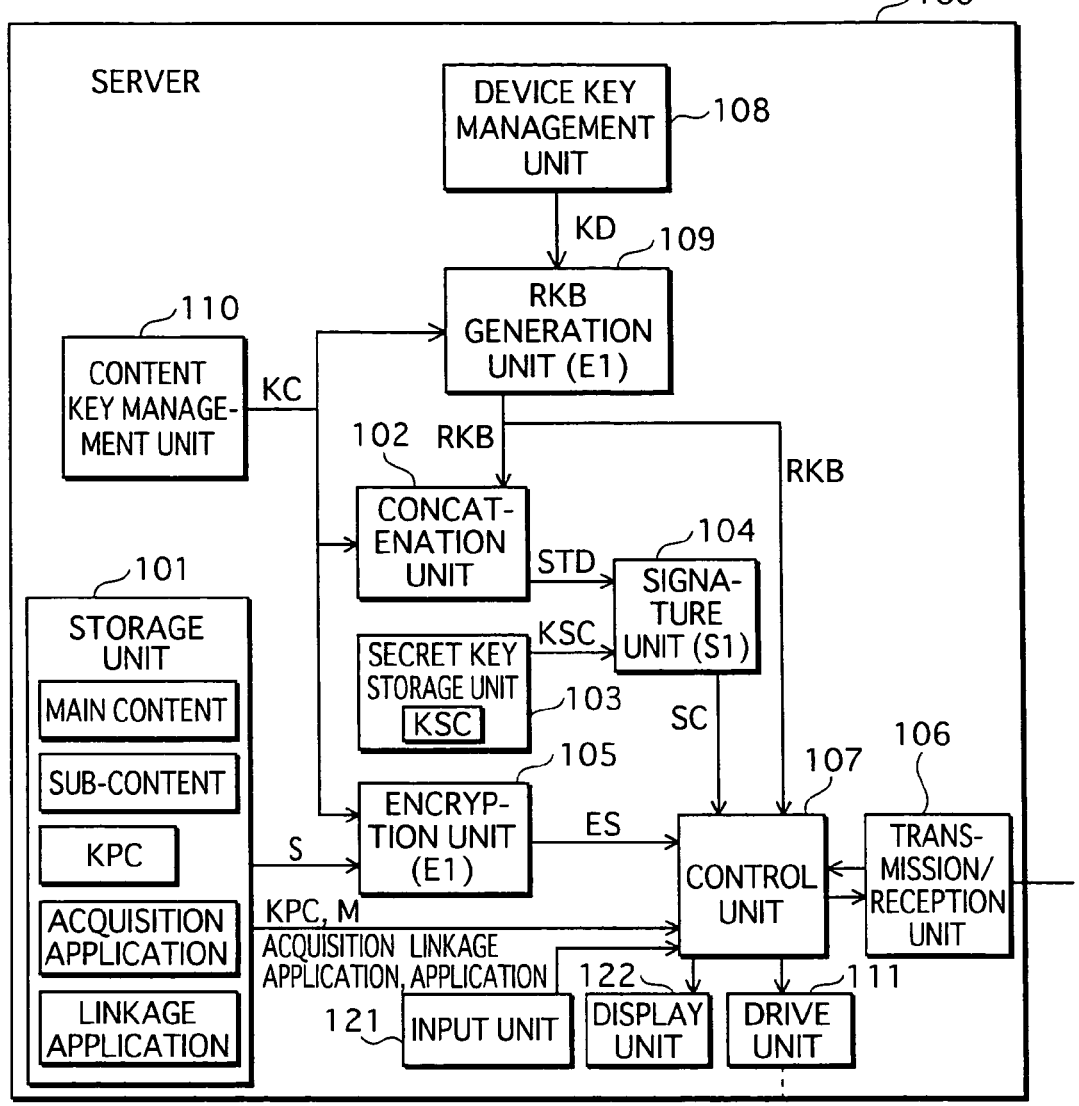
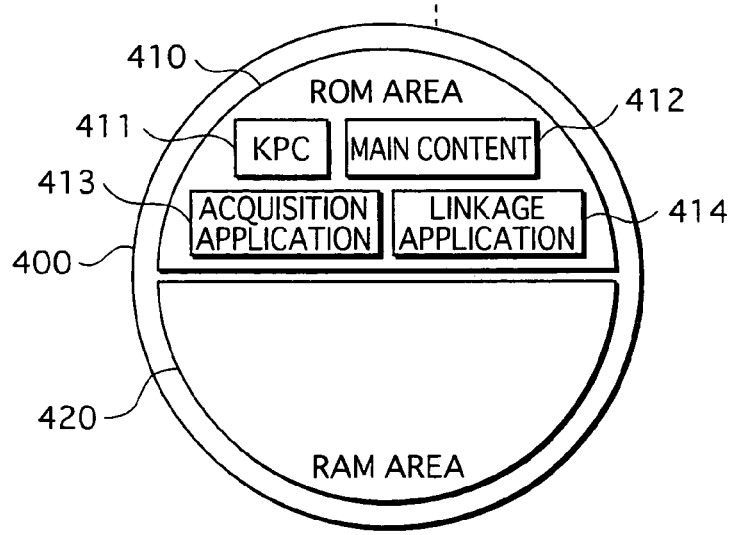

FIG. 3
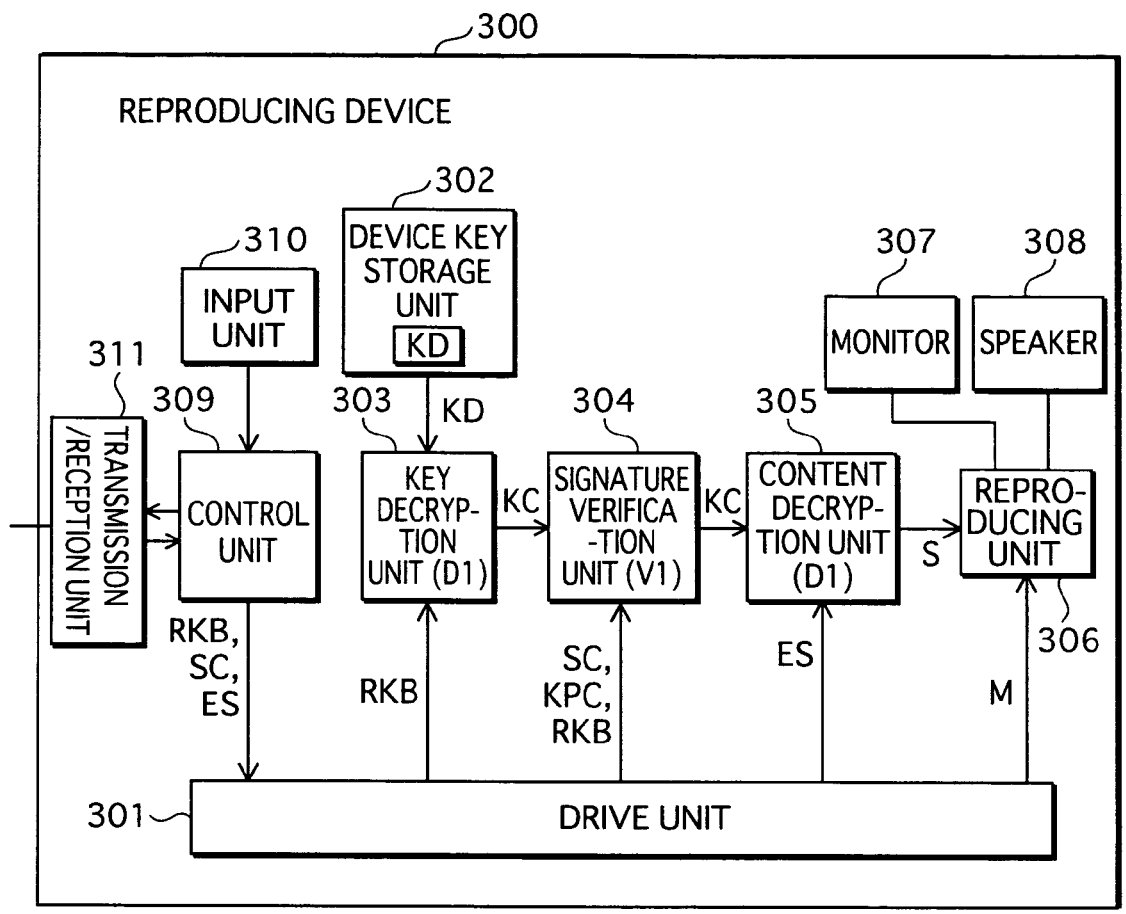
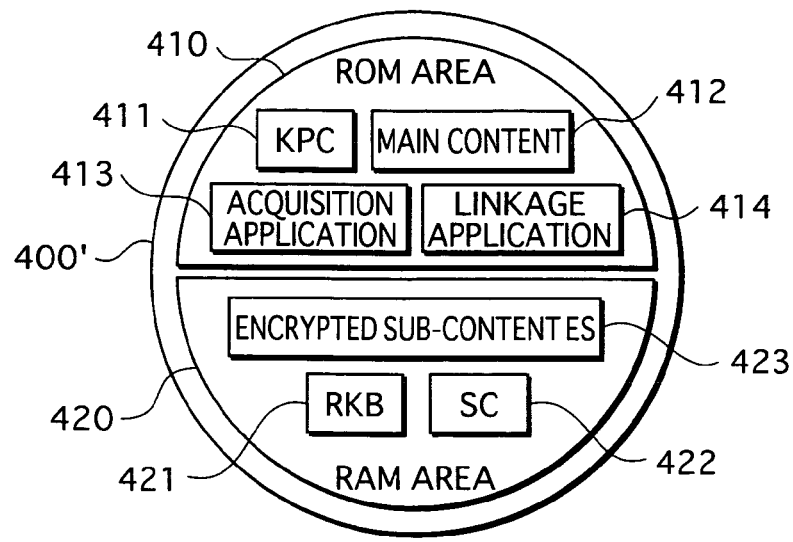

FIG. 6
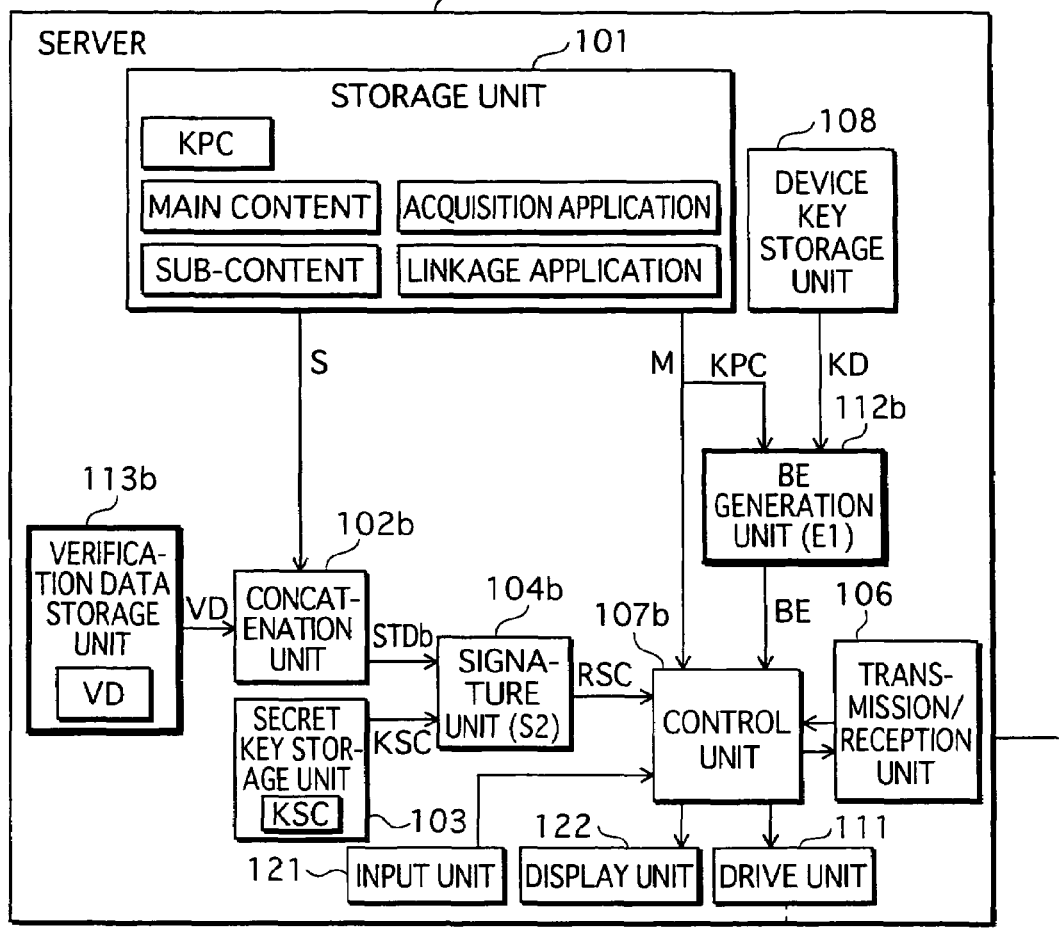
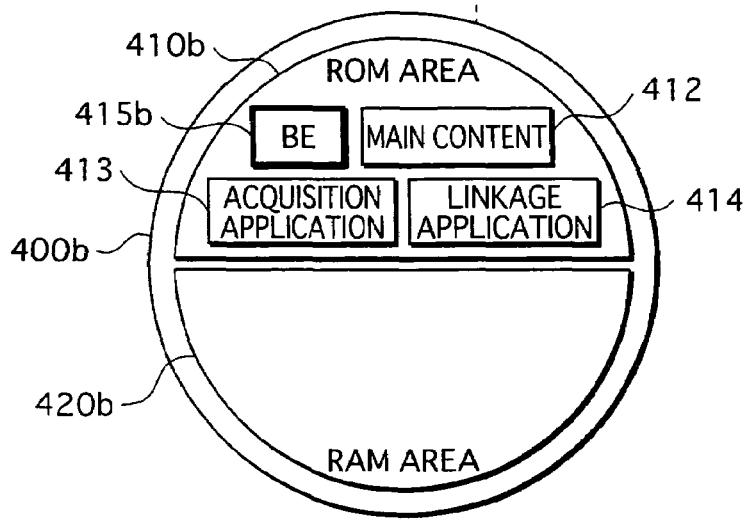

FIG. 7
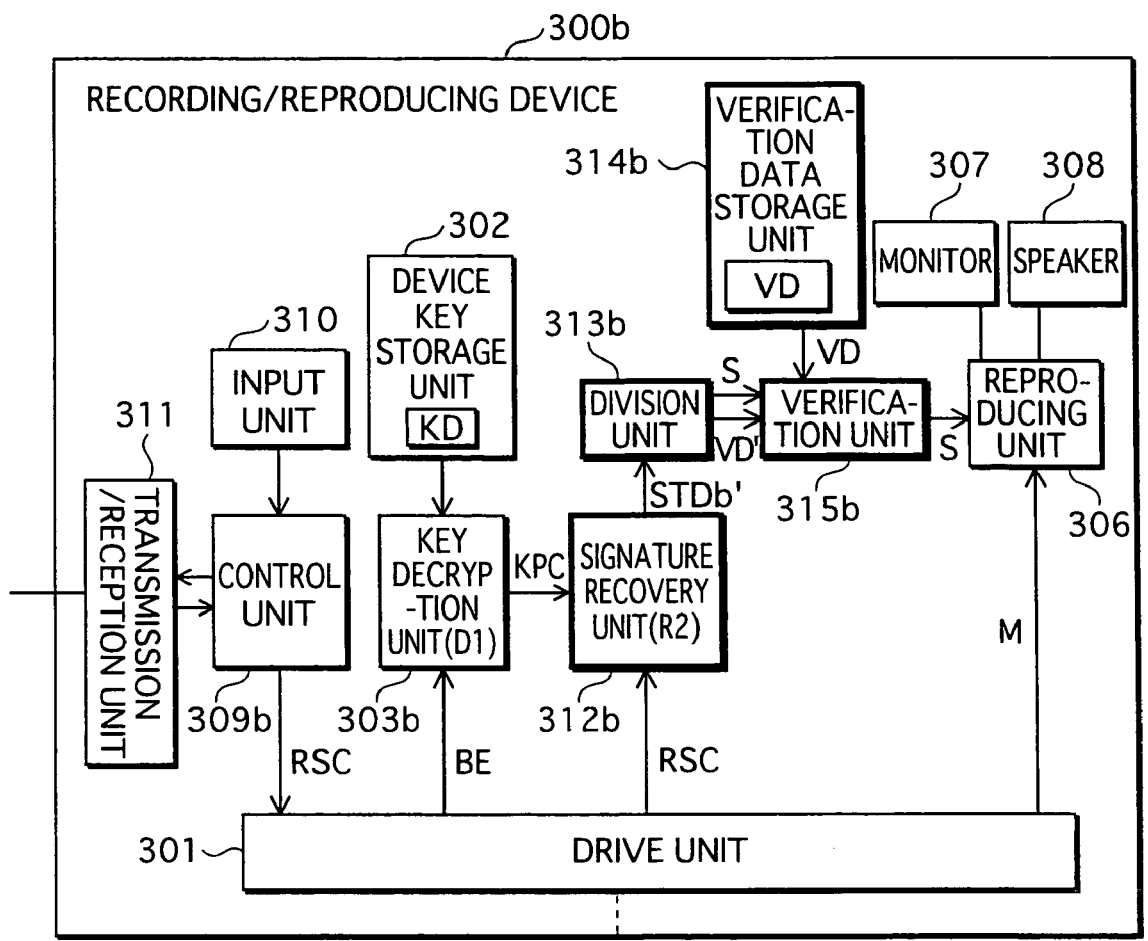
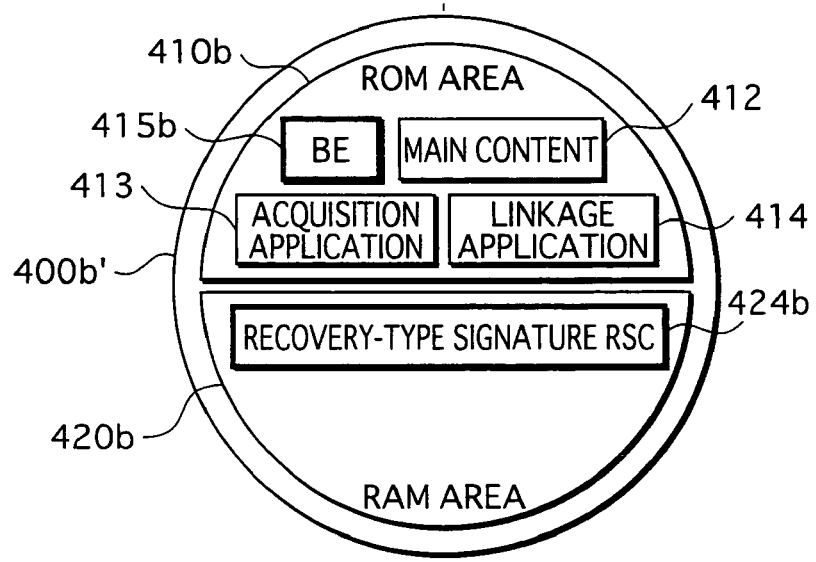

FIG.12
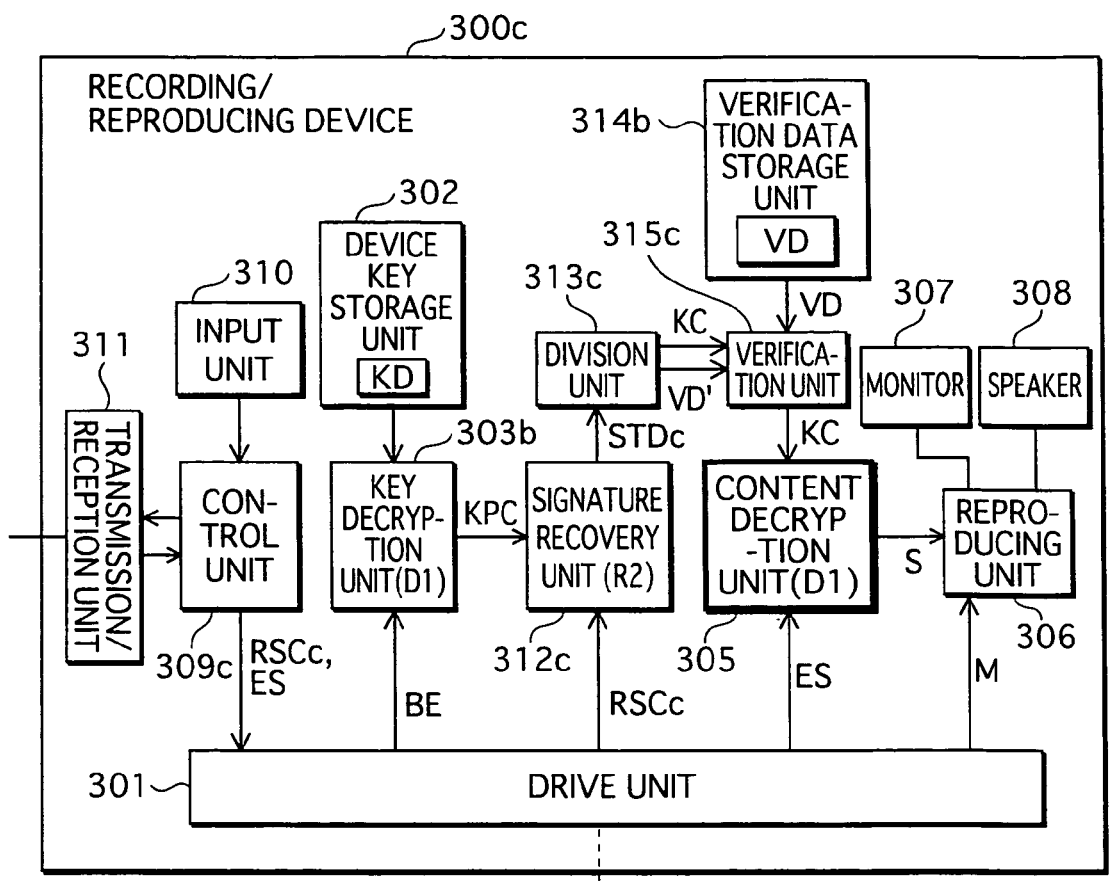
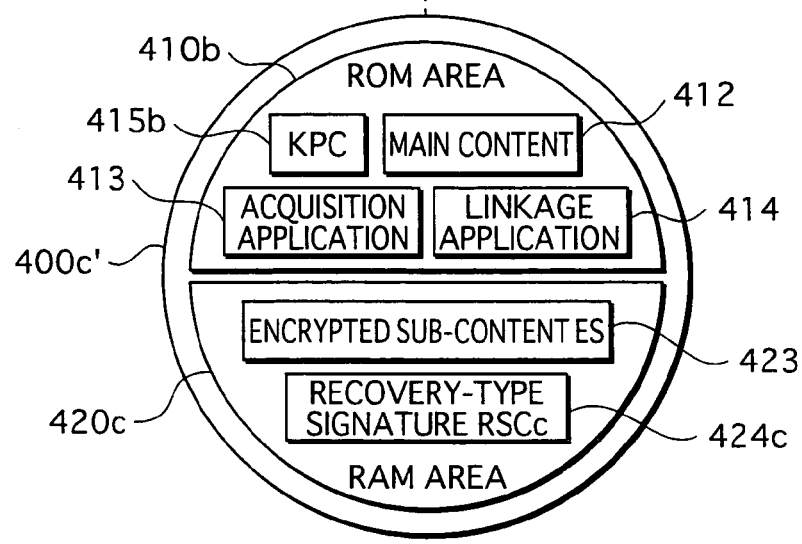

FIG.16A

| MAIN CONTENT | GENRE |
|---|---|
| MOVIE A | 01 ACTION |
| MOVIE B | 02 COMEDY |
| MOVIE C | 02 COMEDY |
| ⋮ | ⋮ |

FIG.16B

| GENRE | SUB-CONTENT |
|---|---|
| 01 ACTION | ADVERTISEMENT α |
| 02 COMEDY | ADVERTISEMENT β |
| ⋮ | ⋮ |

FIG.18

| SUB-CONTENT | | |
|---|---|---|
| DISTRIBUTOR ID | NCRYPTED SUB-CONTENT WITH SIGNATURE | Ver. NO. |
| ABCD | | 01 |
| EFGH | | 03 |
| ⋮ | ⋮ | ⋮ |

FIG.19

| DISTRIBUTOR ID = RKB OF XXXX | |
|---|---|
| | |
| | |

| DISTRIBUTOR ID = RKB OF EFGH | |
|---|---|

| DISTRIBUTOR ID = RKB OF ABCD | |
|---|---|
| Ver. NO. | RKB |
| 1 | ○○○○ |
| 2 | ×××× |
| ⋮ | ⋮ |

FIG.24A

| CONTENT ID | MAIN CONTENT |
|---|---|
| IJKL | MOVIE A |
| MNOP | MOVIE B |
| ⋮ | ⋮ |

FIG.24B

| CONTENT ID | SUB-CONTENT |
|---|---|
| IJKL | SUBTITLE DATA $\gamma$ |
| MNOP | SUBTITLE DATA $\delta$ |
| ⋮ | ⋮ |

FIG.25

| CONTENT ID | EXCLUSIVE CONTENT KEY |
|---|---|
| IJKL | ○○○○○○○ |
| MNOP | △△△△△△△ |
| ⋮ | ⋮ |

FIG.26
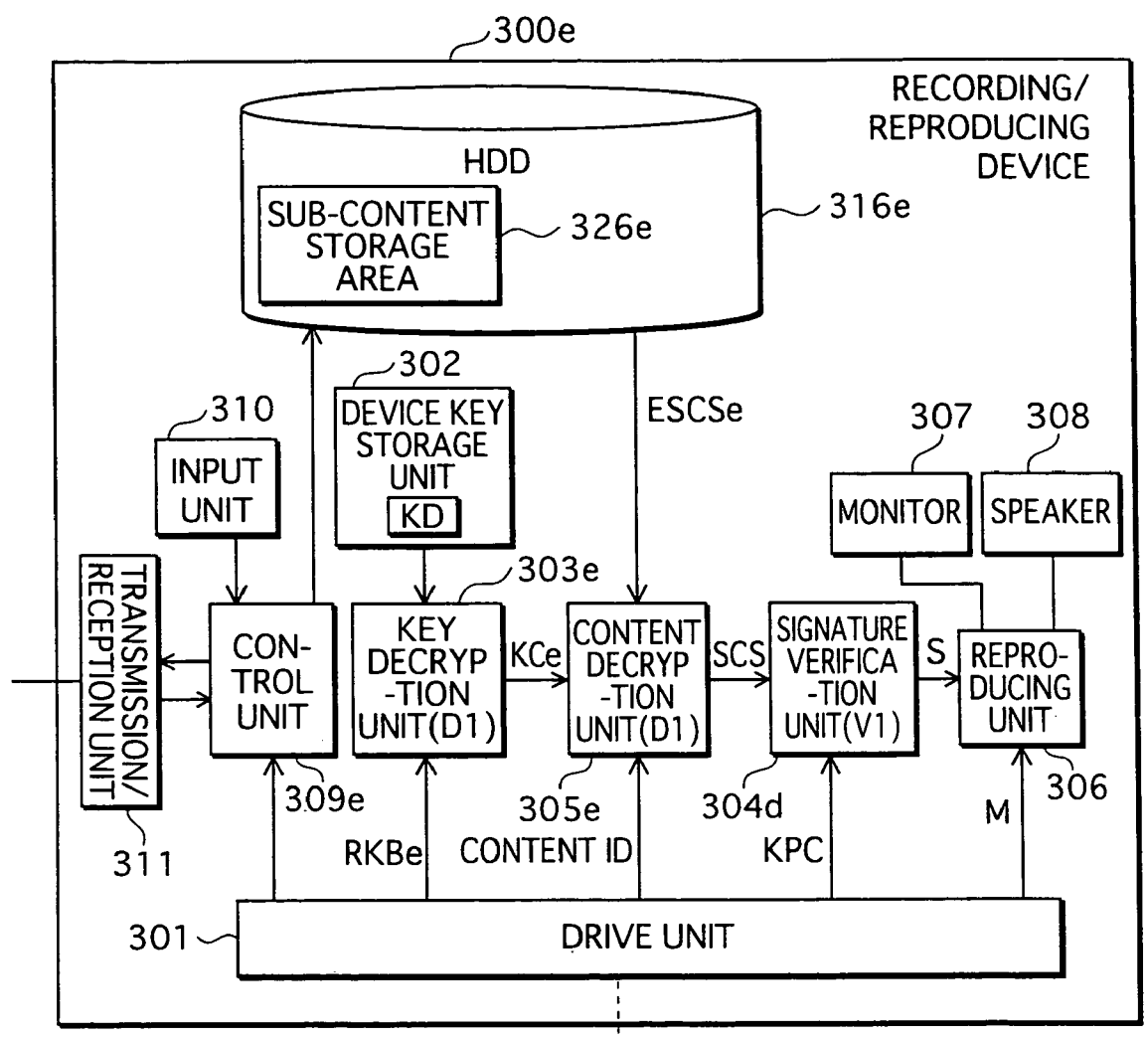
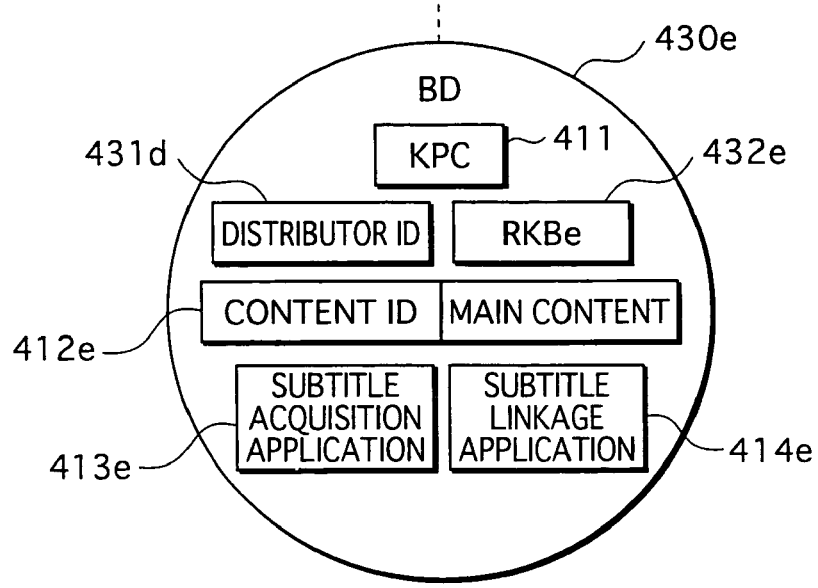

US 7,702,109 B2

CONTENT RECORDING/REPRODUCING SYSTEM, DISTRIBUTION DEVICE, REPRODUCING DEVICE, AND RECORDING DEVICE

TECHNICAL FIELD

The present invention relates to a content recording/reproducing system that records a content on a recording medium and reproduces the content.

BACKGROUND ART

Recently, hybrid media have been put into practical use. Each of the hybrid media includes a non-rewritable area, which becomes not-rewritable once data is written in it, and a rewritable area, which is rewritable. Such hybrid media are disclosed by PATENT DOCUMENT 1.

One possible use of the hybrid media is that a distributor prerecords a content such as music, movies and games in the non-rewritable area, distributes the media, and then distributes, via a network and so on, an additional content which is to be added into the rewritable area.

For instance, the distributor can distribute the hybrid media including a movie content to the users, and then distribute, via a network, the making of the movie to the users, as the additional content which is to be added into the rewritable area. In this way, the users can further enjoy the content recorded in the non-rewritable area with the additional content.

However, once the distributor has written a content into the non-rewritable area and has distributed the hybrid media, anybody can write any data into the rewritable area. Therefore, an additional content that is not expected by the distributor might be recorded in the rewritable area and reproduced. Content distributors have demands that the distributed hybrid media be protected against such rewriting, and reproduction of an unexpected and unauthorized additional content.

Patent Document 1
  Japanese laid-open patent publication No. 7-235095

DISCLOSURE OF THE INVENTION

In view of the above demands, the prevent invention aims to provide a content recording/reproducing system that prevents users from recording and reproducing an unauthorized content which is not expected by a distributor.

The object is fulfilled by a content recording/reproducing system that includes a distribution device, a first recording medium, a second recording medium, a recording device and a reproducing device, and records and reproduces a sub-content relating to a main content, the distribution device comprising: a verification information generation unit operable to, based on a secret key, apply a digital signature to relative information relating to the sub-content, and thereby generate verification information including the sub-content; and an output unit operable to output the verification information, the first recording medium comprising a non-rewritable area where the main content and key data that is used for acquiring a public key corresponding to the secret key are prestored, the second recording medium comprising a rewritable area, the recording device comprising: a receiving unit operable to receive the verification information; and a recording unit operable to record the verification information on the second recording medium, and the reproducing device comprising: an acquiring unit operable to acquire the key data from the first recording medium and acquire the verification information from the second recording medium; and a reproducing unit operable to acquire the public key based on the key data, verify the verification information with use of the public key, and reproduce the sub-content if the verification succeeds.

BRIEF DESCRIPTION OF THE DRAWINGS

FIG. 2 shows structures of a server 100 and a DVD 400;
FIG. 3 shows structures of a recording/reproducing device 300 and a DVD 400;
FIG. 6 shows structures of a server 100b and a DVD 400b;
FIG. 7 shows structures of recording/reproducing device 300b and a DVD 400b;
FIG. 12 shows structures of a recording/reproducing device 300c and a DVD 400c;
FIG. 16 shows data structures of a main content M and a sub-content which are stored in a storage unit 101d;
FIG. 18 shows a data structure of an encrypted sub-content with signature ESCS that is to be stored in a sub-content storage area 326d;
FIG. 19 shows a data structure of an RKB that is to be stored in an RKB storage area 336d;
FIG. 24 shows data structures of a main content M and a sub-content which are stored in a storage unit 101e;
FIG. 25 shows a content key that is managed by a content key management unit 110e;
FIG. 26 shows structures of a recording/reproducing device 300e and a BD 430e.

BEST MODE FOR CARRYING OUT THE INVENTION

The following describes embodiments of the present invention, with reference to the figures.

The First Embodiment

1. Structure of Content Recording/Reproducing System 1

Figure 1:
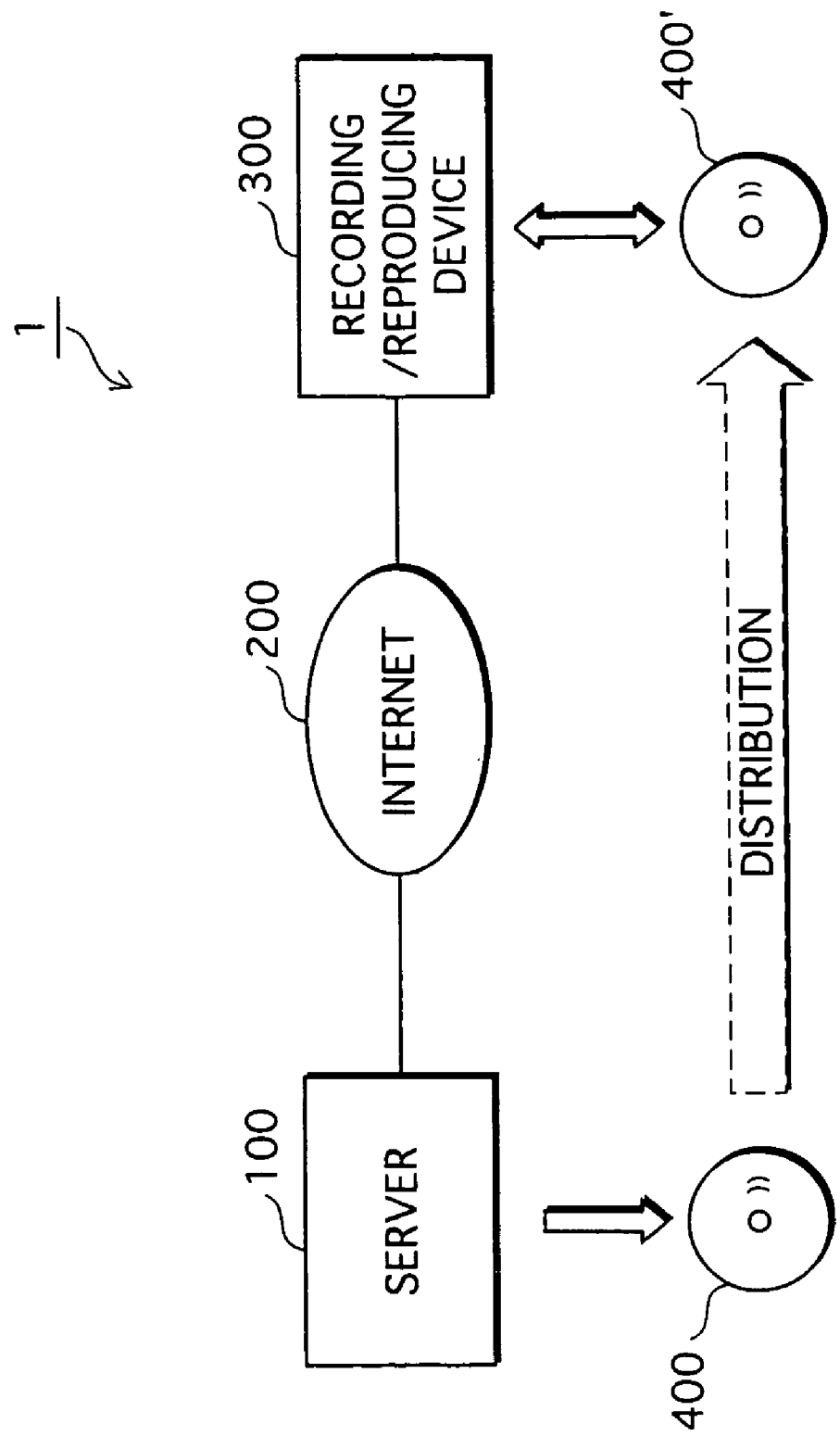
FIG. 1 schematically shows a content recording/reproducing system 1.

A content recording/reproducing system 1 illustrated in FIG. 1 includes a server 100, an Internet 200, a recording/reproducing device 300, and a DVD 400. Note that the system may include a plurality of recording/reproducing devices.

The DVD 400 includes a ROM area 410 which is a non-rewritable area, and a RAM area 420 which is a rewritable area.

The server 100, which belongs to a distributor, records a main content M in the ROM area 410 of the DVD 400 that is to be distributed to a user. The user can reproduce and view the main content M with use of the recording/reproducing device 300.

Further, by operating the recording/reproducing device 300, the user can acquire a sub-content S from the server 100 belonging to the distributor, record the sub-content S in the RAM area 420 of the DVD 400 belonging to the user, and reproduce and view the sub-content S.

Here, the distributor is a film company, for instance, and the main content M is a movie and so on. The sub-content includes, for instance, extras such as the making of the main content M, subtitle data, advertisements by the film company, trailers of upcoming movies which are to be distributed by the film company, and so on.

The structure of each component is described next.

1.1 DVD 400

The DVD 400 includes a ROM area 410 and a RAM area 420 as illustrated in FIG. 2 and FIG. 3.

(1) ROM Area 410

As illustrated in FIG. 2, the ROM area 410 is a non-rewritable area, each including sub-areas for respectively storing a public key KPC411, a main content M412, an acquisition application 413 and a linkage application 414. Once data has been written by the server 100, the data can not be rewritten and other data can not be added into this area. Also, the recording/reproducing device 300 can not write data into this area.

(2) RAM Area 420

The RAM area 420 is a rewritable area, and the recording/reproducing device 300 can write data into this area. As illustrated in FIG. 3, the RAM area 420 includes sub-areas for respectively storing an encrypted sub-content ES423, a digital signature SC422, and encrypted key information RKB421.

1.2 Server 100

As illustrated in FIG. 2, the server 100 includes a storage unit 101, a concatenation unit 102, a secret key storage unit 103, a signature unit 104, an encryption unit 105, a transmission/reception unit 106, a control unit 107, a device key management unit 108, an RKB generation unit 109, a content key management unit 110, a drive unit 111, an input unit 121 and a display unit 122.

The server 100 is, more specifically, a computer system including a microprocessor, a ROM, a RAM, a hard disk unit, a display unit, and so on. The RAM or the hard disk unit stores computer programs.

The microprocessor operates according to the computer programs, and accordingly the server 100 fulfills its function.

The units included in the server 100 are described next.

(1) Secret Key Storage Unit 103

The secret key storage unit 103 stores a secret key KSC, which is one of a pair of keys issued to the distributor.

(2) Storage Unit 101

The storage unit 101 stores a main content M, a sub-content S, a public key KPC, an acquisition application and a linkage application.

The main content M is to be recorded in the ROM area 410 of the DVD 400 and distributed to the user. The public key KPC has been issued to the film company that is the distributor. The public key KPC corresponds to the secret key KSC.

The acquisition application 413 is application software including a description of processing performed by the recording/reproducing device 300 in order to acquire the sub-content S from the server 100. The linkage application 414 is application software including a description of processing performed by the recording/reproducing device 300 in order to link and reproduce the sub-content S and the main content M. Those descriptions are, for instance, programs written in JAVA (registered trademark).

(3) Transmission/Reception Unit 106, Input Unit 121 and Display Unit 122

The transmission/reception unit 106 transmits/receives data to/from the recording/reproducing device 300 under control of the control unit 107, via the Internet 200.

The input unit 121 receives instructions from an operator of the server 100, and outputs the received instructions to the control unit 107. The display unit 122 displays images under control of the control unit 107.

(4) Control Unit 107 and Drive Unit 111

For recording the main content M on the DVD 400 according to the input from the input unit 121, the control unit 107 reads the public key KPC, the main content M, the acquisition application 413, and the linkage application 414 from the storage unit 101, and controls the drive unit 111 to write them into the ROM area 410 of the DVD 400.

Under control of the control unit 107, the drive unit 111 writes the public key KPC411, the main content M412, the acquisition application 413, and the linkage application 414 into the ROM area 410.

After receiving a request for distributing the sub-content S via the transmission/reception unit 106, the control unit 107 controls each unit so as to generate an encrypted sub-content ES, a digital signature SC and encrypted key information RKB. The control unit 107 also controls the transmission/reception unit 106 so as to transmit the encrypted sub-content ES, the digital signature SC, and the encrypted key information RKB to the recording/reproducing device 300 via the Internet 200.

(5) Content Key Management Unit 110

The content key management unit 110 stores a content key KC that is to be used for encrypting the sub-content S. Also, the content key management unit 110 prohibits the use of the content key KC in the case where the content key KC is exposed or misused by an unauthorized user. The operation by the content key management unit 110 for prohibiting the use of the content key KC is called an invalidation of the content key KC. If the content key KC is invalidated, the content key management unit 110 generates new key data, and manages the new key data as the content key KC.

Here, instead of generating the new key data, it is possible that the content key management unit 110 prestores a plurality of content keys. Also, the content key management unit 110 may acquire new key data from another device or a recording medium.

(6) Device Key Management Unit 108 and RKB Generation Unit 109

The device key management unit 108 stores device keys that are also stored in the plurality of recording/reproducing devices. Using the device keys stored in authorized recording/reproduction devices, the RKB generation unit 109 generates the encrypted key information RKB that allows only the authorized recording/reproducing devices to acquire the content key KC. In other words, if the recording/reproducing device 300 is one of the authorized recording/reproducing devices, it can acquire the content key KC based on the encrypted key information RKB, using its own device key.

Note that the method in which the plurality of recording/reproducing devices that respectively store different device keys acquire the same key data with use of their own device key is in the public domain. For instance, Japanese laid-open patent publication No. 2002-281013 discloses the method in detail. However, as to the present invention, the method for generating the encrypted key information RKB is not limited to the method disclosed in the above application. Other methods may be used as long as they allow only the authorized recording/reproducing devices to use the device key stored in the recording/reproducing device and acquire the public key KPC.

In this description of the present invention, the method disclosed in the above-described patent publication is used for generating the encrypted key information RKB.

After the RKB generation unit 109 generates the encrypted key information RKB, the device key management unit 108 selects one or more device keys that are not invalidated, and outputs them to the RKB generation unit 109.

The RKB generation unit 109 receives the selected device keys from the device key management unit 108, and acquires, from the content key management unit 110, the valid content key KC that is not invalidated. Using the received device keys, the RKB generation unit 109 applies an encryption algorithm E1 to the content key KC to encrypt the content key KC, and thereby generates the encrypted key information RKB. If a plurality of device keys are selected, the RKB generation unit 109 encrypts the content key KC with use of each device key, and thereby generates a plurality of pieces of encrypted key information. Here, the encryption algorithm E1 is, for instance, a DES algorithm. The DES algorithm is in the public domain, and therefore it is not explained here.

The RKB generation unit 109 outputs the generated encrypted key information RKB to the concatenation unit 102 and the control unit 107.

(7) Concatenation Unit 102

The concatenation unit 102 receives the valid content key KC from the content key management unit 110, and receives the encrypted key information RKB from the RKB generation unit 109. The concatenation unit 102 concatenates bits included in the encrypted key information RKB and the content key KC in this order to generate concatenated data STD, and outputs the generated concatenated data STD to the signature unit 104.

Note that the concatenated data STD may be any data generated in accordance with a rule that is predetermined based on the encrypted key information RKB and the content key KC. For instance, the order of the concatenation may be reversed.

(8) Signature Unit 104

After receiving the concatenated data STD from the concatenation unit 102, the signature unit 104 reads out the secret key KSC from the secret key storage unit 103. Using the read-out secret key KSC, the signature unit 104 applies a signature generation algorithm S1 to the concatenated data STD, and thereby generates the digital signature SC. Here, the digital signature SC is an appendix-type signature, which is to be applied to a message, and the signature generation algorithm S1 is, more specifically, an RSA algorithm for an appendix-type signature, for instance. Generation and verification of the digital signature is explained in detail in a reference document "Contemporary Cryptography", Tatsuaki Okamoto and Hirosuke Yamamoto, Sangyo-Tosho, 1997.

The signature unit 104 outputs the generated digital signature SC to the control unit 107.

(9) Encryption Unit 105

The encryption unit 105 acquires the valid content key KC from the content key management unit 110, and reads out the sub-content S from the storage unit 101. Using the acquired content key KC, the encryption unit 105 applies the encryption algorithm E1 to the sub-content S to encrypt the sub-content S, and thereby generates the encrypted sub-content ES.

The encryption unit 105 outputs the encrypted sub-content ES to the control unit 107.

1.3 Recording/Reproducing Device 300

As illustrated in FIG. 3, the recording/reproducing device 300 includes, a drive unit 301, a device key storage unit 302, a key decryption unit 303, a signature verification unit 304, a content decryption unit 305, a reproducing unit 306, a monitor 307, a speaker 308, a control unit 309, an input unit 310 and a transmission/reception unit 311.

The recording/reproducing device 300 is, more specifically, a computer system including a microprocessor, a ROM, a RAM, a hard disk unit, a display unit, and so on. The RAM or the hard disk unit stores computer programs. The microprocessor operates according to the computer programs, and accordingly the recording/reproducing device 300 fulfills its function.

(1) Transmission/Reception Unit 311 and Input Unit 310

The transmission/reception unit 311 transmits/receives data to/from the server 100 via the Internet 200 under control of the control unit 309.

The input unit 310 receives instructions from the user, and outputs the received instructions to the control unit 309.

(2) Control Unit 309 and Drive Unit 301

The drive unit 301 writes data into the RAM area 420 and reads out data from the DVD 400, under control of the control unit 309.

Acquisition of Sub-Content

After the DVD 400 is put in the drive unit 301 and the control unit 309 receives instructions from the input unit 310 for using the DVD 400, the control unit 309 reads out the acquisition application 413 from the ROM area 410. According to the read-out acquisition application, the control unit 309 transmits a request for distributing the sub-content S to the server 100, via the transmission/reception unit 311.

Also, after receiving the encrypted sub-content ES, the digital signature SC, and the encrypted key information RKB via the transmission/reception unit 311, the control unit 309 controls the drive unit 301 to write the encrypted key information RKB421, the digital signature SC422, and the encrypted sub-content ES423 in the RAM unit 420 of the DVD 400.

Reproduction of Sub-Content

After receiving a request for reproducing the sub-content S from the input unit 310, the control unit 309 controls the drive unit 301 to read out the linkage application 414 from the ROM area 410. According to the read-out linkage application, the control unit 310 controls the drive unit 301 to read out the public key KPC from the ROM area 410 of the DVD 400, and readout the encrypted key information RKB, the digital signature SC, and the encrypted sub-content ES from the RAM area 420 of the DVD 400.

Under control of the control unit 309, the drive unit 301 reads the public key KPC, the encrypted sub-content ES, the encrypted key information RKB, a digital signature SC, and the main content M. Then, the drive unit 301 outputs the encrypted key information RKB to the key decryption unit 303 and the signature verification unit 304, outputs the digital signature SC and the public key KPC to the signature verification unit 304, outputs the encrypted sub-content ES to the content decryption unit 305, and outputs the main content M to the reproducing unit 306.

The control unit 309 controls the key decryption unit 303 to derive the content key KC from the encrypted key information RKB. Also, the control unit 309 controls the signature verification unit 304 to verify the digital signature SC. If the verification result received from the verification unit 304 is a failure, the control unit 309 displays an error notification on the monitor 307.

If the verification result is a success, the control unit 309 continues the subsequent processing, controls the content decryption unit 305 to decrypt the encrypted sub-content ES, and controls the reproducing unit 306 to link and reproduce the sub-content S with the main content M according to the linkage application.

(3) Device Key Storage Unit 302 and Key Decryption Unit 303

The device key storage unit 302 stores the device key KD. Note that it is possible that a plurality of the device key KD are stored. A method for selecting an appropriate device key from the plurality of the device keys is explained in detail in the above-described Japanese laid-open patent publication No. 2002-281013.

Receiving the encrypted key information RKB read out by the drive unit 301, the key decryption unit 303 reads out the device key KD from the device key storage unit 302. Using the read-out device key KD, the key decryption unit 303 applies a decryption algorithm D1 to the encrypted key information RKB to decrypt the encrypted key information RKB, and thereby derives the content key KC. The decryption algorithm D1 is an algorithm for performing processing that is the inverse of the encryption algorithm E1.

The key decryption unit 303 outputs the generated content key KC to the signature verification unit 304.

(4) Signature Verification Unit 304

The signature verification unit 304 receives the encrypted key information RKB, the digital signature SC and the public key KPC, which are read out by the drive unit 301, and receives the content key KC from the key decryption unit 303. The signature verification unit 304 concatenates the encrypted key information RKB and the content key KC in this order, to generate concatenated data STD'.

Also, using the public key KPC and the concatenated data STD', the signature verification unit 304 applies a signature verification algorithm V1 to the digital signature SC in order to verify the signature. Here, the signature verification algorithm V1 is for verifying the signature data generated by applying the signature generation algorithm S1.

If the verification result is a failure, the signature verification unit 304 outputs the result "failure" to the control unit 309.

If the verification result is a success, the control unit 309 continues the subsequent processing and outputs the content key KC to the content decryption unit 305.

(5) Content Decryption Unit 305

The content decryption unit 305 receives the encrypted sub-content ES read out by the drive unit 301, and receives the content key KC from the signature verification unit 304. Using the received content key KC, the content decryption unit 305 applies the decryption algorithm D1 to the encrypted sub-content ES, and thereby generates the sub-content S.

(6) Reproducing Unit 306, Monitor 307, and Speaker 308

After receiving the sub-content S, the reproducing unit 306 acquires the main content M and links-and-reproduces the sub-content S and the main content M. Here, in the case where the sub-content S is an advertisement such as a movie preview, to "link and reproduce" is to reproduce the sub-content S inserted in the first section of the main content M, which is a section that can not be skipped by the user. In the case where the sub-content S is subtitle data, the sub-content S overlays the main content M.

2. Operations by Content Recording/Reproducing System 1

2.1 Recording of Sub-Content

Figure 4:
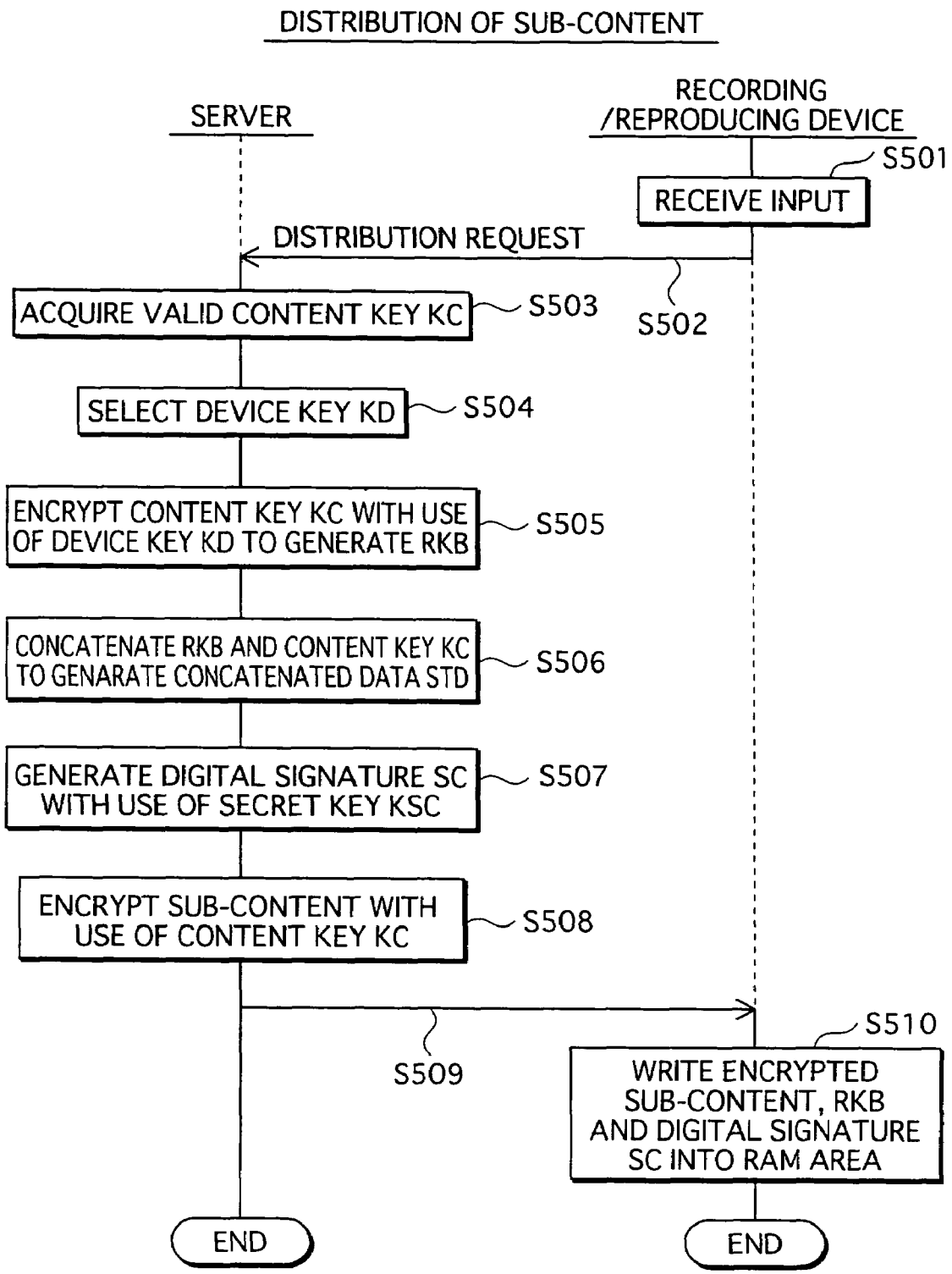
FIG. 4 is a flowchart showing operations by a server 100 and a recording/reproducing device 300 at a time of distributing a sub-content.

Operations by the server 100 and the recording/reproducing device 300 are described next, with reference to FIG. 4.

After the DVD 400 is put in the drive unit 301 and the control unit 309 receives instructions from the input unit 310 for using the DVD 400 (Step S501), the control unit 309 transmits, via the transmission/reception unit 311, a request for distributing the sub-content S (Step S502).

After receiving the request via the transmission/reception unit 106 of the server 100, the RKB generation unit 109 acquires the valid content key KC from the content key management unit 110 (Step S503). The device key management unit 108 selects a device key which is stored in the authorized recording/reproducing device (Step S504), and outputs the device key to the RKB generation unit 109. The RKB generation unit 109 receives the device key KD, and encrypts the content key KC to generate the encrypted key information RKB, with use of the received device key KD (Step S505). The RKB generation unit 109 outputs the generated encrypted key information RKB to the concatenation unit 102 and the control unit 107.

After the concatenation unit 102 receives the encrypted key information RKB from the RKB generation unit 109, and acquires the content key KC from the content key management unit 110, the concatenation unit 102 concatenates the encrypted key information RKB and the content key KC to generate the concatenated data STD (Step S506). The concatenation unit 102 outputs the concatenated data STD to the signature unit 104.

Receiving the concatenated data STD, the signature unit 104 reads out the secret key KSC from the secret key storage unit 103. The signature unit 104 generates the digital signature SC that corresponds to the concatenated data STD with use of the read-out secret key KSC (Step S507), and outputs the generated digital signature SC to the control unit 107.

The encryption unit 105 acquires the content key KC from the content key management unit 110, and reads out the sub-content S from the storage unit 101. Using the content key KC, the encryption unit 105 encrypts the sub-content S to generate the encrypted sub-content ES (Step S508), and outputs the generated encrypted sub-content ES to the control unit 107.

The control unit 107 transmits the encrypted sub-content ES, the encrypted key information RKB, and the digital signature SC from the transmission/reception unit 106 to the recording/reproducing device 300 via the Internet 200 (Step S509).

The control unit 309 of the recording/reproducing device 300 receives the encrypted sub-content ES, the encrypted key information RKB and the digital signature SC via the transmission/reception unit 311, and controls the drive unit 301 to write them into the RAM area 420 of the DVD 400 (Step S510), and then finishes the processing.

2.2 Reproduction of Sub-Content

Figure 5:
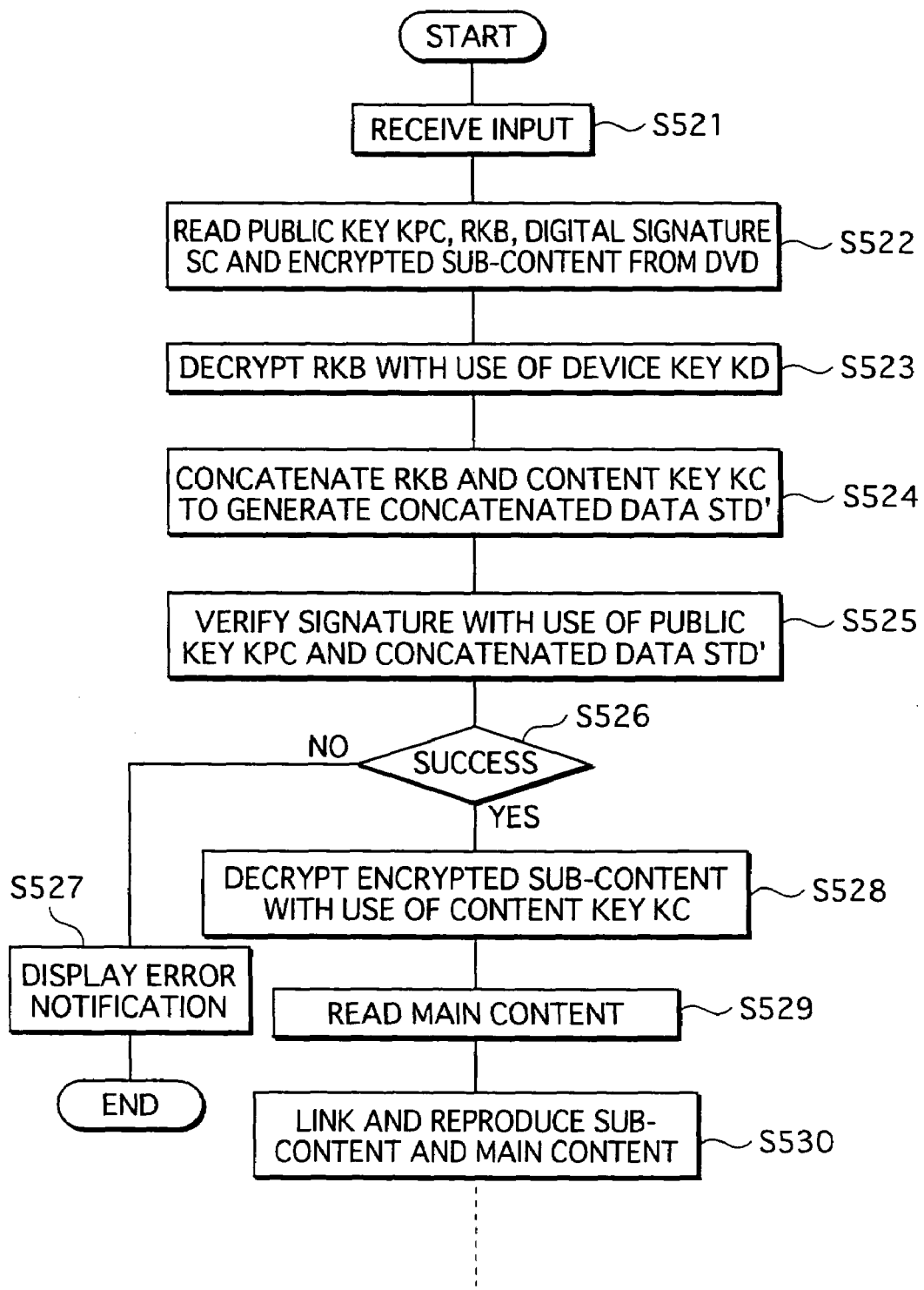
FIG. 5 is a flowchart showing operations by a recording/reproducing device at a time of reproducing a sub-content.

Operations by the recording/reproducing device 300 for reproducing the sub-content S are described next, with reference to FIG. 5.

After the control unit 309 receives instructions from the input unit 310 for reproducing the DVD 400 that has been put in the drive unit 301 (Step S521), the drive unit 301 reads out the public key KPC from the ROM area 410 of the DVD 400, and reads out the encrypted key information RKB, the digital signature SC, and the encrypted sub-content ES423 from the RAM area 420 of the DVD 400 (Step S522).

The key decryption unit 303 receives the read-out encrypted key information RKB, and reads out the device key KD from the device key storage unit 302. The key decryption unit 303 decrypts the encrypted key information RKB with use of the device key KD (Step S523), and generates the content key KC. The key decryption unit 303 outputs the generated content key KC to the signature verification unit 304.

The signature verification unit 304 receives the public key KPC, the encrypted key information RKB and the digital signature SC from the drive unit 301, and receives the content key KC from the key decryption unit 303. Then, the signature verification unit 304 concatenates the encrypted key information RKB and the content key KC to generate the concatenated data STD' (Step S524). Using the public key KPC and the concatenated data STD', the signature verification unit 304 verifies the digital signature SC (Step S525).

If the verification result is a failure (NO in Step S526), the signature verification unit 304 outputs the verification result to the control unit 309, and the control unit 309 displays an error notification on the monitor 307 (Step S527). Then, the recording/reproducing device 300 finishes the processing.

If the verification result is a success (YES in Step S526), the signature verification unit 304 outputs the content key KC to the content decryption unit 305.

The content decryption unit 305 receives the encrypted sub-content ES from the drive unit 301, and receives the content key KC from the signature verification unit 304. Using the content key KC, the content decryption unit 305 decrypts the encrypted sub-content ES to generate the sub-content S (Step S528). Then, the content decryption unit 305 outputs the generated sub-content S to the reproducing unit 306.

Receiving the sub-content S from the content decryption unit 305, the reproducing unit 306 receives the main content M read out by the drive unit 301 (Step S529), and links and reproduces the sub-content S and the main content M (Step S530).

The Second Embodiment

A content recording/reproducing system 1b as the second embodiment according to the present invention is described next. Differences between the first embodiment and the second embodiment are mainly described here.

3. Structure of Content Recording/Reproducing System 1b

A content recording/reproducing system 1b includes a server 100b, an Internet 200, a recording/reproducing device 300b and a DVD 400b.

The structure of each component is described next.

3.1 Server 100b

As illustrated in FIG. 6, the server 100b includes a storage unit 101, a concatenation unit 102b, a secret key storage unit 103, a signature unit 104b, a transmission/reception unit 106, a control unit 107b, a device key management unit 108, a drive unit 111, a BE generation unit 112b, a verification data storage unit 113b, an input unit 121, and a display unit 122. The following describe the concatenation unit 102b, the signature unit 104b, the control unit 107b, the BE generation unit 112b, and the verification data storage unit 113b, which are different from the first embodiment.

(1) Control Unit 107b

Recording of Main Content

At the time of recording the main content M on the DVD 400b, the control unit 107b controls the BE generation unit 112b to generate encrypted key information BE, and reads out the main content M, the acquisition application and the linkage application from the storage unit 101. Then, the control unit 107 controls the drive unit 111 to write the encrypted key information BE, the main content M, the acquisition application and the linkage application into the ROM area 410b of the DVD 400b.

Distribution of Sub-Content

After receiving a distribution request from the recording/reproducing device 300b, the control unit 107 controls the concatenation unit 102b and the signature unit 104b to generate a recovery-type signature RSC. The recovery-type signature RSC is described later. The control unit 107 transmits the generated recovery-type signature RSC to the recording/reproducing device 300b via the transmission/reception unit 106.

(2) BE Generation Unit 112b

The BE generation unit 112b generates the encrypted key information BE based on which only the authorized recording/reproducing devices can acquire the public key KPC. Here, the same method as the above-described method for generating the encrypted key information RKB is used. However, other methods may be used as long as they allow only the authorized recording/reproducing devices to acquire the public key KPC.

At the time of recording the main content M, the BE generation unit 112b receives the device key KD that is stored in the authorized recording/reproducing devices from the device key management unit 108, and reads out the public key KPC from the storage unit 101. Using the device key KD, the BE generation unit 112b applies the encryption algorithm E1 to the public key KPC to generate the encrypted key information BE. The BE generation unit 112b outputs the generated encrypted key information BE to the control unit 107b.

(3) Verification Data Storage Unit 113b and Concatenation Unit 102b

The verification data storage unit 113b stores verification data VD. The verification data VD is used for verifying whether the recovery-type signature has been recovered by the recording/reproducing device. Each authorized recording/reproducing device stores the verification data VD having the same value.

The concatenation unit 102b reads out the sub-content S from the storage unit 101, and reads out the verification data VD from the verification data storage unit 113b. Next, the concatenation unit 102b bit-concatenates the sub-content S and the verification data VD, and thereby generates concatenated data STDb. The concatenation unit 102b outputs the generated concatenated data STDb to the signature unit 104b.

(4) Signature Unit 104b

After receiving the concatenated data STDb from the concatenation unit 102b, the signature unit 104b reads out the secret key KSC from the secret key storage unit 103. Using the read-out secret key KSC, the signature unit 104b applies a message recovery type signature generation algorithm S2 to the concatenated data STDb, and thereby generates a recovery-type digital signature RSC. Generally, recovery type digital signatures are characterized by that a message is embedded in the signature and the message can not be derived from the signature without the key for verification. Note that the size of data to be embedded in the signature has a limit. If the data size of the sub-content S is more than the limit, the sub-content S should be divided into pieces each having data size within the limit. Then, the recovery-type signature is to be generated for each piece. Each recovery-type signature is referred as the recovery-type signature RSC. Here, the signature generation algorithm S2 is a RSA recovery-type signature, for instance.

Generation and verification of the message recovery type digital signature are explained in detail in the above-described "Contemporary Cryptography", Tatsuaki Okamoto and Hirosuke Yamamoto, Sangyo-Tosho, 1997.

The signature unit 104b outputs the generated recovery-type signature RSC to the control unit 107b.

3.2 Recording/Reproducing Device 300b

As illustrated in FIG. 7, the recording/reproducing device 300b includes a drive unit 301, a device key storage unit 302, a key decryption unit 303b, a reproducing unit 306, a monitor 307, a speaker 308, a control unit 309b, an input unit 310, a transmission/reception unit 311, a signature recovery unit 312b, a division unit 313b, a verification data storage unit 314b and a verification unit 315b. The following describe the key decryption unit 303b, the control unit 309b, the signature recovery unit 312b, the division unit 313b, the verification data storage unit 314b and the verification unit 315b, which are different from the first embodiment.

(1) Control Unit 309b

After the control unit 309b transmits a distribution request according to the acquisition application and receives the recovery-type signature RSC from the server 100b, the control unit 109b controls the drive unit 301 to write the recovery-type signature RSC into the RAM area 420b of the DVD 400b', in the same manner as the first embodiment.

Also, after receiving the input for reproducing the sub-content S, the control unit 309b controls the drive unit 301 to read out the encrypted key information BE415b and the recovery-type signature RSC424b according to the linkage application.

The drive unit 301 reads out the encrypted key information BE from the ROM area 410b of the DVD 400b and reads out the recover-type signature RSC from the RAM area 420b of the DVD 400b under control of the control unit 309b. The drive unit 301 outputs the read-out encrypted key information BE to the key decryption unit 303b, and outputs the recovery-type signature RSC to the signature recovery unit 312b.

The control unit 309b receives the verification result from the verification unit 315b. If the result of the verification is a failure, the control unit 309 displays an error notification on the monitor 307.

(2) Key Decryption Unit 303b

Receiving the encrypted key information BE, the key decryption unit 303b reads out the device key KD from the device key storage unit 302. Using the device key KD, the key decryption unit 303b applies the decryption algorithm D1 to the encrypted key information BE to decrypt the encrypted key information BE, and generates the public key KPC. The key decryption unit 303b outputs the generated KPC to the signature recovery unit 312b.

(3) Signature Recovery Unit 312b

The signature recovery unit 312b receives the public key KPC from the key decryption unit 303b, and receives the recovery-type signature RSC from the drive unit 301. Using the public key, the signature recovery unit 312b applies a recovery algorithm R2 to the recovery-type signature RSC to recover the recovery-type signature RSC, and generates concatenated data STDb'. Here, the recovery algorithm R2 is an algorithm for recovering the recover-type signature that is generated by the signature generation algorithm S2.

The signature recovery unit 312b outputs the generated concatenated data STDb' to the division unit 313b.

(4) Division Unit 313b

Receiving the concatenated data STDb' from the signature recovery unit 312b, the division unit 313b divides the concatenated data STDb' to generate the sub-content S and verification data VD'. The division unit 313b outputs the generated sub-content S and verification data VD' to the verification unit 315b.

(5) Verification Data Storage Unit 314b and Verification Unit 315b

The verification data storage unit 314b stores the verification data VD.

Receiving the sub-content S and the verification data VD' from the division unit 313b, the verification unit 315b reads out the verification data VD from the verification data storage unit 314b, and judges whether the received verification data VD' is the same as the read-out verification data VD. If the verification data VD' is not the same as the verification data VD, the verification unit 315b outputs the verification result "failure" to the control unit 309b.

If the verification data VD' is the same as the verification data VD, the verification unit 315b continues the subsequent processing, and outputs the recovered sub-content S to the reproducing unit 306.

3.3 DVD 400b

The DVD 400b includes the ROM area 410b and the RAM area 420b just as the DVD 400.

The ROM area 410b stores the encrypted key information BE415b and the main content M412, which has been recorded by the server 100b.

The RAM area 420b stores the recovery-type signature RSC424b, which has been recorded by the recording/reproducing device 300b.

4. Operations by Content Recording/Reproducing System 1b

4.1 Recording of Main Content

Figure 8:
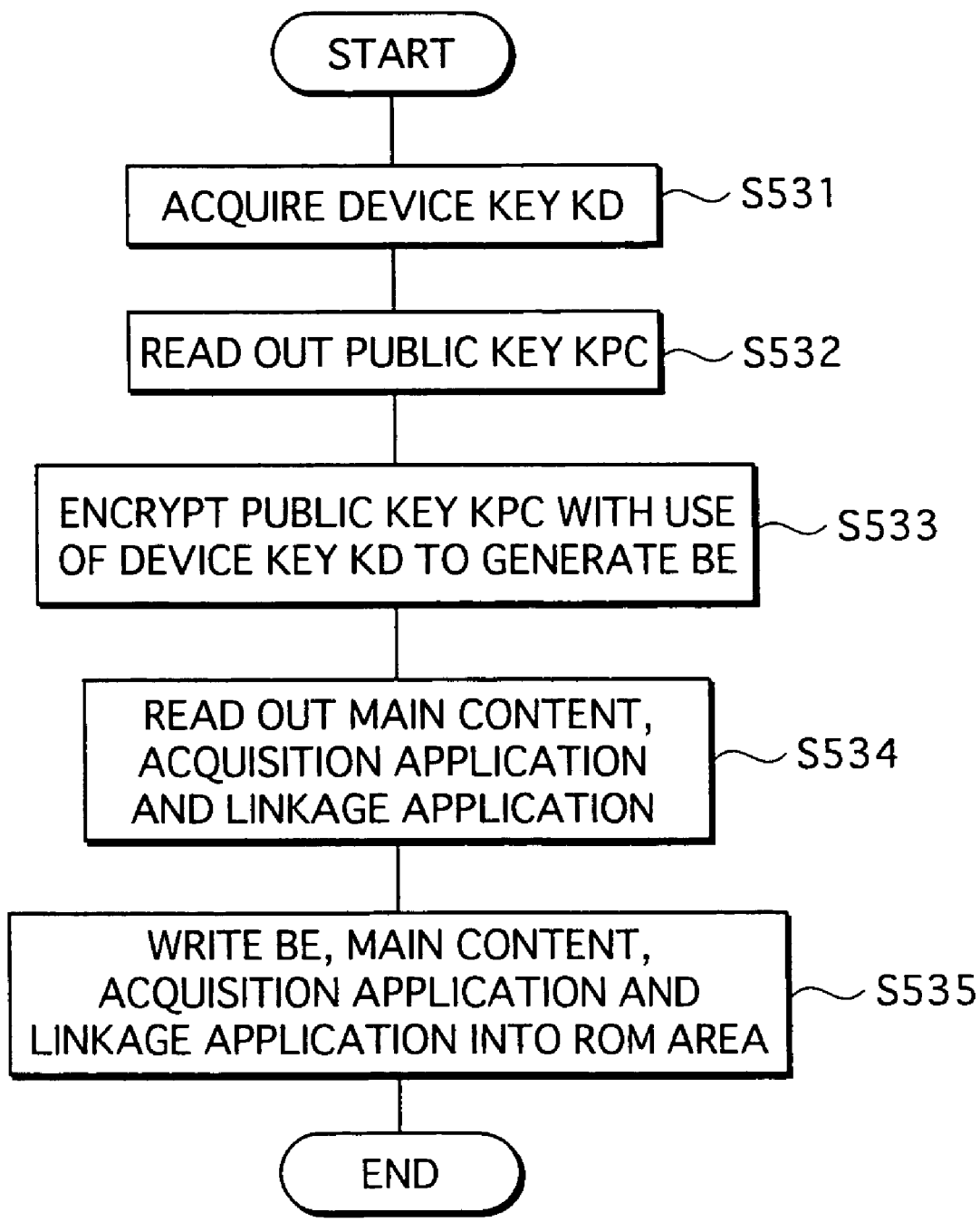
FIG. 8 is a flowchart showing operations by a server 100b at a time of recording a main content M on a DVD 400b.

The operations by the server 100b at the time of recording the main content M are described next, with reference to FIG. 8.

After the DVD 400b is put in the drive unit 111, according to the operator's operation input from the input unit 121, the BE generation unit 112b acquires the device key KD that is stored in the authorized recording/reproducing devices from the device key storage unit 108 (step S531). Then, the BE generation unit 112b reads out the public key KPC from the storage unit 101 (Step S532), and encrypts the public key KPC with use of the device key KD, and generates the encrypted key information BE (Step S533). The BE generation unit 112b outputs the generated encrypted key information BE to the control unit 107b.

Receiving the encrypted key information BE, the control unit 107b reads out the main content M, the acquisition application and the linkage application from the storage unit 101 (Step S534), controls the drive unit 111 to write the encrypted key information BE, the main content M, the acquisition application, and the linkage application into the ROM area 410b (Step S535), and then, finishes the processing for recording the main content.

4.2 Distribution of Sub-Content

Figure 9:
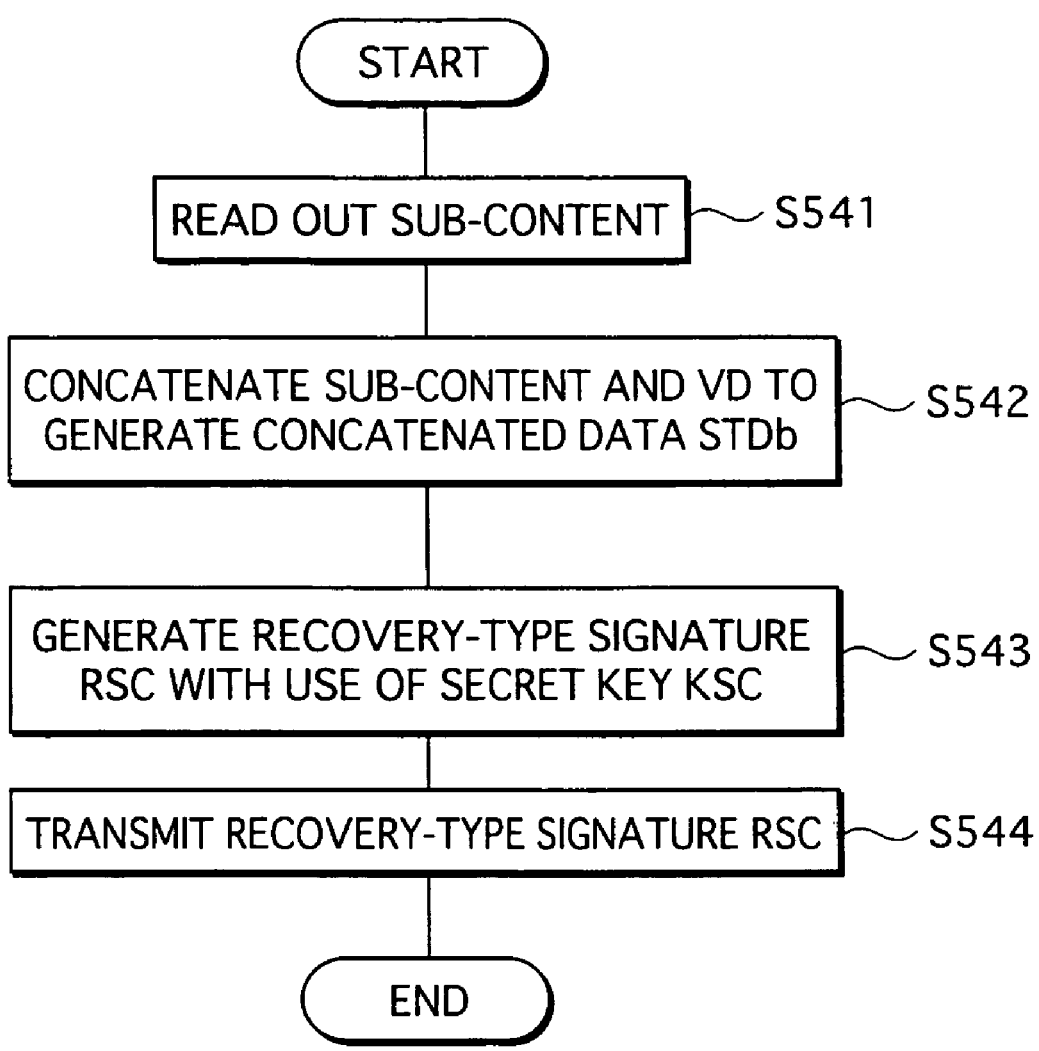
FIG. 9 is a flowchart showing operations by a server 100b at a time of distributing a sub-content.

The operations by the server 100b at the time of distributing the sub-content S are described next with reference to FIG. 9.

Receiving the distribution request via the transmission/reception unit 106, the concatenation unit 102b reads out the verification data VD from the verification data storage unit 113b, and reads out the sub-content S from the storage unit 101 (Step S541). Also, the concatenation unit 102b bit-concatenates the sub-content S and the verification data VD to generate the concatenated data STDb (Step S542). The concatenation unit 102b outputs the generated concatenated data STDb to the signature unit 104b.

Receiving the concatenated data STDb, the signature unit 104b reads out the secret key KSC from the secret key storage unit 103, and generates the recovery-type signature RSC that corresponds to the concatenated data STD, with use of the secret key KSC (Step S543). The signature unit 104b outputs the generated recovery-type signature RSC to the control unit 107b.

The control unit 107b outputs the generated recovery-type signature RSC to the recording/reproducing device 300b via the transmission/reception unit 106 (Step S544), and finishes the distribution.

4.3 Reproduction of Sub-Content

Figure 10:
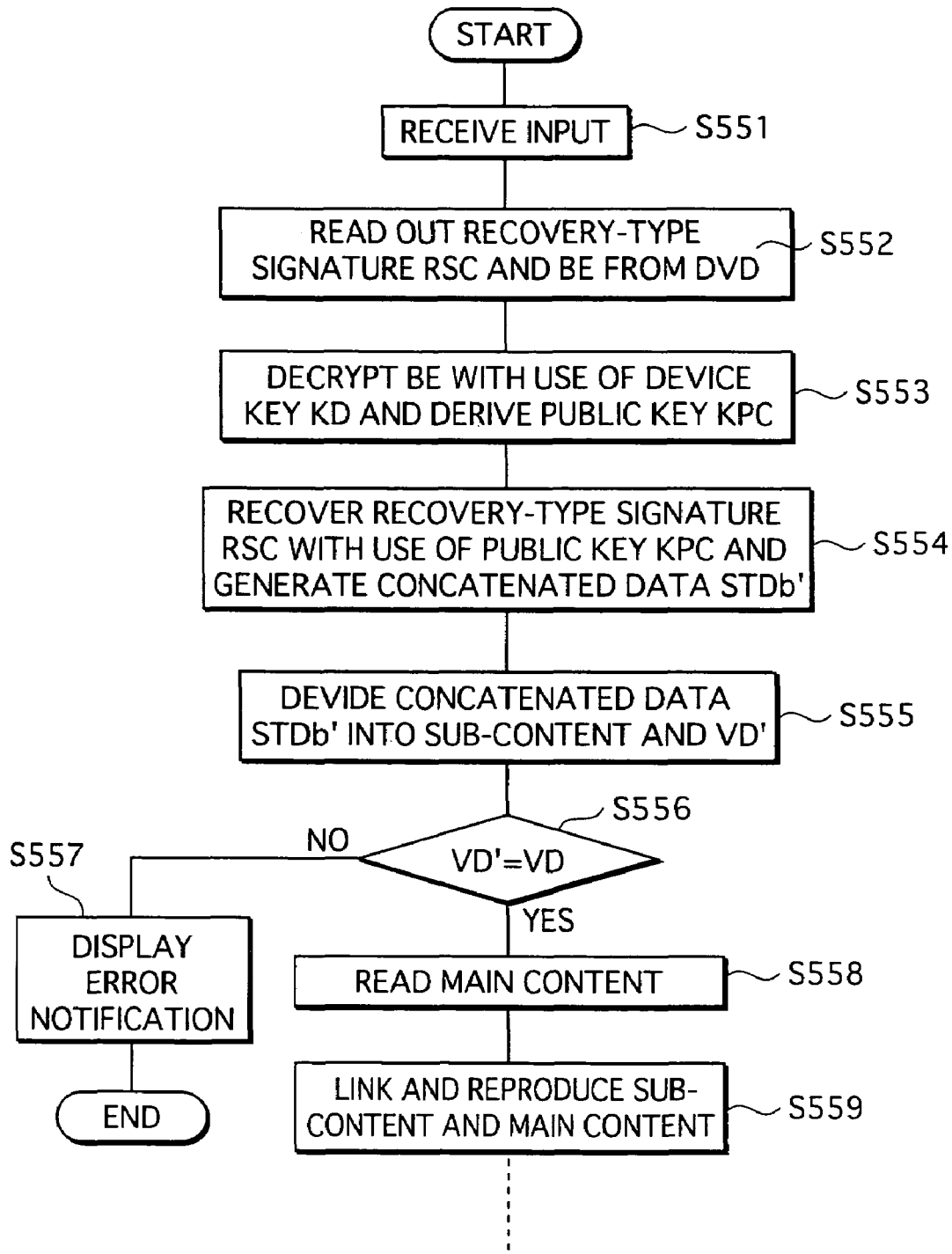
FIG. 10 is a flowchart showing operations by a recording/reproducing device 300b at a time of reproducing a sub-content.

Operations by the recording/reproducing device 300b at the time of reproducing the sub-content S are described next, with reference to FIG. 10.

After the input unit 310 receives the input instructing the reproduction of the sub-content S (step S551), the control unit 309b controls the drive unit 301 to read out the encrypted key information BE from the ROM area 410b of the DVD 400b, and read out the recovery-type signature RSC from the RAM area 420 of the DVD 400b (Step S552).

The key decryption unit 303b reads out the device key KD from the device key storage unit 302, and decrypts the encrypted key information BE with use of the read-out device key KD to derive the public key KPC (Step S553). The key decryption unit 303b outputs the generated public key KPC to the signature recovery unit 312b.

The signature recovery unit 312b recovers the recovery-type signature RSC with use of the public key KPC, to generate the concatenated data STDb' (Step S554). The signature recovery unit 312b outputs the generated concatenated data STDb' to the division unit 313b.

The division unit 313b divides the concatenated data STDb' to generate the sub-content S and the verification data VD' (Step S555), and outputs the generated sub content S and verification data VD' to the verification unit 315b.

The verification unit 315b reads out the verification data VD from the verification data storage unit 314b, and judges whether the divided verification data VD' is the same as the read-out verification data VD (Step S556). If the verification data VD' is not the same as the verification data VD (NO in Step S556), the control unit 309b displays an error notification on the monitor 307, and finishes the reproduction.

If the verification data VD' is the same as the verification data VD (YES in Step S556), the verification unit 315b outputs the recovered sub-content S to the reproducing unit 306.

The reproducing unit 306 receives the main content M read out from the drive unit 301 (Step S558), and links and reproduces the sub-content S and the main content M (Step S559).

The Third Embodiment

A content recording/reproducing system 1c as the third embodiment according to the present invention is described next. Differences between the first and second embodiments and the third embodiment are mainly described here.

5. Structure of Content Recording/Reproducing System 1c

A content recording/reproducing system 1c includes a server 100c, an Internet 200, a recording/reproducing device 300c and a DVD 400c.

5.1 Server 100c

Figure 11:
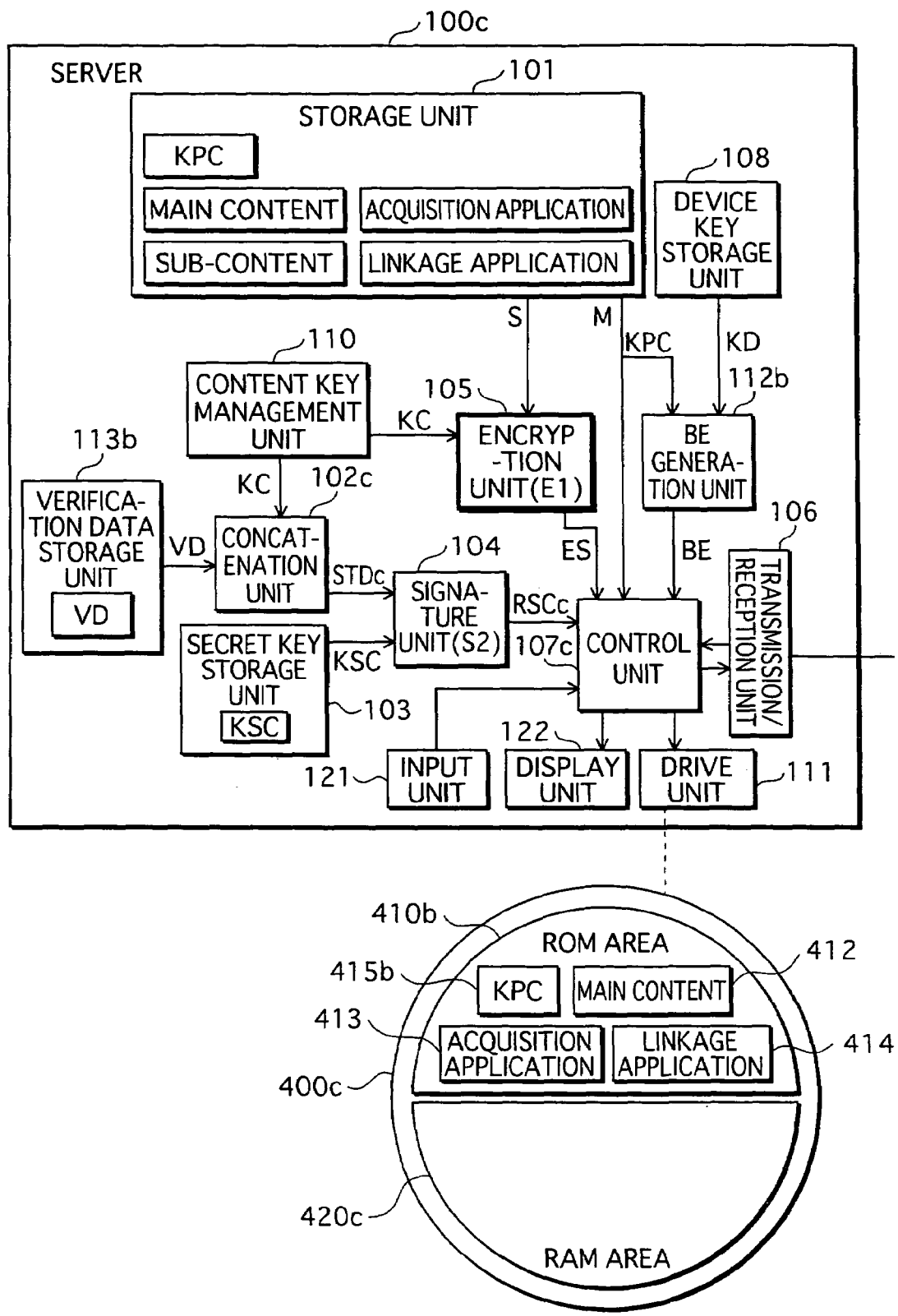
FIG. 11 shows structures of a server 100c and a DVD 400c.

As illustrated in FIG. 11, the server 100c includes a storage unit 101, a concatenation unit 102c, a secret key storage unit 103, a signature unit 104c, an encryption unit 105, a transmission/reception unit 106, a control unit 107c, a content key management unit 110, a drive unit 111, a BE generation unit 112c, a verification data storage unit 113c, an input unit 121, and a display unit 122. The following describe the control unit 107c, the concatenation unit 102c, and the signature unit 104c.

(1) Control Unit 107c

The control unit 107c writes the main content M into the ROM area 410b of the DVD 400c, in the same manner as the control unit 107b of the second embodiment.

Also, after receiving the distribution request from the recording/reproducing device 300c, the control unit 107c controls the encryption unit 105 to generate the encrypted sub-content ES, and controls the concatenation unit 102c and the signature unit 104c to generate the recovery-type signature RSCc. The control unit 107c transmits the encrypted sub-content ES and the recovery-type signature RSCc to the recording/reproducing device 300c via the transmission/reception unit 106.

(2) Concatenation Unit 102c

The concatenation unit 102c acquires the valid content key KC from the content key management unit 110, and reads out the verification data VD from the verification data storage unit 113b. Also, the concatenation unit 102c bit-concatenates the content key KC and the verification data VD to generate concatenated data STDC. The concatenation unit 102c outputs the generated concatenated data STDC to the signature unit 104c.

(3) Signature Unit 104c

The signature unit 104c receives the concatenated data STDC from the concatenation unit 102c, and applies the signature generation algorithm S2 to the concatenated data STDc with use of the secret key KSC, to generate the recovery-type signature RSCc.

The signature unit 104c outputs the generated recovery-type signature RSCc to the control unit 107c.

5.2 Recording/Reproducing Device 300c

As illustrated in FIG. 12, the recording/reproducing device 300c includes a drive unit 301, a device key storage unit 302, a key decryption unit 303b, a content decryption unit 305, a reproducing unit 306, a monitor 307, a speaker 308, a control unit 309c, an input unit 310, a transmission/reception unit 311, a signature recovery unit 312c, a division unit 313c, a verification data storage unit 314b and a verification unit 315c. The following describe the key decryption unit 303b, the control unit 309c, the signature recovery unit 312c, the division unit 313c, the verification data storage unit 314b and the verification unit 315c.

(1) Control Unit 309c

The control unit 309c transmits the distribution request in the same manner as the first and second embodiments. Receiving the encrypted sub-content ES and the recovery-type signature RSCc from the server 100c, the control unit 309c controls the drive unit 301 to write the encrypted sub-content ES and the recovery-type signature RSCc into the RAM area 420 of the DVD 400c.

Also, after receiving the input for reproducing the sub-content S, the control unit 309c controls the drive unit 301 to read out the encrypted key information BE415b, the recovery-type signature RSCc, and the encrypted sub-content ES.

The drive unit 301 reads out the encrypted key information BE415b from the ROM area 410b of the DVD 400c and reads out the recover-type signature RSCc and the encrypted sub-content ES from the RAM area 420c of the DVD 400c under control of the control unit 309c. The drive unit 301 outputs the read-out encrypted key information BE to the key decryption unit 303b, and outputs the recovery-type signature RSCc to the signature recovery unit 312c. The drive unit also outputs the encrypted sub-content ES to the content decryption unit 305.

(2) Signature Recovery Unit 312c

The signature recovery unit 312c receives the public key KPC from the key decryption unit 303b, and receives the recovery-type signature RSCc from the drive unit 301. The signature recovery unit 312c applies the recovery algorithm R2 to the recovery-type signature RSCc with use of the public key KPC, to generate concatenated data STDc'. The signature recovery unit 312c outputs the generated concatenated data STDc' to the division unit 313c.

(3) Division Unit 313c

Receiving the concatenated data STDc' from the signature recovery unit 312c, the division unit 313c divides the concatenated data STDc' to generate the content key KC and the verification data VD'. The division unit 313c outputs the generated content key KC and verification data VD' to the verification unit 315b.

(4) Verification Unit 315c

The verification unit 315c receives the content key KC and the verification data VD' from the division unit 313c. In the same manner as the second embodiment, the verification unit 315c judges whether the received verification data VD' is the same as the verification data VD, and if it is the same, the verification unit 315c outputs the content key KC to the content decryption unit 305.

6. Operations by Content Recording/Reproducing System 1c

The operations for recording the main content M is performed in the same manner as the second embodiment, and therefore they are not described here.

6.1 Distribution of Sub-Content

Figure 13:
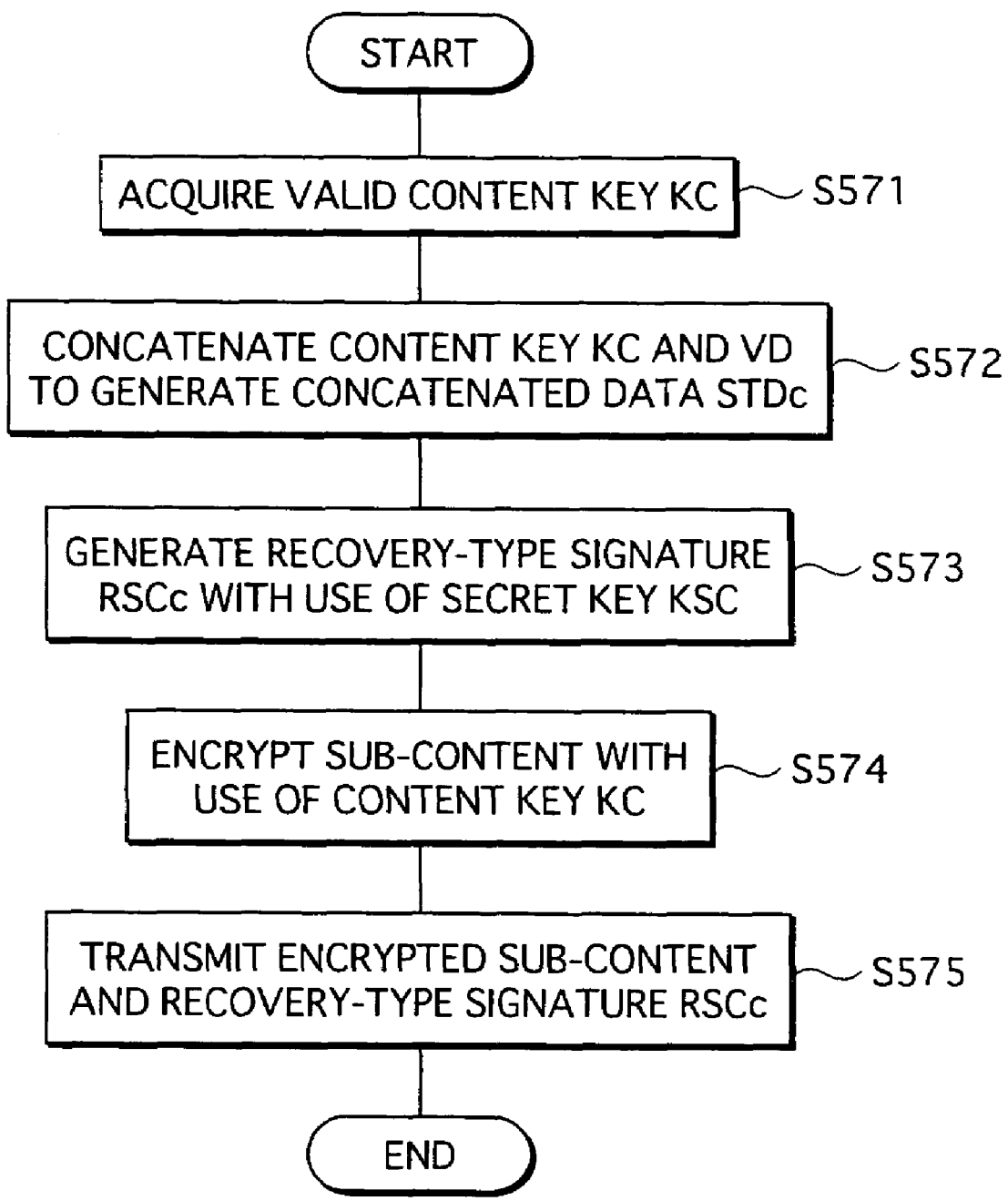
FIG. 13 is a flowchart showing operations by a server 100c at a time of distributing a sub-content.

The operations by the server 100c at the time of distributing the sub-content are described next with reference to FIG. 13.

Receiving the distribution request via the transmission/reception unit 106, the concatenation unit 102c acquires the valid content key KC from the content key management unit 110 (Step S571). Also, the concatenation unit 102c reads out the verification data VD from the verification data storage unit 113b, and bit-concatenates the acquired content key KC and verification data VD to generate the concatenated data STDc (Step S572). The concatenation unit 102c outputs the generated concatenated data STDc to the signature unit 104c.

The signature unit 104c reads out the secret key KSC from the secret key storage unit 103, and generates the recovery-type signature RSCc that corresponds to the concatenated data STDc with use of the secret key KSC (step S573). The signature unit 104c outputs the generated recovery-type signature RSCc to the control unit 107c.

Next, the encryption unit 105 acquires the valid content key KC from the content key management unit 110, reads out the sub-content S from the storage unit 101, and encrypts the sub-content S with use of the content key KC, to generate the encrypted sub-content ES (Step S574). The encryption unit 105 outputs the generated encrypted sub-content ES to the control unit 107c.

The control unit 107c receives the encrypted sub-content ES and the recovery-type signature RSCc, and transmits the encrypted sub-content ES and the recovery-type signature RSCc to the recording/reproducing device 300c via the transmission/reception unit 106 (Step S575). Then, the control unit 107c finishes the distribution.

6.2 Reproduction of Sub-Content

Figure 14:
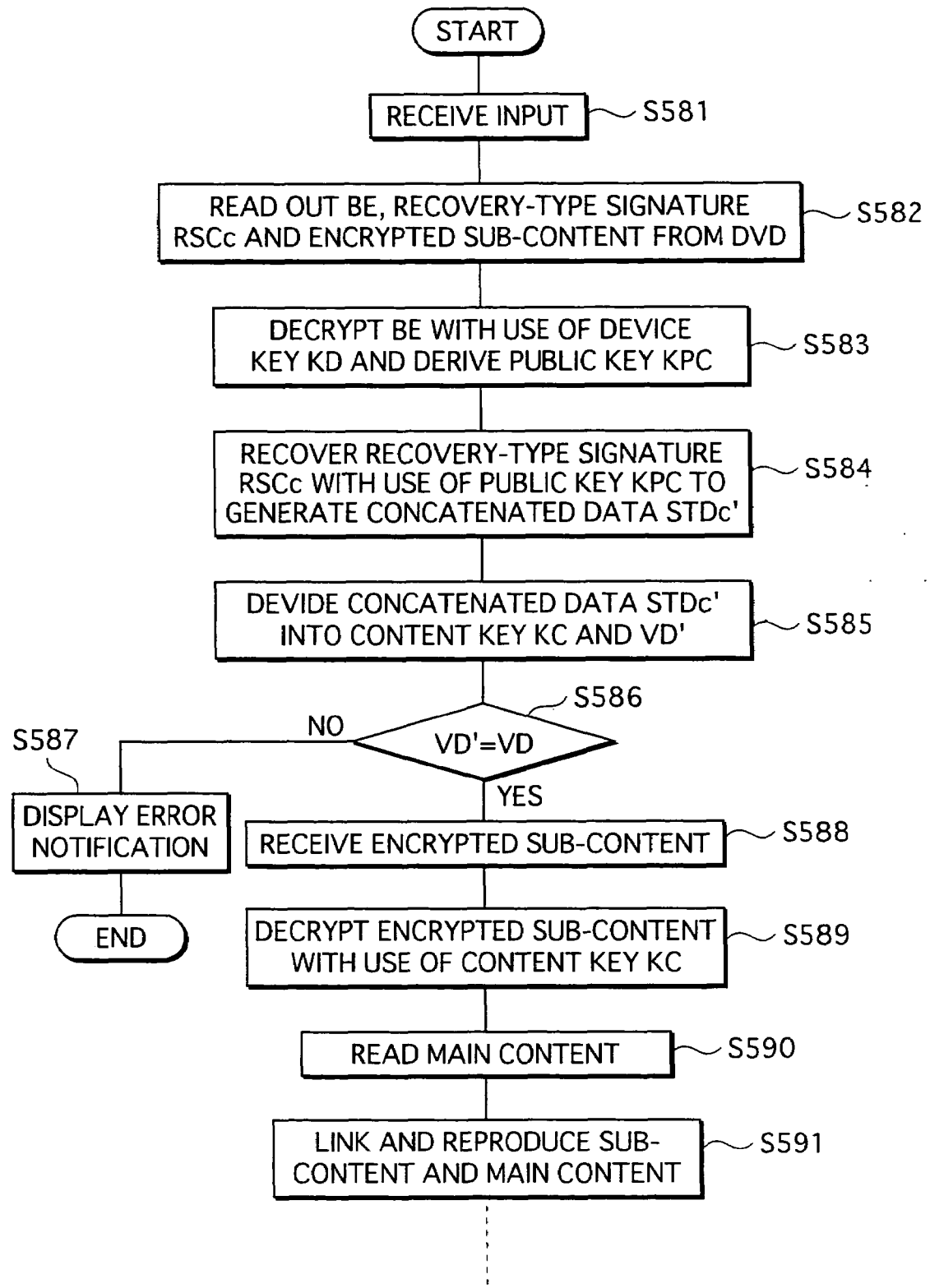
FIG. 14 is a flowchart showing operations by a recording/reproducing device 300c at a time of reproducing a sub-content.

Operations by the recording/reproducing device 300c at the time of reproducing the sub-content S are described next, with reference to FIG. 14.

After the input unit 310 receives the input instructing the reproduction of the sub-content S (step S581), the control unit 309c controls the drive unit 301 to read out the encrypted key information BE from the ROM area 410b of the DVD 400c, and read out the recovery-type signature RSCc and the encrypted sub-content ES from the RAM area 420 of the DVD 400c (Step S582).

The key decryption unit 303b reads out the device key KD from the device key storage unit 302, and decrypts encrypted key information BE with use of the read-out device key KD, to derive the public key KPC (Step S583). The key decryption unit 303b outputs the derived public key KPC to the signature recovery unit 312c.

The signature recovery unit 312c recovers the recovery-type signature RSCc with use of the public key KPC, to generate the concatenated data STDc' (Step S584). The signature recovery unit 312 outputs the generated concatenated data STDc' to the division unit 313c.

The division unit 313c divides the concatenated data STDc' to generate the content key KC and the verification data VD' (Step S585), and outputs them to the verification unit 315c.

The verification unit 315c reads out the verification data VD from the verification data storage unit 314b, and judges whether the divided verification data VD' is the same as the read-out verification data VD (Step S586). If it is not the same (NO in Step S586), the control unit 309c outputs the error notification on the monitor 307 (Step S587), and finishes the processing.

If it is the same (YES in Step S586), the verification unit 315c outputs the content key KC to the content decryption unit 305.

The content decryption unit 305 receives the encrypted sub-content ES from the drive unit 301 (Step S588), and decrypts the encrypted sub-content ES with use of the content key KC (Step S589). The content decryption unit 305 outputs the generated sub-content S to the reproducing unit 306.

The reproducing unit 306 receives the main content M that is read out by the drive unit 301 (Step S590), and links and reproduces the sub-content S and the main content M (Step S591).

The Fourth Embodiment

7. Content Recording/Reproducing System 1d

A content recording/reproducing system 1d includes a server 100d, an Internet 200, a recording/reproducing device 300d and a BD 430d.

The server 100 can write data on the BD 430d. However, once data has been written by the server 100d, the data can not be rewritten. This is the same as the ROM area 410 of the DVD 400. The recording/reproducing device can not write data on the BD 430d.

7.1 Server 100d

The server 100d records the main content M on the BD 430d. The server 100d also distributes the sub-content S to the recording/reproducing device 300d. When the content key KC, which is used at the time of distributing the sub-content S, is invalidated, the server 100d updates the content key KC, and distributes the updated content key KC to the recording/reproducing devices that are not invalidated.

Figure 15:
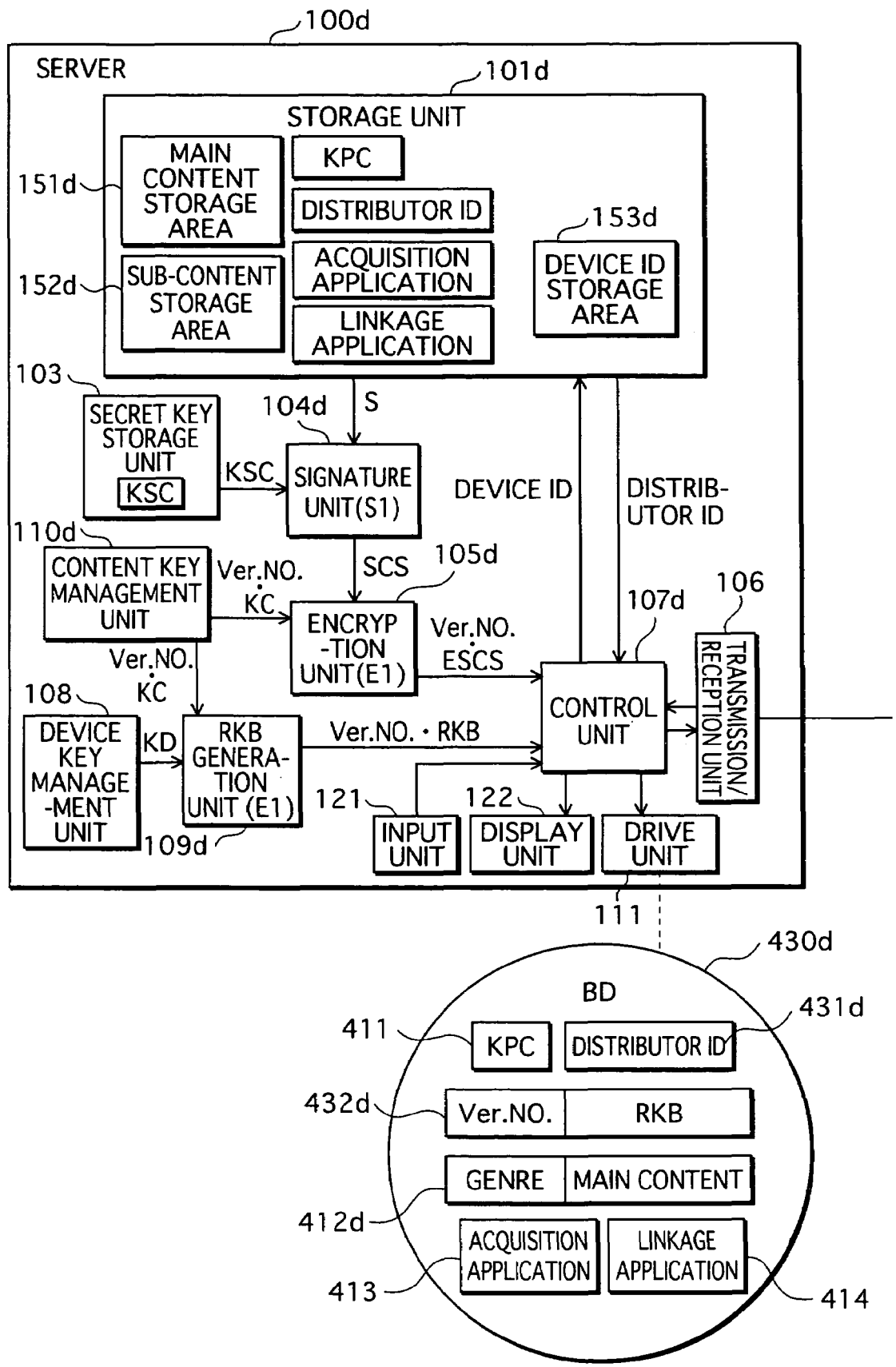
FIG. 15 shows structures of a server 100d and a BD 430d.

As illustrated in FIG. 15, the server 100d includes a storage unit 101d, a secret key storage unit 103, a signature unit 104d, an encryption unit 105d, a transmission/reception unit 106, a control unit 107d, a device key management unit 108, an RKB generation unit 109d, a content key management unit 110d, a drive unit 111, an input unit 121, and a display unit 122. The following describe the storage unit 101d, the signature unit 104d, the encryption unit 105d, the control unit 107d, the RKB generation unit 109d and the content key management unit 110d.

(1) Storage Unit 101d

The storage unit 111d stores the public key KPC, a distributor ID, the acquisition application, and the linkage application. The storage unit includes a main content storage area 151d, a sub-content storage area 152d and a device ID storage area 153d.

The distributor ID is for identifying the film company that distributes the main content M.

As illustrated in FIG. 16A, the main content storage area 151d stores pieces of the main content M in association with genre numbers, by which the main content is classified into a plurality of genres. As illustrated in FIG. 16B, the sub-content storage area 152d stores pieces of the sub-content S in association with the genre numbers. Here, the genre is used for classifying the main content according to the subject of each piece of the main content. The genre numbers are used for this classification.

The device ID storage area 153d is a storage area for storing the device ID of the recording/reproducing device that has received the sub-content S. The device ID is an identifier for identifying the recording/reproducing device.

Note that the distributor ID and the device ID may be IP addresses of the servers and the IP addresses of the recording/reproducing devices respectively, for instance.

(2) Content Key Management Unit 110d

The content key management unit 110d manages the content key KC in association with the version number.

If the content key KC is invalidated, the content key management unit 110d generates a new content key KC, and gives a version number to the new content key KC. The version numbers are given to the content keys in the order of generations.

(3) RKB Generation Unit 109d

Recording of Main Content

Under control of the control unit 107d, the RKB generation unit 109d acquires the valid content key KC and its version number from the content key management unit 110, and acquires the device key KD from the device key management unit 108.

Next, the RKB generation unit 109d encrypts the content key KC by applying the encryption algorithm E1 with use of the device key KD, and thereby generates encrypted key information RKBd. The RKB generation unit 109d gives a version number to the generated encrypted key information RKBd, and outputs the encrypted key information RKBd as RKBd with version number, to the control unit 107d.

Update of Content Key KC

For updating the content key KC, the RKB generation unit 109d acquires a new content key KC with new version number from the content key management unit 110d, and generates new encrypted key information RKBd in the same manner as described above. The RKB generation unit 109d outputs the generated new version number and the new encrypted key information RKB as encrypted key information RKB with a new version number to the control unit 107d.

(4) Signature Unit 104d

The signature unit 104d reads out the sub-content S, and reads out the secret key KSC from the secret key storage unit 103. The signature unit 104d applies the signature generation algorithm S1 to the sub-content S with use of the read-out secret key KSC, thereby generate a digital signature SCd, and then, outputs the generated digital signature SCd and the sub-content S as the sub-content with signature SCS to the encryption unit 105.

(5) Encryption Unit 105d

Receiving the sub-content with signature SCS from the signature unit 104d, the encryption unit 105d receives the content key KC with version number from the content key management unit 110. The encryption unit 105d applies the encryption algorithm E1 to the sub-content with signature SCS with use of the content key KC, to generate an encrypted sub-content with signature ESCS. The encryption unit 105d outputs the generated encrypted sub-content with signature ESCS to the control unit 107d.

(6) Control Unit 107d

Recording of Main Content

After the BD 430d is put in the drive unit 111, the control unit 107d controls the RKB generation unit 109d to generate the encrypted key information RKB, according to the input from the input unit 121.

Receiving the RKB with version number from the RKB generation unit 109d, the control unit 107d reads out the main content M associated with the genre number, the public key KPC, the distributor ID, the acquisition application and the linkage application from the storage unit 101d, and controls the drive unit 111 to write them respectively as the public key KPC411, the distributor ID 431d, the RKB with version number 432d, the main content 412d, the acquisition application 413 and the linkage application 414 into the BD 430d.

Distribution of Sub-Content

Receiving a distribution request that includes genre number via the transmission/reception unit 106, the control unit 107d selects a piece of the sub-content having the same number as the received genre number from the sub-content stored in the sub-content storage area 152d of the storage area 110d.

The control unit 107d controls the signature unit 104d to generate the digital signature SCd that corresponds to the selected sub-content S. The control unit 107d also controls the encryption unit 105d to generate the encrypted sub-content with signature ESCS, receives the generated encrypted sub-content with signature ESCS and the version number of the content key used for the encryption, and reads out the distributor ID from the storage unit 101d. Then, the control unit 107d outputs the distributor ID, the encrypted sub-content with signature ESCS, and the version number to the recording/reproducing device 300d via the transmission/reception unit 106.

Update of Content Key KC

If the content key KC is invalidated, the control unit 107d receives the encrypted key information RKB with the new version number from the RKB generation unit 109d, and reads out the distributor ID from the storage unit 101d. The control unit 107d also reads out the device ID for identifying the device that is not invalidated from the device ID storage area 153d, and transmits the encrypted key information RKB with the new version number and the distributor ID, to the recording/reproducing device that is indicated by the device ID.

7.2 BD 430d

As illustrated in FIG. 15, the BD 430d stores the public key KPC411, the main content 412d, the distributor ID 431d, the encrypted key information RKB432d, the acquisition application 413 and the linkage application 414, which are recorded by the server 100d. After such data is recorded on the BD 430d, it is to be distributed to the user.

7.3 Recording/Reproducing Device 300d

Figure 17:
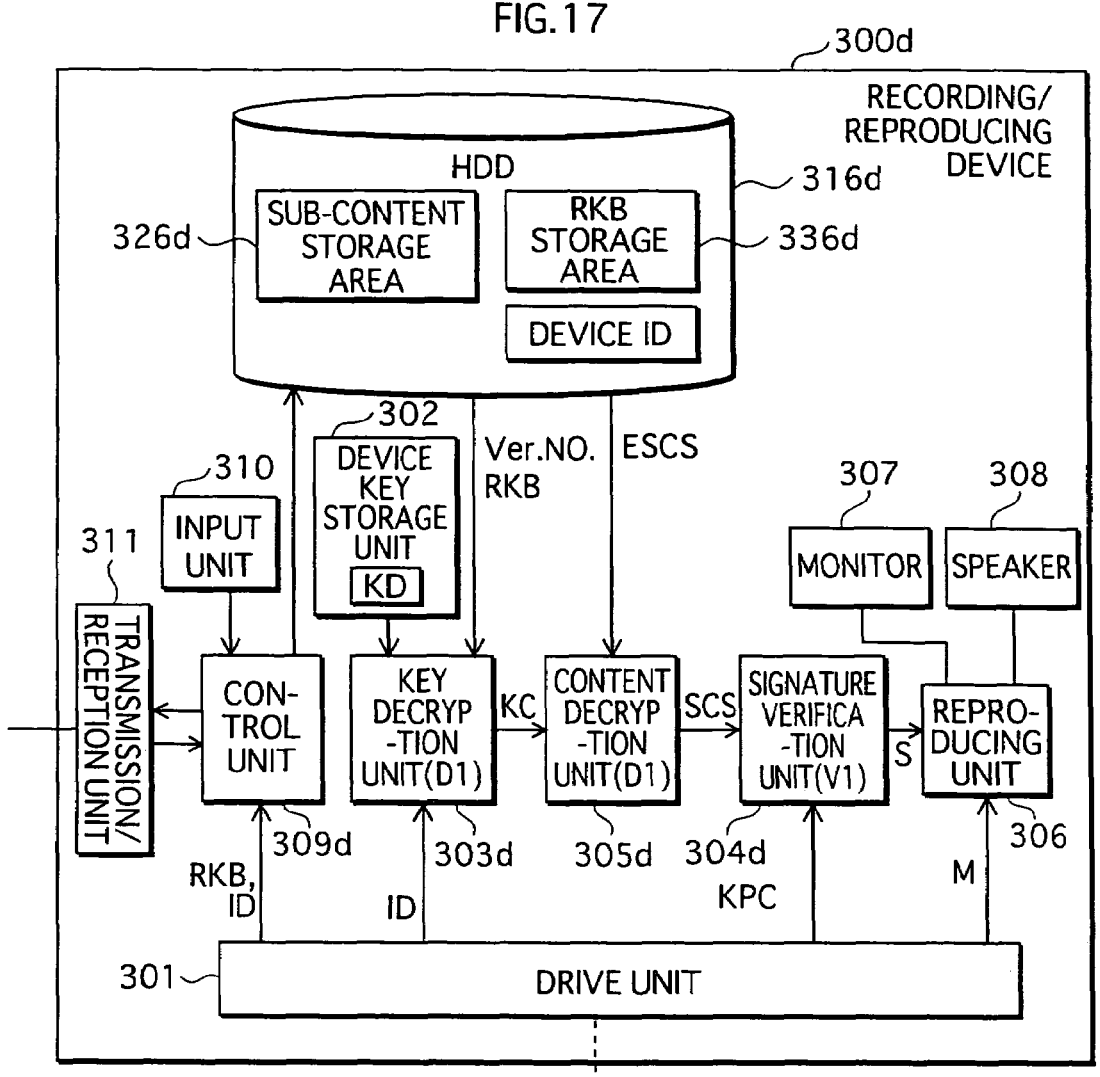
FIG. 17 shows structures of a recording/reproducing device 300d and a BD 430d.

As illustrated in FIG. 17, the recording/reproducing device 300d includes a drive unit 301, a device key storage unit 302, a key decryption unit 303d, a signature verification unit 304d, a content decryption unit 305d, a reproducing unit 306, a monitor 307, a speaker 308, a control unit 309d, an input unit 310, a transmission/reception unit 311 and an HDD 316d. The following describe the key decryption unit 303d, the signature verification unit 304d, the content decryption unit 305d, the control unit 309d and the HDD 316d.

(1) HDD 316d

The HDD 316d includes a sub-content storage area 326d and an RKB storage area 336d. The HDD 316d stores a device ID that identifies the recording/reproducing device 300d.

As illustrated in FIG. 18, the sub-content storage area 326d stores pieces of the encrypted sub-content with signature ESCS in association with the distributor IDs, and each piece of the sub-content is associated with a version number. This version number is the same as the version number of the content key KC that is used for encrypting the sub-content.

The RKB storage area 336d is used for storing the encrypted key information RKB. As illustrated in FIG. 19, the RKB storage area 336d stores pieces of the encrypted key information RKB as pieces of history information classified under the distributor IDs. Each piece of the history information includes a version number and a piece of the encrypted key information RKB, which are associated with each other.

(2) Control Unit 309d

Storage of Encrypted Key Information RKB

After the BD 430d is put in the drive unit 301, the control unit 309d reads out the distributor ID 431d and a piece of the RKB with version number 432d from the BD 430d.

The control unit 309d adds the read-out piece of the encrypted key information RKB with version number 432d to the history information in the RKB storage area 336d of the HDD 316d, by associating the version number and the piece of the encrypted key information RKB with the piece of the history information classified under the read-out distributor ID 431d. Note that if the RKB storage area 336d already stores a piece of the encrypted key information RKB having the same version number, the control unit 309d does not store the read-out piece of the encrypted key information RKB. Also, if the RKB storage area 336d does not store the history information classified under the read-out distributor ID 431d, the control unit 309d newly generates the history information and adds the information.

Acquisition of Sub-Content

While using the BD 430d, the control unit 309d reads out the version number and the acquisition application 413 from the BD 430d, and transmits the distribution request that includes the genre number, via the transmission/reception unit 311, according to the acquisition application 413. Also, after receiving the distributor ID, the encrypted sub-content with signature ESCS and the version number via the transmission/reception unit 311, the control unit 309d stores the received distributor ID, the encrypted sub-content with the signature ESCS and the version number in the sub-content storage area 326d in the HDD 316d by associating them with each other.

Reproduction of Sub-Content

After the BD 430d is put in the drive unit 301 and the control unit 309d receives the instructions for reproducing the sub-content S from the input unit 310, the control unit 309d reads out the linkage application 414 from the BD 430d. The control unit 309d performs the following processing according to the linkage application 414.

The control unit 309d controls the key decryption unit 303d to generate the content key KC.

The control unit 309d also controls the content decryption unit 305d to decrypt the encrypted sub-content with signature ESCS to generate the sub-content with signature SCS, and controls the signature verification unit 304d to verify the digital signature SCd. If the verification result received from the signature verification unit 304d is a failure, the control unit 309d displays an error notification on the monitor 307, and finishes the processing. If the verification result is a success, the control unit 309d reads out the main content M from the BD 430d according to the linkage application 414, and controls the reproducing unit 306 to link and reproduce the sub-content S and the main content M.

Storage of Encrypted Key Information RKB with New Version Number

Receiving the encrypted key information RKB with new version number and the distributor ID, the control unit 309d performs the same processing as described above, and stores them with the piece of the history information classified under the received distributor ID, by associating the new version number and the new piece of the encrypted key information RKB with the piece of the history information. If the history information classified under the received distributor ID is not stored, the control unit 309d newly generates the piece of history information classified under the received distributor ID and adds the new piece of information, in the same manner as the storage of the above-described RKB.

(3) Key Decryption Unit 303d

Under control of the control unit 309d, the key decryption unit 303d reads out the distributor ID 431d from the BD 430d. The key decryption unit 303d also reads out the device key KD from the device key storage unit 302, and reads out the version number corresponding to the distributor ID 431d from the sub-content storage area 326d of the HDD 316d.

The key decryption unit 303d also reads out the piece of encrypted key information RKB corresponding to the read-out version number from the piece of history information that is stored in the RKB storage area 336d and classified under the distributor ID 431d. Then, using the read-out device key KD, the key decryption unit 303d applies the decryption algorithm D1 to the encrypted key information RKB, and thereby generates the content key KC. The key decryption unit 303d outputs the generated content key KC and the distributor ID 431d to the content decryption unit 305d.

(4) Content Decryption Unit 305d

Receiving the content key KC and the distributor ID 431d, the content decryption unit 305d reads out the encrypted sub-content with signature ESCS corresponding to the received distributor ID 431d from the sub-content storage area 326d of the HDD 316d. Using the content key KC, the content decryption unit 305d decrypts the read-out encrypted sub-content with signature ESCS by applying the decryption algorithm D1, and thereby generates the sub-content with signature SCS. The content decryption unit 305d outputs the generated sub-content with signature SCS to the signature verification unit 304d.

(5) Signature Verification Unit 304d

Receiving the sub-content with signature SCS, the signature verification unit 304d reads out the public key KPC 411 from the BD 430d via the drive unit 301. Using the read-out KPC, the signature verification unit 304d applies the signature verification algorithm V1 to the digital signature SCd that is applied to the sub-content S, to verify the digital signature SCd.

If the verification result is a failure, the signature verification unit 304d outputs the result "failure" to the control unit 309d.

If the verification result is a success, the signature verification unit 304d continues the processing, and outputs the sub-content S to the reproducing unit 306.

Figure 20:
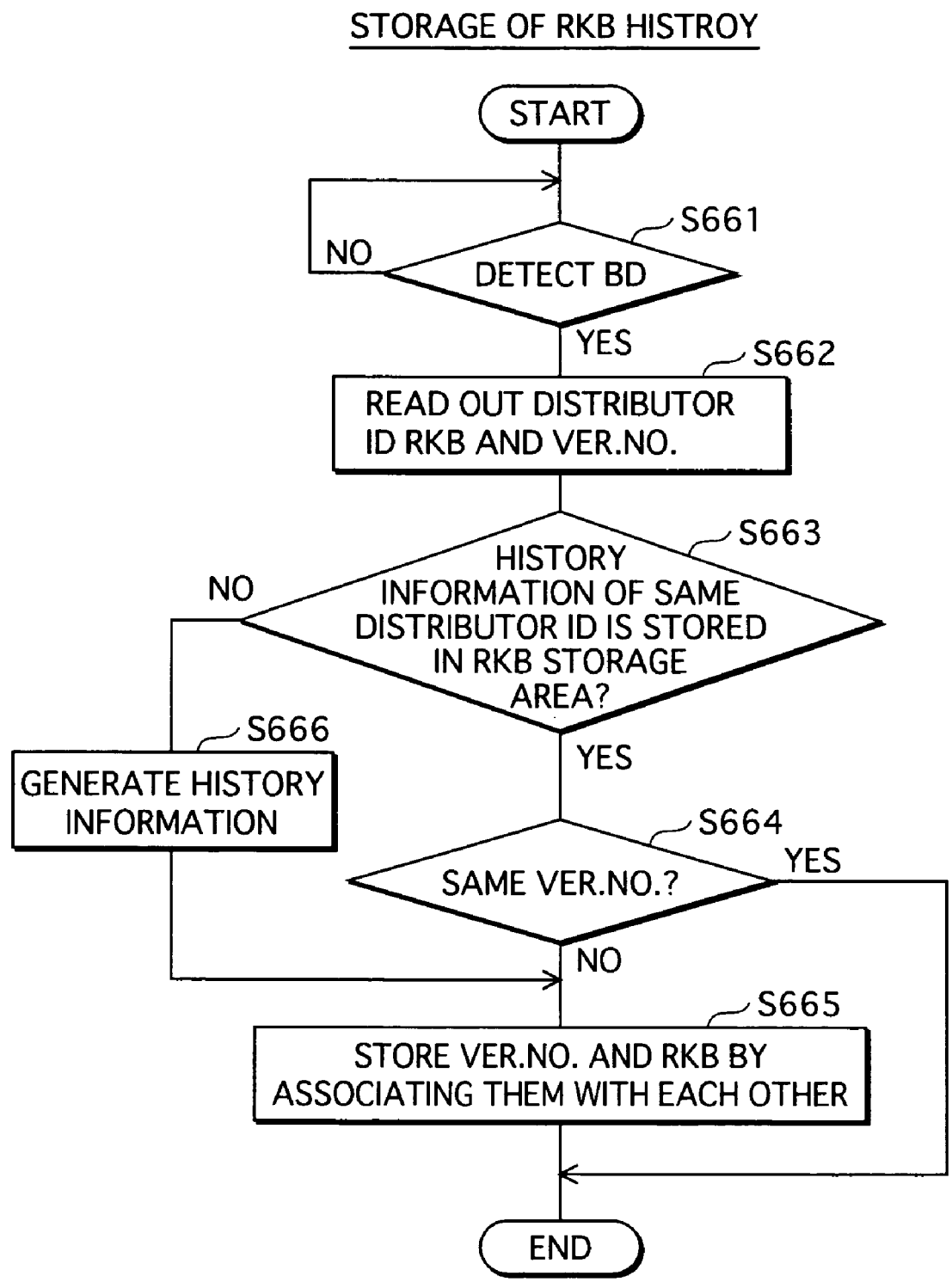
FIG. 20 is a flowchart showing operations by a recording/reproducing device 300d at a time of storing RKB history information.

8. Operations by Content Recording/Reproducing System 1d 8.1 Storage of RKB History The operations by the recording/reproducing device 300d for storing the encrypted key information RKB are described next, with reference to FIG. 20.

The control unit 309d judges whether the drive unit 301 detects the BD 430d (Step S661). If not (NO in step S661), the control unit 309d stands by. If the drive unit 301 detects the BD 430d (Yes in Step S661), the control unit 309d reads out the distributor ID 431d and the RKB with version number 432d from the BD 430d (Step S662).

The control unit 309d judges whether the piece of the history information classified under the same distributor ID 431d is already stored in the RKB storage area 336d of the HDD 316d (Step S663). If it is stored (YES in step S663), the control unit 309d judges whether the piece of the encrypted key information RKB having the same version number as the read-out version number is already stored (Step S664). If it is stored (YES in Step S664), the control unit 309d finishes the processing.

If the piece of the encrypted key information RKB having the same version number as the read-out version number is not stored (NO in Step S664), the control unit 309d stores the version number and the piece of the read-out encrypted key information RKB by associating them with each other (Step S665). If the piece of the history information classified under the same distributor ID 431d is not stored (No in Step S663), the control unit 309d generates the piece of the history information classified under the read-out distributor ID (Step S666), stores the version number and the read-out piece of the encrypted key information RKB by associating them with each other (Step S665), and finishes the processing.

Note that when the control unit 309d receives the piece of the encrypted key information RKB with new version number, the control unit 309d performs the above-described Steps 663 to 665.

8.2 Operations for Distributing Sub-content

Figure 21:
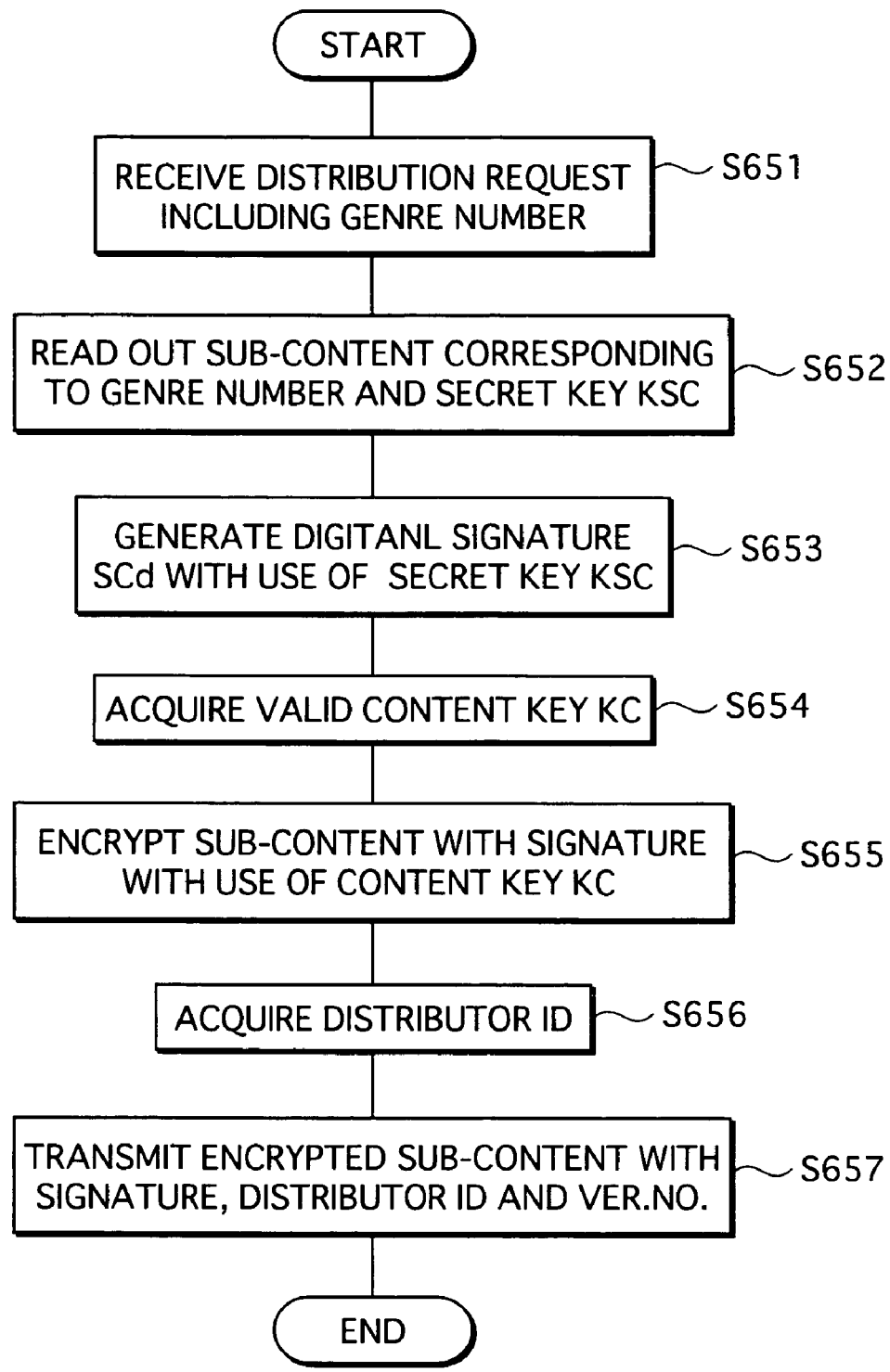
FIG. 21 is a flowchart showing operations by a server 100d at a time of distributing a sub-content.

Operations by the server 100d at the time of distributing the sub-content S are described next, with reference to FIG. 21.

Receiving the distribution request that includes genre number (Step S651), the signature unit 104d reads out the piece of the sub-content S corresponding to the received genre number, from the storage unit 101d. The signature unit 104d also reads out the secret key KSC from the secret key storage unit 103 (Step S652). Using the read-out secret key KSC, the signature unit 104d generates the digital signature SCd corresponding to the piece of the sub-content S (Step S653), and outputs the piece of the sub-content S with the generated digital signature SCd as the sub-content with signature SCS to the encryption unit 105d.

Receiving the sub-content with signature SCS from the signature unit 104d, the encryption unit 105d acquires the valid content key KC and the version number from the content key management unit 110d (Step S654). Using the acquired content key KC, the encryption unit 105d encrypts the sub-content with signature SCS to generate the encrypted sub-content with signature ESCS (Step S655). The encryption unit 105d outputs the generated encrypted sub-content with signature ESCS and the version number to the control unit 107d.

The control unit 107d reads out the distributor ID form the storage unit 101d (Step S656), transmits the read-out distributor ID, the encrypted sub-content with signature ESCS and the version number to the recording/reproducing device 300d via the transmission/reception unit 106d (Step S657), and finishes the processing.

8.3 Reproduction of Sub-Content

Figure 22:
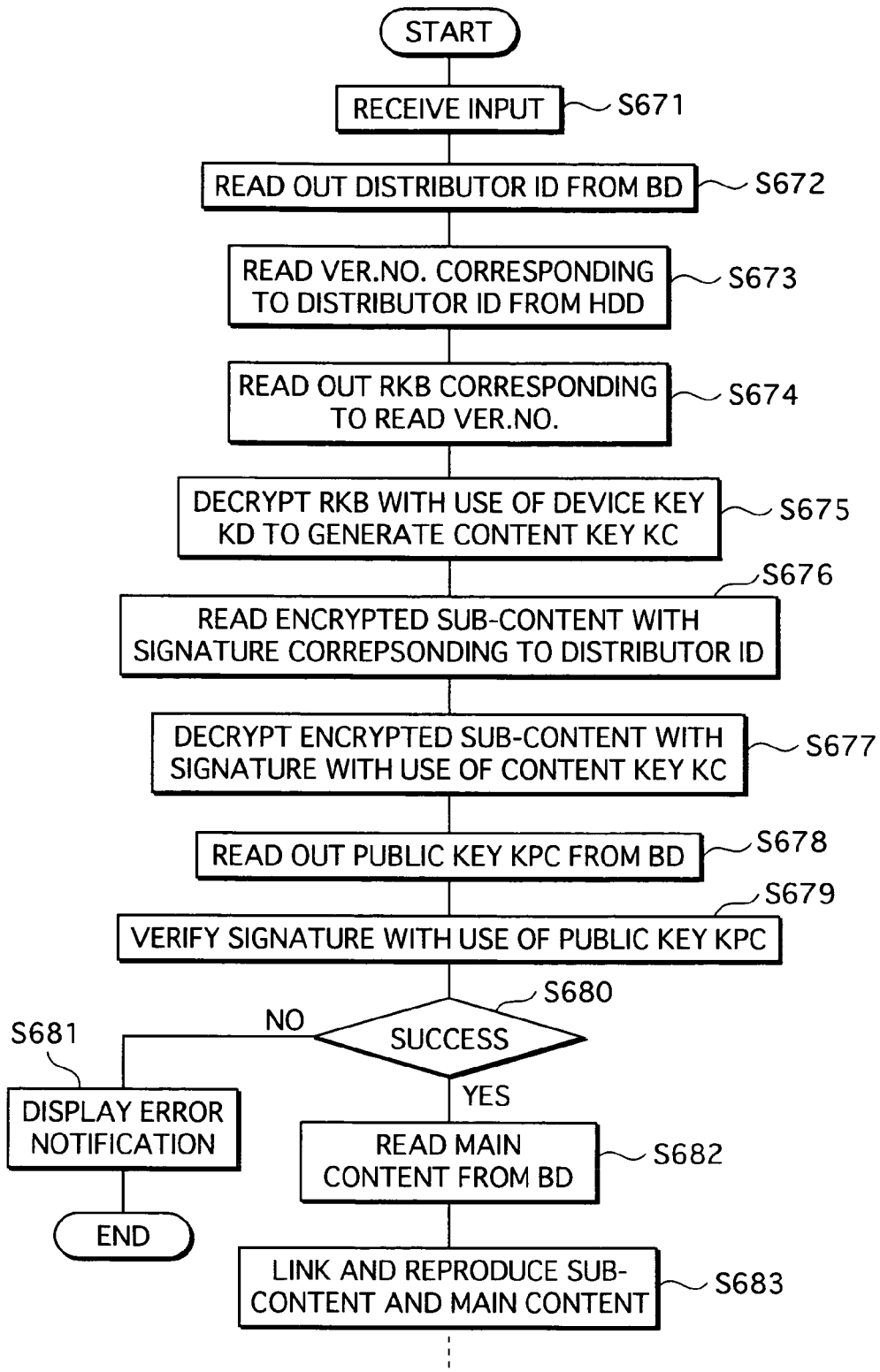
FIG. 22 is a flowchart showing operations by a recording/reproducing device 300d at a time of reproducing a sub-content.

Operations by the recording/reproducing device 300d at the time of reproducing the sub-content S are described next, with reference to FIG. 22.

Receiving the instructions for reproducing the sub-content S from the input unit 310 (Step S671), the key decryption unit 303d reads out the distributor ID 431d from the BD 430d (Step S672), and reads out the version number of the encrypted sub-content with signature ESCS corresponding to the distributor ID 431d from the sub-content storage area 326d (Step S673). The key decryption unit 303d also reads out the piece of the encrypted key information RKB corresponding to the read-out version number from the piece of the history information that is classified under the distributor ID 431d and stored in the RKB storage area 336d (Step S674). The key decryption unit 303d also reads out the device key KD from the device key storage unit 302, and decrypts the piece of encrypted key information RKB with use of the device key KD, to generate the content key KC (Step S675). The key decryption unit 303d outputs the generated content key KC and the distributor ID 431d to the content decryption unit 305d.

Receiving the content key KC and the distributor ID 431d, the content decryption unit 305d reads out the piece of the encrypted sub-content with signature ESCS corresponding to the distributor ID 431d, from the HDD 316d (Step S676). The content decryption unit 305d decrypts the piece of the encrypted sub-content with signature ESCS with use of the received content key KC, to generate the sub-content with signature SCS (Step S677). Then, the content decryption unit 305d outputs the generated sub-content SCS to the signature verification unit 304d.

Receiving the sub-content with signature SCS, the signature verification unit 304d reads out the public key KPC from the BD 430d (Step S678), and verifies the digital signature SCd applied to the sub-content S with use of the public key KPC (Step S679). If the verification result is a failure (NO in Step S680), the signature verification unit 304d outputs the verification result to the control unit 309d, and the control unit 309d displays an error notification on the monitor 307 (Step S681), and finishes the processing. If the verification result is a success (YES in Step S680), the control unit 309d continues the processing. In this case, the signature verification unit 304d outputs the sub-content S to the reproducing unit 306.

The reproducing unit 306 reads the main content M (Step S682), and links and reproduces the sub-content S and the main content M (Step S683).

The Fifth Embodiment

In the first to fourth embodiments, any piece of a sub-content, with the main content distributed by the same film company, can be reproduced with use of the same content key as long as the signature verification result is a success. However, the fifth embodiment allows only a piece of a sub-content S corresponding to the main content M recorded on the BD to be reproduced.

9. Content Recording/Reproducing System 1e

The content recording/reproducing system 1e includes a server 100e, an Internet 200, a recording/reproducing device 300e, and a BD 430e.

9.1 Server 100e

Figure 23:
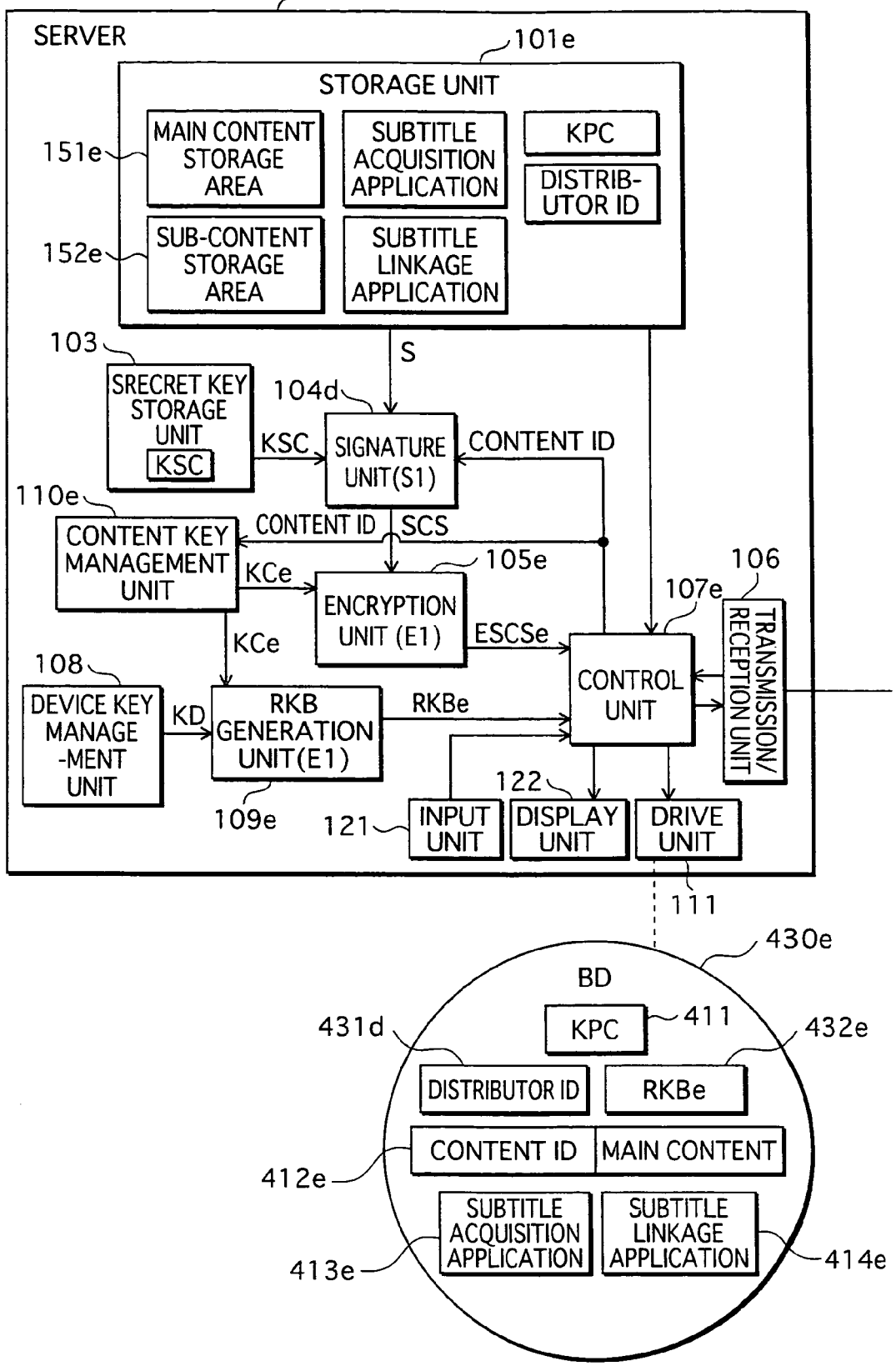
FIG. 23 shows structures of a server 100e and a BD 430e.

As illustrated in FIG. 23, the server 100e includes a storage unit 101e, a secret key storage unit 103, a signature unit 104d, an encryption unit 105e, a transmission/reception unit 106, a control unit 107e, a device key management unit 108, an RKB generation unit 109e, a content key management unit 110e, a drive unit 111, an input unit 121, and a display unit 122. The following describe the storage unit 101e, the encryption unit 105e, the control unit 107e, the RKB generation unit 109e, and the content key management unit 110e.

(1) Storage Unit 101e

The storage unit 101e stores the distributor ID, the public key KPC, a subtitle acquisition application, and a subtitle linkage application. The storage unit 101e includes the main content storage area 151 and the sub-content storage area 152e.

As illustrated in FIG. 24A, the main content storage area 151e stores pieces of the main content and content IDs, which are associated with each other on a one-to-one basis. The content ID is used for identifying each piece of the main content.

The sub-content storage area 152e stores pieces of the sub-content and the content IDs, which are associated with each other on a one-to-one basis. Here, the sub-content is a subtitle data of the corresponding main content.

The subtitle acquisition application is application software used by the recording/reproducing device for acquiring the sub-content S that corresponds to the main content M that is to be written into the BD 430e. The subtitle linkage application is application software used by the recording/reproducing device for linking and reproducing the sub-content S that is the subtitle data and the main content M.

(2) Content Key Management Unit 110e

As illustrated in FIG. 25, the content key management unit 110e stores the content IDs and exclusive content keys, which are associated with each other on a one-to-one basis. These content IDs are the same as the content IDs for identifying the pieces of the main content. The exclusive content key KCe is used for encrypting the piece of the sub-content relating to the main content corresponding to the exclusive content key KCe, and it is not shared by other pieces of the sub-content.

At the time of recording the main content M, the content key management unit 110e selects the exclusive content key KCe corresponding to the content ID for identifying the main content M that is to be recorded on the BD 430e. The content key management unit 110e outputs the selected exclusive content key KCe to the RKB generation unit 109e.

At the time of distributing the sub-content S, the content key management unit 110e selects the exclusive content key KCe corresponding to the content ID that is included in the received distribution request, and outputs the selected exclusive content key KCe to the encryption unit 105e.

(3) RKB Generation Unit 109e

Receiving the exclusive content key KCe from the content key management unit 110e, the RKB generation unit 109e receives the device key KD that is stored in the authorized devices from the device key management unit 108, and applies the encryption algorithm E1 to the exclusive content key KCe with use of the received device key KD, to generate the encrypted key information RKBe. The RKB generation unit 109e outputs the generated encrypted key information RKBe to the control unit 107e.

(4) Encryption Unit 105e

Receiving the exclusive content key KCe from the content key management unit 110e and receiving the sub-content with signature SCS from the signature unit 104d, the encryption unit 105e encrypts the sub-content with signature SCS by applying the encryption algorithm E1 with use of the exclusive content key KCe, to generate an encrypted sub-content with signature ESCSe. Then the encryption unit 105e outputs the generated encrypted sub-content with signature ESCSe to the control unit 107e.

(5) Control Unit 107e

Recording of Main Content

At the time of recording the main content M, the control unit 107e controls the RKB generation unit 109e to generate the encrypted key information RKBe. The control unit 107e also controls the encryption unit 105e to generate the encrypted sub-content with signature ESCSe. The control unit 107e also reads out the distributor ID, the public key KPC, the subtitle acquisition application, the subtitle linkage application, and the selected main content M and the content ID from the storage unit 101e, and write them into the BD 430e.

Distribution of Sub-Content

Receiving the distribution request that includes the distributor ID and the content ID from the recording/reproducing device 300e, the control unit 107e judges whether the received distributor ID is the same as the stored distributor ID. If not, the control unit 107e transmits a notification representing that the distribution of the sub-content S is not permitted, and finishes the processing.

If the IDs are the same, the control unit 107e selects the sub-content S corresponding to the content ID received from the sub-content storage area 152e, and controls the signature unit 104d to generate the digital signature SC. The control unit 107e also controls the encryption unit 105e to generate the encrypted sub-content with signature ESCS. Then, the control unit 107e reads out the distributor ID from the storage unit 101e, and transmits the distributor ID, the content ID, and the encrypted sub-content with signature ESCS to the recording/reproducing device.

9.2 BD 430e

BD 430e stores the main content M412e in which the main content M is associated with the content ID, the public key KPC411, the distributor ID 431e, the RKBe423e, the subtitle acquisition application 413, and the subtitle linkage application 414e, which are recorded by the server 100e. After being recorded such data, the BD 430e is to be distributed to the user.

9.3 Recording/Reproducing Device 300e

As illustrated in FIG. 26, the recording/reproducing device 300e includes a drive unit 301, a device key storage unit 302, a key decryption unit 303e, a signature verification unit 304d, a content decryption unit 305e, a reproducing unit 306, a monitor 307, a speaker 308, a control unit 309e, an input unit 310, a transmission/reception unit 311, and storage unit 316e. The key decryption unit 303e, the content decryption unit 305e, the control unit 309e, and the storage unit 316e are described next.

(1) Storage Unit 316e

Figure 27:
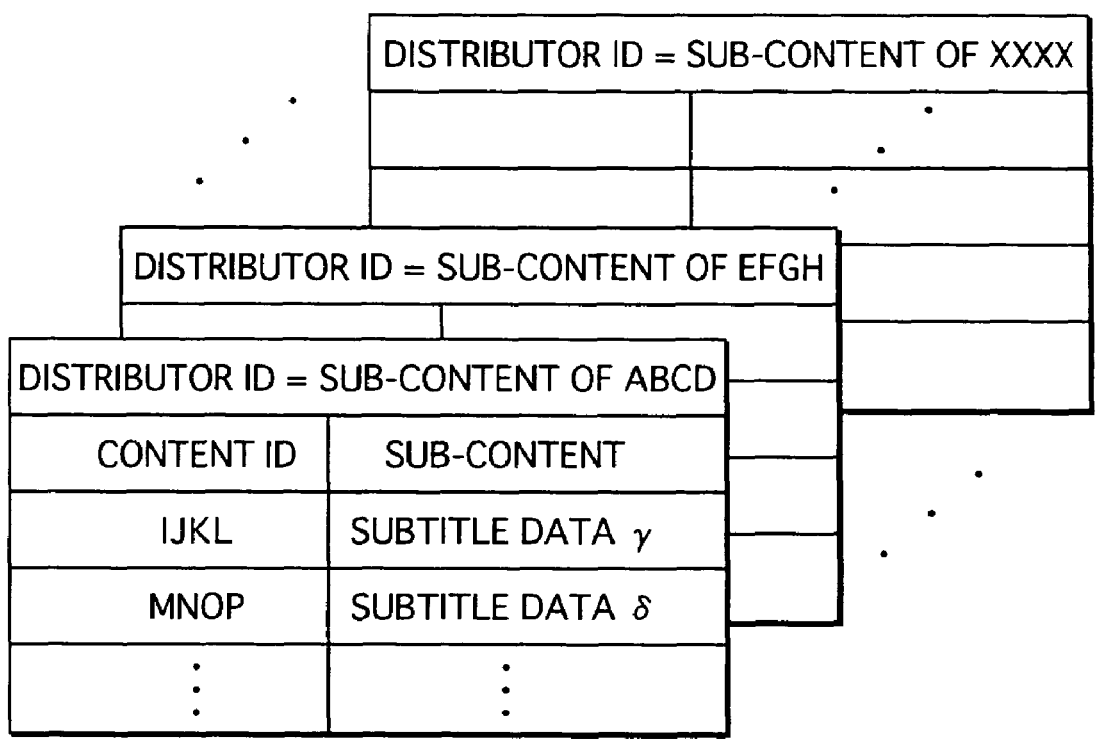
FIG. 27 shows a structure of a sub-content that is to be stored in a HDD 316e.

The storage unit 316e includes a sub-content storage area 326e. As illustrated in FIG. 27, the storage unit 326e stores each piece of the sub-content in a corresponding storage area according to its distributor ID. Each of the storage areas, which is classified under the distributor ID, stores the content ID and the encrypted sub-content with signature ESCSe by associating them with each other.

(2) Key Decryption Unit 303e

Under control of the control unit 107e, the key decryption unit 303e reads out the encryption key information RKBe from the BD 430e, and reads out the device key KD from the device key storage unit 302. The key decryption unit 303e decrypts the encrypted key information RKBe by applying the decryption algorithm D1 with use of the read-out device key KD, to generate the exclusive content key KCe. The key decryption unit 303e outputs the generated exclusive content key KCe to the content decryption unit 305e.

(3) Content Decryption Unit 305e

Receiving the exclusive content key KCe from the key decryption unit 303e, the content decryption unit 305e reads the content ID from the BD 430e and reads out the encrypted sub-content with signature ESCSe that corresponds to the content ID read out from the HDD 316e. The content decryption unit 305e decrypts the read-out encrypted sub-content with signature ESCSe by applying the decryption algorithm D1 with use of the exclusive content key KCe, to generate the sub-content with signature SCS. The content decryption unit 305e outputs the generated sub-content with signature SCS to the signature verification unit 304d.

(4) Control Unit 309e

Acquisition of Sub-Content

After the BD 430e is put in the drive unit 301, the control unit 309e reads out the subtitle acquisition application 413e from the BD 430e, reads out the distributor ID and content ID from the BD 430e according to the subtitle acquisition application 413e, and transmits the distribution request that includes the distributor ID and the content ID to the server 100e via the transmission/reception unit 311. After receiving the encrypted sub-content with signature ESCSe, to which the distributor ID and the content ID are given, via the transmission/reception unit 311, the control unit 309e stores the content ID and the encrypted sub-content ESCSe in the storage area that is included in the sub-content storage area and classified under the received distributor ID, by associating the content ID and the encrypted sub-content with each other.

Reproduction of Sub-Content

After the BD 430e is put in the drive unit 301 and the control unit 309e receives the instructions for reproducing the main content M, the control unit 390e reads out the subtitle linkage application 414e from the BD 430e. According to the subtitle linkage application 414e. The control unit 309e controls the drive unit 301 to read out the distributor ID 431e, encrypted key information RKBe432e, the public key KPC411, and the main content 412e that is associated with the content ID, from the BD 430e.

The control unit 309e performs the same processing as the fourth embodiment, if the verification result received from the signature verification unit 304d is "failure", the control unit 309e displays the error notification on the monitor 307, and finishes the processing. If the verification result is a success, the control unit 309e controls the reproducing unit 306 to read the main content M, and link and reproduce the sub-content S and the main content M according to the subtitle linkage application 414e.

10. Operations by Content Recording/Reproducing System 1e

10.1 Distribution of Sub-Content

Figure 28:
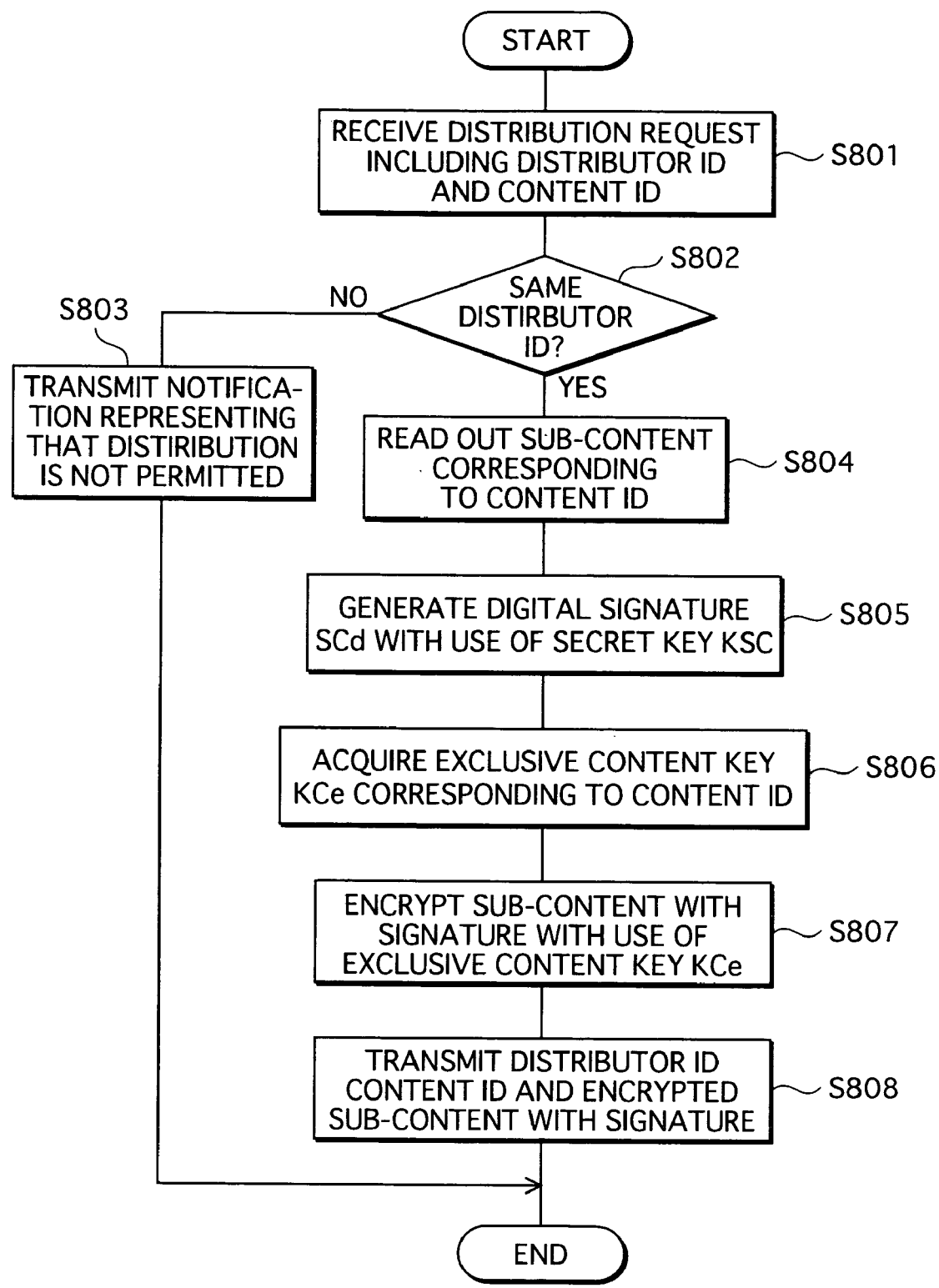
FIG. 28 is a flowchart showing operations by a server 100e at a time of distributing a sub-content.

Operations by the server 100e for distributing the sub-content S is described next, with reference to FIG. 28.

Receiving the distribution request that includes the distributor ID and the content ID from the recording/reproducing device 300e (Step S801), the control unit 107e judges whether the received distributor ID is the same as the stored distributor ID (Step S802). If not, the control unit 107e transmits the notification representing that the distribution of the sub-content is not permitted (Step S803), and finishes the processing. If it is the same, the control unit 107e outputs the received content ID to the signature unit 104d and the content key management unit 110e.

The signature unit 104 reads out the sub-content S that corresponds to the received content ID from the storage unit 101e (Step S804), and reads out the secret key KSC from the secret key storage unit 103. The signature unit 104 generates the digital signature SCd corresponding to the sub-content S with use of the read-out secret key KSC (Step S805), and outputs the sub-content S with the digital signature SCd to the encryption unit 105e.

The content key management unit 110e receives the content ID from the control unit 107e, and selects the exclusive content key KCe that corresponds to the received content ID. Then, the content key management unit 110e outputs the selected exclusive content key KCe to the encryption unit 105e.

Receiving the sub-content with signature SCS from the signature unit 104, the encryption unit 105e acquires the exclusive content key KCe from the content key management unit 110e (Step S806), and encrypts the sub-content with signature SCS with use of the exclusive content key KCe, to generate the encrypted sub-content with signature ESCSe (Step S807). The encryption unit 105e outputs the generated encrypted sub-content with signature ESCSe to the control unit 107e.

The control unit 107e reads out the distributor ID from the storage unit 101e, and after receiving the encrypted sub-content with signature ESCSe from the encryption unit 105e, the control unit 107e transmits the distributor ID, the content ID and the encrypted sub-content with signature ESCSe to the recording/reproducing device 300e via the transmission/reception unit 106 (Step S808).

10.2 Reproduction of Sub-Content

Figure 29:
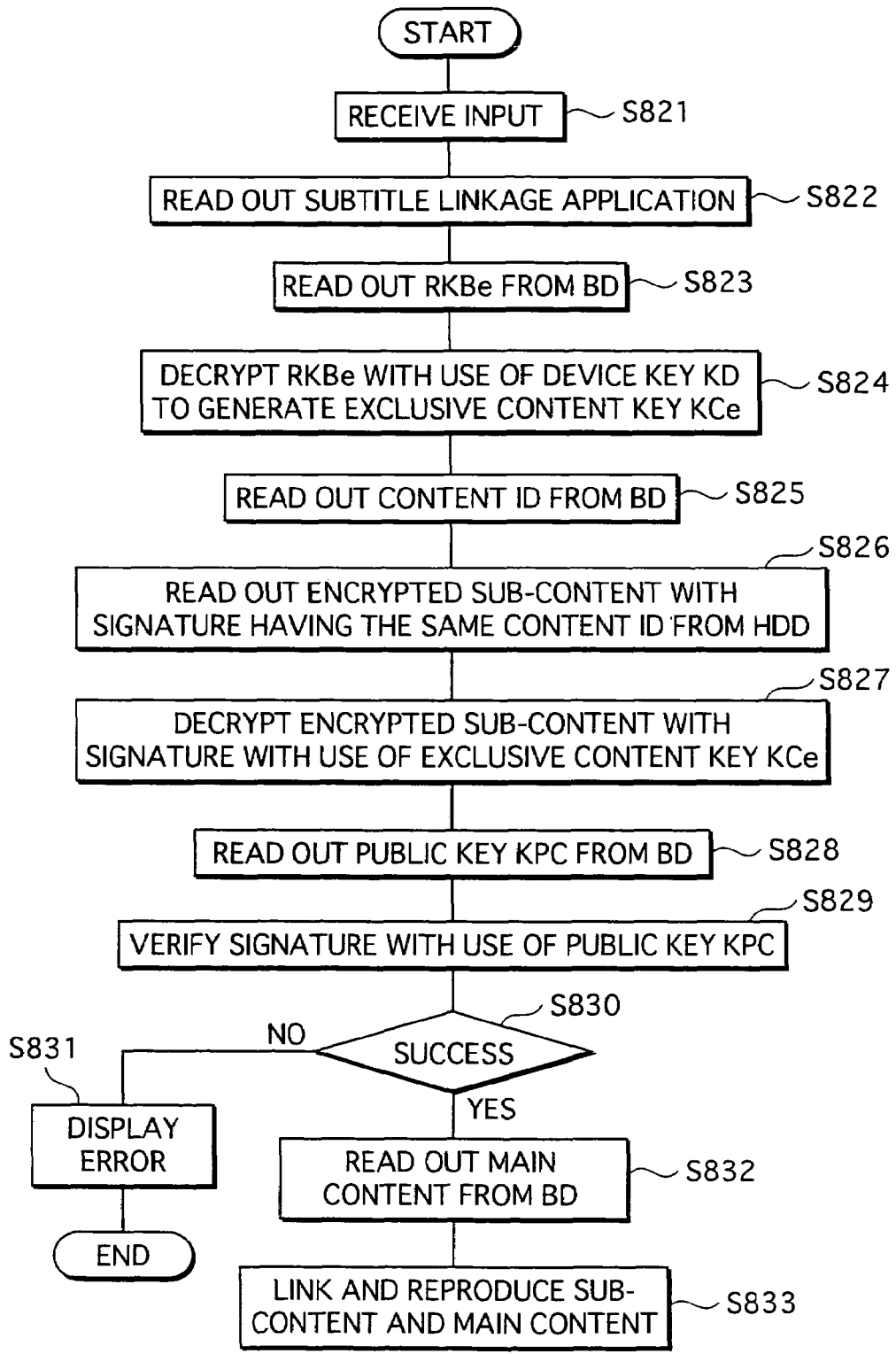
FIG. 29 is a flowchart showing operations by a recording/reproducing device 300e at a time of reproducing a sub-content.

The reproduction of the sub-content S is described next with reference to FIG. 29.

After the BD 430e is mounted and the control unit 309e receives the instructions for reproducing the sub-content S from the input unit 310 (Step S821), the control unit 309e reads out the subtitle linkage application 414e from the BD 430e (Step S822), and performs the linkage and the reproduction according to the subtitle linkage application 414e.

The key decryption unit 303e reads out the encrypted key information RKBe from the BD 430e (Step S823), and reads out the device key KD from the device key storage unit 302. The key decryption unit 303e decrypts the RKBe432e with use of the read-out device key KD, to generate the exclusive content key KCe (Step S824). The key decryption unit 303e outputs the generated exclusive content key KCe to the content decryption unit 305e.

The content decryption unit 305e reads out the content ID from the BD 430e (Step S825), reads out the encrypted sub-content ESCSe that corresponds to the read-out distributor ID and content ID from the HDD 316e (Step S826), and decrypts the encrypted sub-content with signature ESCSe with use of the exclusive content key KCe, to generate the sub-content with signature SCS (Step S827). The content decryption unit 305e outputs the generated sub-content with signature SCS to the signature verification unit 304d.

The signature verification unit 304d reads out the public key KPC411 from the BD 430e (Step S828), and verifies the digital signature SCd with use of the public key KPC (Step S829). If the verification result is a failure (NO in Step S830), the signature verification unit 304d outputs the verification result to the control unit 309e. Receiving the verification result that represents the failure, the control unit 309e displays the error notification on the monitor 307 (Step S831), and finishes the processing.

If the verification result is a success (YES in Step S830), the signature verification unit 304d continues the processing. The signature verification unit outputs the sub-content S to the reproducing unit 306.

The reproducing unit 306 reads out the main content M412 (Step S832), overlays the sub-content S that is subtitle data to the main content M, and links and reproduces the content according to the subtitle linkage application (Step S833).

The Sixth Embodiment

In the sixth embodiment, the basic structure of the present invention is described. The already described components in the first to fifth embodiments are not to be described here.

11. Content Recording/Reproducing System 1f

The content recording/reproducing system 1f includes a server 100f, an Internet 200, a recording/reproducing device 300f, and a DVD 400f.

11.1 Structure of Server 100f

Figure 30:
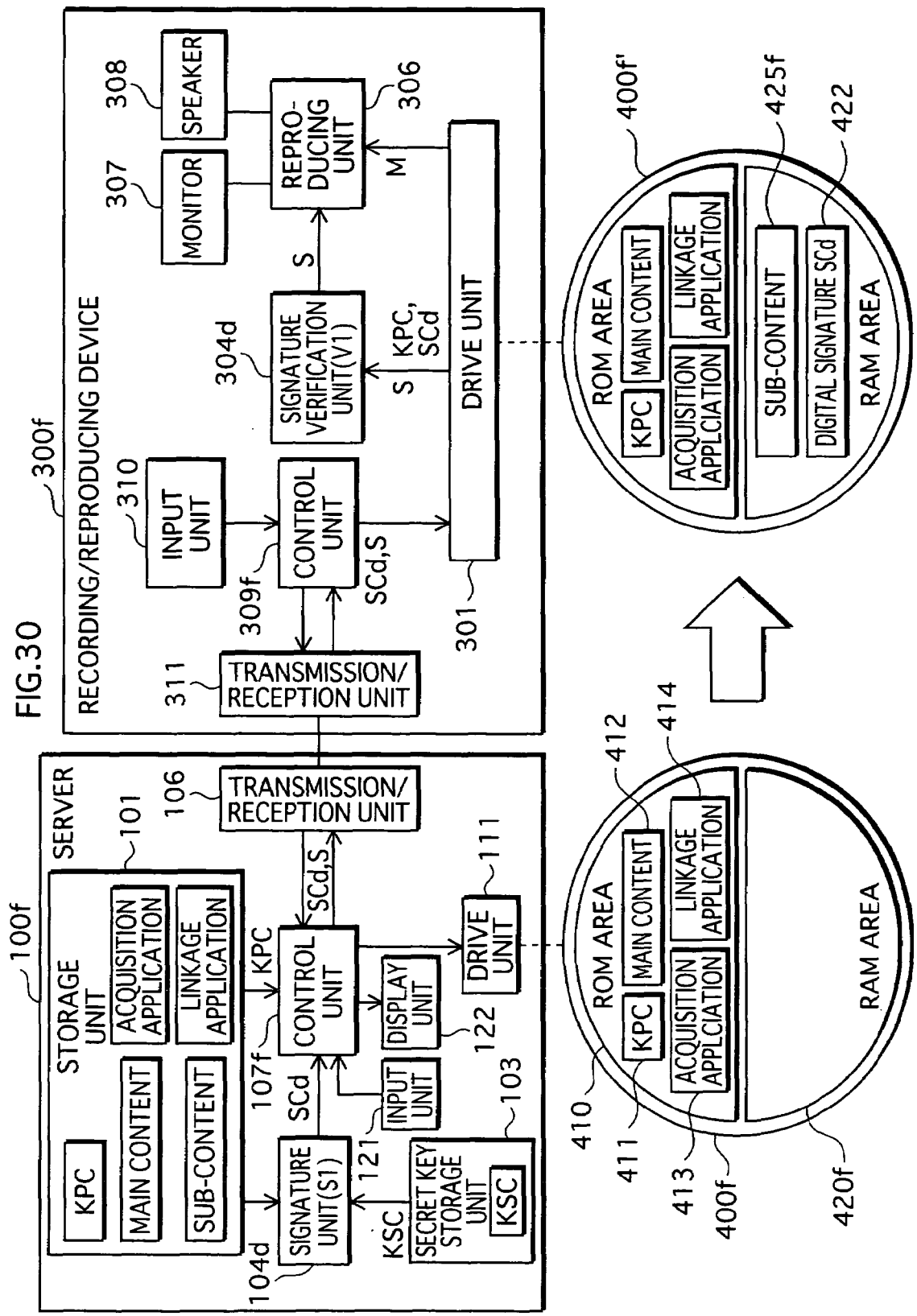
FIG. 30 shows structures of a server 100d, a recording/reproducing device 300d, and a DVD 400f.

As illustrated in FIG. 30, the server 100f includes a storage unit 101, a secret key storage unit 103, a signature unit 104d, a transmission/reception unit 106, a control unit 107f, an input unit 121, and a display unit 122. The control unit 107f is described next.

(1) Control Unit 107f

The control unit 107f writes the main content M into the ROM area 410 in the same manner as the control unit 107f.

After receiving the distribution request from the recording/reproducing device 300f via the transmission/reception unit 106, the control unit 107f also controls the signature unit 104d to generate the digital signature SCd. Also, receiving the generated digital signature SCd, the control unit 107f transmits the sub-content S and the digital signature SCd to the recording/reproducing device 300f via the transmission/reception unit 106.

11.2 Recording/Reproducing Device 300f

As illustrated in FIG. 30, the recording/reproducing device 300f includes a drive unit 301, a signature verification unit 304d, a reproducing unit 306, a monitor 307, a speaker 308, a control unit 309f, an input unit 310 and a transmission/reception unit 311. The control unit 309f is described next.

(1) Control Unit 309f

The control unit 309f transmits the distribution request via the transmission/reception unit 311, and after receiving the sub-content S and the digital signature SCd, the control unit 309f controls the drive unit 301 to write the received sub-content S and the digital signature SCd to the RAM area 420f of the DVD 400f.

Receiving the instructions for reproducing the sub-content S from the input unit 310, the control unit 309f controls the drive unit 301 to read out the public key KPC from the ROM area 410 of the DVD 400f and read out the digital signature SCd and the sub-content S from the RAM area 420f of the DVD 400f.

The drive unit 301 outputs the read-out public key KPC, digital signature SCd and sub-content S to the signature verification unit 304d.

12. Operations by the Content Recording/Reproducing System 1d

12.1 Distribution of Sub-Content

The operations by the server 100d for distributing the sub-content S is described next.

Receiving the distribution request, the signature unit 104d generates the digital signature SCd in the same manner as the fourth embodiment. The signature unit 104d outputs the generated digital signature SCd and the sub-content S to the control unit 107f. The control unit 107f transmits the digital signature SCd and the sub-content S to the recording/reproducing device 300f.

12.2 Reproduction of Sub-Content

The reproduction of the sub-content S is described next.

Receiving the instructions for reproducing the sub-content S from the input unit 310, the control unit 309f controls the drive unit 301 to read out the public key KPC from the ROM area 410 of the DVD 400f and readout the digital signature SCd and the sub-content S from the RAM area 420 of the DVD 400f. The drive unit 301 outputs the read-out public key KPC, the digital signature SCd, and the sub-content S to the signature verification unit 304d.

The signature verification unit 304d verifies the digital signature SC with use of the public key KPC and the sub-content S. If the verification result is a failure, the signature verification unit outputs the verification result to the control unit 309f. The control unit 309f displays the error notification on the monitor 307, and finishes the processing. If the verification result is a success, the signature verification unit 304d outputs the sub-content S to the reproducing unit 306.

The reproducing unit 306 reads the main content M and links and reproduces the sub-content S and the main content M.

13. Modifications

Although the present invention is describe based on the embodiments above, the present invention is not limited to those, as a matter of course. The following modifications are included in the present invention.

(1) In the first embodiment, the data subjected to the digital signature is the data generated by concatenating the encrypted key information RKB and the content key KC. Any data is acceptable as long as the data includes at least the encrypted key information RKB or the content key KC or a portion of the sub-content S. Also, two or more out of the encrypted key information RKB and the content key KC and the portion of the sub-content S may be bit-concatenated to be the data subjected to the digital signature.

In the fourth and fifth embodiments, the sub-content with signature SCS is encrypted to be the encrypted sub-content with signature ESCS. However, it is acceptable if at least the sub-content S is encrypted.

(2) In the first to third embodiments and in the sixth embodiment, the sub-content S or the encrypted sub-content ES is recorded in the RAM area of the DVD. However, it may be recorded on a CD, a hard disk, or an optical disc such as a BD. Also, it may be recorded on card media, such as an IC card and a memory card, or tape media.

In the fourth and fifth embodiments, the sub-content is recorded on the HDD. However, it may be recorded on other portable recording media such as a memory card.

(3) In the embodiments, the recording/reproducing device acquires the sub-content S and records it on the DVD or BD. However, a recording device other than the recording/reproducing device may record the sub-content S. In this case, the recording device may belong to the user, or may be set up in DVD and CD shops and convenience stores and so on.

Also, the recording/reproducing device, the recording device, or a PC may be used for acquiring the sub-content. The acquired sub-content may be recorded on a memory card and so on as a bridge medium, which is to be reproduced by other devices such as a mobile player.

(4) Just as in the fourth embodiment, in the case where the recording/reproducing device reproduces the sub-content S that is recorded on the memory card by other devices and where the recording/reproducing device manages the content key with use of the version number, the recording/reproducing device may reproduce only the sub-content having the version number that is recorded on the HDD of the recording/reproducing device or a medium such as a BD.

Also, the history information of the RKB recorded in the external memory card may be synchronized with history information of the RKB recorded in the HDD.

In the embodiments, the main content M is written by the distributing device. However, the main content M may be written by other devices. Also, the distribution device may acquire data such as the content key from other devices, generate the signature data based on the acquired content key, and distribute the signature data with the sub-content S.

(5) In the embodiments, the data distributed with the sub-content S, such as the digital signature, is generated by the distribution device. However, the data ma be generated by another device, transmitted to the distribution device via a wired or wireless network, and the distribution device may receive the data, and transmit the data to the recording/reproducing device.

(6) In the first to sixth embodiments, the main content M is recorded in the ROM area in plaintext. However, the main content M may be encrypted and recorded, or embedded in the recovery-type signature.

(7) In the embodiments, the public key KPC is recorded in the non-rewritable area. However, if the recording medium is an optical disc such as DVD, the recording area may be the lead-in area, the sector header, or the wobble-area.

(8) There may be a plurality of content distributors. In this case, each content distributor has a different key pair, and writes its own public key into the non-rewritable area. Also, the hybrid media may be shared by the content distributors in such a manner that the rewritable area is divided for each distributor, and each distributor writes its content into the divided rewritable area. The positional information that indicates the position of the recording area allocated to each distributor may be recorded in the rewritable area. This information may be transmitted to the content recording device or the content recording/reproducing device via the network.

(9) In the embodiments, the public key KPC or the encrypted key information BE is prerecorded in the non-rewritable area. However, the public key KPC or the encrypted key information BE may be previously transmitted from the distribution device to the recording/reproducing device.

(10) In the embodiments, the recording/reproducing device reads the acquisition application from the DVD or the BD to acquire the sub-content S. However, the sub-content S may be acquired based on the input from the user.

Also, the programs equivalent to the acquisition application may be prestored in the recording/reproducing device.

(11) In the fourth embodiment, the sub-content S corresponding to the genre of the main content M is distributed. However, the recording/reproducing device may prestore profile information that indicates the user's preference, and the server may distribute advertisements corresponding to the profile information, as the sub-content S.

(12) The acquisition application recorded on the DVD or the BD and distributed may be different for each country or region, and the acquisition application may acquire the sub-content appropriate for each country or region.

Also, the recording/reproducing device may prestore language attributes, and the acquisition application may acquire the sub-content corresponding to language attribute of the recording/reproducing device.

(13) The sub-content may be acquired every time the recording medium such as the DVD or the BD is mounted. Also, the recording/reproducing device may transmit, to the server, an inquiry as to whether the sub-content is updated, and the sub-content may be acquired only when the sub-content of the same distributor is updated.

(14) In the case where the main content is a movie or music and so on, the sub-content may be advertisements, a movie preview, subtitle data, audio data, and so on. In the case where the main content is programs such as game software, the sub content may be data for additional character. Note that in this description, the recording/reproducing device may be a game machine, and the reproduction may mean to execute game software.

(15) The sub-content distributed by the same distributor may be overwritten at each distribution, or may be accumulated separately.

For instance, it is possible that when the sub-content is an advertisement such as a movie preview, the sub-content is to be overwritten and the latest sub-content is to be reproduced, and when the sub-content is the subtitle data, extras, and so on, the sub-content is to be accumulated in the RAM area, HDD or the memory card, and to be reproduced when selected.

(16) In the second and third embodiments, the verification data VD is stored by each of the server and the recording/reproducing device. However, the VD may be recorded in a recording medium such as in the ROM area of the DVD, or the BD. In this case, the server and the recording/reproducing device need not to hold the VD, and it is read out from the recording medium at the time of use.

(17) In the first to fifth embodiments, the sub-content is encrypted just before it is distributed to the recording/reproducing device 300. However, the server 100 may prestore an already-encrypted sub-content, and transmit the read-out sub-content as it is.

(18) In the fourth and fifth embodiments, the digital signature SCd is generated so as to correspond to the sub-content S. However, the digital signature SCd may be a signature that corresponds to data including the sub-content S with which additional information, such as the distributor ID and the content ID, is concatenated.

Also, the signature may correspond to the content key KC for encrypting the sub-content S, and may correspond to data including the content key KC with which the additional information is concatenated.

(19) In each embodiment, the digital signature or the recovery-type signature is verified at the time of reproducing the sub-content. However, the recording/reproducing device that receives the signature from the sever may perform the verification before the recording, and record the signature only in the case where the verification result is a success. Note that in the case where the sub-content is recorded by other recording device than the recording/reproducing device, the verification may also be performed before the recording, and the recording may be performed in the case where the verification result is a success.

(20) The present invention may be the above-described method. The present invention also may be computer programs that realize the above-described method with use of a computer, or digital signals including the computer programs.

Also, the present invention may be a computer-readable recording medium, such as a flexible disc, a hard disc, a CD-ROM, an MO, a DVD, a DVD-ROM, a DVD-RAM, a BD (Blu-ray Disc), and a semiconductor memory, on which the above-described computer programs or digital signals are recorded. Also, the present invention may be the computer programs or the digital signals recorded on such a recording medium.

The present invention may be for transmitting the above-described computer programs or digital signals via a network, such as an electric communication network, a wireless or wired communication network and the Internet.

The present invention may be a computer system including a micro processor and a memory. The memory may store the above-described computer programs, and the micro processor operates according to the computer programs.

The above-described computer programs or digital signals may be recorded on the recording medium and transferred, or transferred via the network or the like, and may be executed by other independent computer system.

(21) Any of the above-described embodiments and the above-described modifications may be combined together.

14. Summary

As described above, the present invention is a content recording/reproducing system that includes a distribution device, a first recording medium, a second recording medium, a recording device and a reproducing device, and records and reproduces a sub-content relating to a main content, the distribution device comprising: a verification information generation unit operable to, based on a secret key, apply a digital signature to relative information relating to the sub-content, and thereby generate verification information including the sub-content; and an output unit operable to output the verification information, the first recording medium comprising a non-rewritable area where the main content and key data that is used for acquiring a public key corresponding to the secret key are prestored, the second recording medium comprising a rewritable area, the recording device comprising: a receiving unit operable to receive the verification information; and a recording unit operable to record the verification information on the second recording medium, and the reproducing device comprising: an acquiring unit operable to acquire the key data from the first recording medium and acquire the verification information from the second recording medium; and a reproducing unit operable to acquire the public key based on the key data, verify the verification information with use of the public key, and reproduce the sub-content if the verification succeeds.

The present invention also is a distribution device that distributes a sub-content relating to a main content, the main content and key data that is used for acquiring a public key being prerecorded on a non-rewritable recording medium, and the distribution device comprising: a verification information generation unit operable to, based on a secret key corresponding to the public key, apply a digital signature to relative information relating to the sub-content and thereby generate verification information including the sub-content; and an output unit operable to output the verification information.

The present invention also is a reproducing device that reproduces a sub-content relating to a main content, comprising: a reading unit operable to read, from a first storage unit that is non-rewritable, key data based on which a public key corresponding to a secret key is to be acquired, and read, based on the secret key, verification information including the sub-content and being generated by applying a digital signature to relative information relating to the sub-content, from a second storage unit that is rewritable; a verification unit operable to derive the public key from the key data and verify the verification information with use of the public key; and a reproducing unit operable to reproduce the sub-content if the verification succeeds.

The present invention also is a recording device that records a sub-content relating to a main content, comprising: a receiving unit operable to receive verification information that includes the sub-content and is generated by applying a digital signature to relative information relating to the sub-content based on a secret key; and a recording unit operable to record the verification information in a second storage unit that is rewritable and different from a first storage unit that is non-rewritable and prestores key data based on which a public key corresponding to the secret key is acquirable.

With the stated structure, if the verification information is not generated with use of the secret key of the content distributor, the verification fails and the sub-content is not to be reproduced, because the reproducing device verifies the verification information with use of the distributor's public key that is acquired from the key data prestored in the first storage unit. This prevents an unauthorized and unexpected sub-content from being reproduced.

Here, the verification information generation unit may generate recovery-type signature data corresponding to the relative information, and the output unit may output the verification information that includes the recovery-type signature data.

The reading unit may read recovery-type signature data as the verification information, which is generated by applying a recovery-type digital signature to the relative information, the verification unit may generate recovered relative information by recovering the recovery-type signature data, and verifies whether the generated recovered relative information is correctly recovered, and the reproducing unit may reproduce the sub-content if the recovered relative information is correctly recovered.

The stated structure can prevent the unauthorized sub-content from being reproduced, because the sub-content is reproduced only when the recovery-type signature data is correctly recovered and therefore the unauthorized sub-content can not be recovered with use of the public key derived from the key data stored in the first storage unit.

Here, the relative information may include the sub-content.

The verification information generation unit may acquire signature verification data that is the same as signature verification data stored in a terminal device that uses the sub-content, and generate the recovery-type signature data corresponding to the relative information that includes the signature verification data and the sub-content.

The reading unit may read the recovery-type signature data generated based on the relative information including the sub-content, the verification unit may verify whether the recovered relative information, which includes the sub-content and is generated by recovering the recovery-type signature data, is correctly recovered, and the reproducing unit may reproduce the sub-content acquired by the recovery if the recovered relative information is correctly recovered.

The verification unit may acquire signature verification data that is the same as signature verification data stored in a server that outputs the verification information, and judges whether the recovered relative information includes the signature verification data, and the reproducing unit may reproduce the sub-content if the verification unit judges in the affirmative.

The stated structure can prevent unauthorized sub-content from being reproduced, because the sub-content is included in the relative information to which the signature is to be applied and the sub-content can not be taken out if the recovery-type signature data is not correctly recovered. Also, the stated structure prevents the sub-content from being reproduced by an unauthorized reproducing device, because the unauthorized reproducing device can not recover the recovery-type signature data.

Further, whether the recovery-type signature is correctly recovered can be readily judged, because the recovery-type signature data is generated for the relative information including the signature verification data.

Here, key data, from which a public key is derivable based on a device key stored in an authorized terminal device that uses the sub-content, may be recorded on the recording medium, the verification information generation unit may include: an encryption sub-unit operable to encrypt the sub-content based on a content key and thereby generate an encrypted sub-content; and a signature generation sub-unit operable to generate the recovery-type signature data from the relative information that includes the content key, and the output unit may further output the encrypted sub-content.

The signature generation sub-unit may acquire signature verification data that is the same as signature verification data stored in a terminal device that uses the sub-content, and generate the recovery-type signature data from the relative information that includes the signature verification data and the content key.

The reading unit may read an encrypted sub-content that is generated by encrypting the sub-content based on a content key, and the recovery-type signature data that is generated based on the relative information including the content key, the verification unit may include: a verification sub-unit that verifies whether the recovered relative information including the content key, which is generated by recovering the recovery-type signature data, is correctly recovered; and a decryption sub-unit that decrypts, if the recovered relative information is correctly recovered, the encrypted sub-content based on the content key to generate the sub-content, and the reproducing unit may reproduce the generated sub-content.

The verification sub-unit may acquire signature verification data that is the same as signature verification data stored in a server that outputs the verification information, and judges whether the recovered relative information includes the signature verification data, and the decryption sub-unit may decrypts the encrypted sub-content if the verification sub-units judges in the affirmative.

The stated structure can prevent the unauthorized sub-content from being reproduced, because the recovery-type signature data is generated for the relative information including the signature verification data. The content key can not be acquired if the recovery-type signature data is not correctly recovered, and the encrypted sub-content can not be decrypted if the content key is not acquired. Therefore, even if the unauthorized sub-content is recorded, the content key can not be correctly decrypted and the unauthorized sub-content can not be reproduced.

Further, whether the recovery-type signature is correctly recovered can be readily judged, because the recovery-type signature data is generated for the relative information including the signature verification data.

Here, the key data that is derivable based on a device key stored in an authorized reproducing device may be recorded in the first storage unit, the verification unit may store a device key, and derive the public key from the key data with use of the device key stored in the verification unit, and the verification unit may verify the verification information with use of the public key.

With the stated structure, a reproducing device not storing the authorized device key can not reproduce the sub-content, because the reproducing device derives the public key from the key data with use of the device key that the reproducing device stores, and verifies the verification information with use of the derived key.

Here, the verification information generation unit may generate appendix-type signature data from the relative information, and generate the verification information including the appendix-type signature data and the relative information.

The reading unit may read the verification information that includes appendix-type signature data and the relative information, and the verification unit may verify the appendix-type signature data based on the relative information.

With the stated structure, even if the unauthorized sub-content is recorded in the second storage unit, the verification fails and the unauthorized sub-content is not to be reproduced, because the verification information including the appendix-type signature data and the relative information is verified and the sub-content is reproduced only when the verification succeeds. This prevents unauthorized content from being reproduced.

Here, the verification information generation unit may include: an encryption sub-unit operable to encrypt the sub-content based on a content key and thereby generate an encrypted sub-content; and a signature generation sub-unit operable to generate the appendix-type signature data from the relative information that includes the content key.

The relative information may include a content key, the reading unit may read the verification information including an encrypted sub-content that is encrypted based on the content-key, the reproducing device may further include a decryption unit operable to decrypt the encrypted sub-content with use of the content key to generate the sub-content, and the reproducing unit may reproduce the generated sub-content.

With the stated structure, an unauthorized distribution device can not generate the appendix-type signature data, because it does not store the authorized secret key. An authorized reproducing device verifies the verification information and reproduces the sub-content if the verification succeeds. Therefore, even if verification information generated by an unauthorized distributing device is stored in the second storage unit, the verification fails and the sub-content can not be reproduced. This prevents the unauthorized sub-content to be reproduced.

Here, the relative information may include the content key, and key information from which a content key is derivable based on a device key stored in an authorized terminal device that uses the sub-content, and the verification information may include the key information.

If the content key is invalidated, the encryption sub-unit may encrypt the sub-content based on another content key that is not invalidated, and the verification information may include a piece of key information from which said another content key is derivable.

The relative information may include the content key and key information from which the content key is derivable with use of a device key that is stored in an authorized reproducing device that uses the sub-content, the verification information may include the key information, and the verification unit may store a device key that is allocated to the reproducing device, derives the content key by decrypting the key information with use of the device key stored in the verification unit, and verifies the appendix-type signature data based on the content key and the key information.

The stated structure allows only a reproducing device storing the authorized device key to derive the content key from the key information. Therefore, an unauthorized reproducing device can not derive the content key with use of a device key stored in itself, and can not decrypt the encrypted sub-content. This can prevent an unauthorized reproducing device from reproducing an authorized sub-content, and protect copyrighted works.

Further, the key information is distributed with the sub-content and stored in the second storage unit. The distribution device encrypts the sub-content with use of the content key that is latest at the time of transmitting the verification information, and transmits the content key as the key information. Therefore, in the case where the reproducing device that is recognized as a valid device by the distributing device is invalidated, the stated structure can more strictly prevent the reproduction of the sub-content by an unauthorized reproducing device by validating the device key stored in the reproducing device.

Here, the relative information may include the sub-content.

The stated structure can prevents the unauthorized sub-content from being reproduced, because the sub-content is included in the relative information to which the signature is applied, and the verification fails even if the unauthorized sub-content is recorded.

Here, key information, from which the content key is derivable based on a device key stored in an authorized terminal device that uses the sub-content, may be recorded on the recording medium, and the verification information generation unit may include: an encryption sub-unit operable to encrypt object information including the sub-content based on the content key and thereby generate encrypted object information; and a verification information generation sub-unit operable to generate the verification information including the encrypted object information.

The object information may include the appendix-type signature data.

Key information, from which the content key is derivable based on a device key stored in an authorized reproducing device, may be recorded in the first storage unit, and the reading unit may read the key information and the verification information including encrypted object information that is generated by encrypting object information including the sub-content based on the content key, and the verification unit may include: a storing sub-unit operable to store a device key that is allocated to the reproducing device; a decryption sub-unit operable to derive the content key from the key information based on the device key, and decrypt, based on the content key, the encrypted object information to generate the object information including the sub-content; and a verification sub-unit operable to verify the appendix-type signature data.

The object information may include the appendix-type signature data, the decryption sub-unit may decrypt the encrypted object information to generate the object information including the appendix-type signature data, and the verification sub-unit may verify the appendix-type signature data included in the object information.

With the stated structure, the key information from which the content key is derivable with use of the authorized device key is prestored in the first storage unit. Therefore, only a reproducing device storing the authorized device key can derive the content key and reproduce the sub-content, and an unauthorized reproducing device can not derive the content key with use of a device key stored in the unauthorized reproducing device itself, and can not decrypt the encrypted sub-content and reproduced the sub-content. Therefore, the stated structure can prevent an unauthorized reproducing device from reproducing an authorized sub-content.

Here, the verification information generation unit may generate appendix-type signature data from the relative information relating to the main content, the distribution device may further include an encryption unit operable to, based on an exclusive content key corresponding to the main content, encrypt the object information including the sub-content relating to the main content and thereby generate encrypted object information, and the output unit may output the encrypted object information.

With the stated structure, the sub-content is decrypted based on the content key corresponding to the main contents M. Therefore, the reproducing device can not decrypt the sub-content without receiving the key data from the first the first storage unit.

Here, the distribution device may further include: a management unit operable to manage a content key that is not invalidated, by giving a version number to the content key; and an encryption unit operable to, based on the content key that is not invalidated, encrypt object information including the sub-content, and generate encrypted object information, and the verification information generation unit generates the verification information that includes the encrypted object information and the version number.

With the stated structure, in such a case where the content key is exposed, the distributing device can invalidate the content key, and generate another content key to be used for encrypting the sub-content, which means that the distributing device can update the content key. In other words, even if the content key is exposed, and the sub-content is reproduced by an unauthorized device, the sub-content distributed after the content key is updated is encrypted with use of another content key that is different from the exposed content key, and the sub-content can not be decrypted with the original content key. Therefore, the stated structure can prevent the unauthorized reproduction.

Here, the reading unit may read, from the second storage unit, the verification information that includes a version number of the first content key and encrypted object information generated by encrypting, based on a first content key, object information including the sub-content, and the reproducing device may further include: a third storage unit that stores version numbers of content keys and pieces of key information from which the content keys are derivable, the version numbers and the pieces of the key information being associated with each other on a one-to-one basis; and a decryption unit operable to acquire, from the third storage unit, a piece of the key information associated with a version number that is the same as the version number included in the verification information read by the reading unit, derive a second content key from the acquired key information, and decrypt the encrypted object information with use of the second content key to generate the object information.

The reading unit may read, from the first storage unit, a piece of the key information from which the first content key is derivable, and the version number of the first content key, and record the read piece of the key information and the version number in the third storage unit by associating the piece of the key information and the version number with each other.

With the stated structure, the reproducing device derives the content key by acquiring, from the third storage unit, the key information having the same version number as the verification information read from the second storage unit. Therefore the reproducing device can select the appropriate key information.

Here, if the content key is invalidated, the management unit may determine to use another content key that is not invalidated, and generate another key information based on which only an authorized terminal device that uses the sub-content can acquire said another content key, and the output unit may output said another key information and a version number that is given to said another content key.

With the stated structure, the distribution device can distribute proper key information to the authorized reproducing device in the case where the content key is updated.

Here, the reproducing device may further include: a receiving unit operable to receive the verification information; and a writing unit operable to write the verification information into the second storage unit.

With the stated structure, no additional device is required for acquiring the sub-content, because the reproducing device acquires the sub-content and records it to the second storage unit. Therefore, the user can easily acquire and use the sub-content.

Here, the second storage unit may be a hard disk installed in the reproducing device.

With the stated structure, the verification information is recorded on the HDD installed in the reproducing device. Therefore, the medium should not be the hybrid medium including the first storage unit and the second storage unit. Further, the verification is performed with use of the key data stored in the first storage unit, and therefore the sub-content can not be reproduced without the first storage unit that stores the main content. This means that the stated structure can prevent the sub-content being acquired and reproduced in an unauthorized way.

Here, the writing unit may write the verification information into the second storage unit if the verification succeeds.

The recording device may further include: a reading unit operable to read the key data from the first storage unit; and a verification unit operable to derive the public key from the key data, and verify the verification information with use of the derived public key, and the recording unit may record the verification information if the verification succeeds.

With the stated structure, the verification data is recorded when the verification succeeds. Therefore, the stated structure can prevent unauthorized reproduction of the sub-content and unauthorized recording of the sub-content on a recording medium.

Here, the second storage unit may be a portable recording medium that is removable from the reproducing device.

With the stated structure, the verification information is to be recorded on the portable recording medium. This allows a device that is not the reproducing device used for the recording to reproduce the sub-content.

Here, the first storage unit and the second storage unit may be implemented on a same recording medium.

With the stated structure, a hybrid medium including the first storage unit and the second storage unit are used for the recording. Therefore, it is possible to take more advantage of the hybrid medium by storing the verification information in the second storage unit. Also, the stated structure can prevent the unauthorized and unexpected sub-content from being recorded on the hybrid medium, because the verification information is verified with use of the key data stored in first storage unit.

INDUSTRIAL APPLICABILITY

The present invention is managerially, repeatedly and continuously usable in industries which provide content that is digitized from movies and music, and software such as computer programs. The software recording device, the information processing device, the server device, and the memory card of the present invention can be produced and distributed in manufacturing industries of electric appliances and so on.

The invention claimed is:

1. A content recording/reproducing system that includes a distribution device, a first recording medium, a second recording medium, a recording device that records a sub-content relating to a main content and a reproducing device, that reproduces the sub-content relating to the main content,
the distribution device comprising:
a verification information generation unit operable to, based on a secret key, apply a digital signature to relative information relating to the sub-content, and generate verification information including the sub-content; and
an output unit operable to output to the recording device the verification information,
the first recording medium comprising a non-rewritable area where the main content and key data that is used for acquiring a public key corresponding to the secret key are prestored, an authorized reproducing device being able to acquire the public key using the key data,
the second recording medium comprising a rewritable area,
the recording device comprising:
a receiving unit operable to receive from the distribution device the verification information; and
a recording unit operable to record the verification information on the second recording medium when the second recording medium is installed to the recording device, and
the reproducing device comprising:
an acquiring unit operable to (i) acquire the key data from the first recording medium when the first recording medium is installed to the reproducing device and (ii) acquire the verification information including the sub-content from the second recording medium when the second recording medium on which the verification information is recorded is installed to the reproducing device; and
a reproducing unit operable to acquire the public key corresponding to the secret key based on the key data, verify the verification information with the public key, and reproduce the sub-content included in the verification information in conjunction with reproduction of the main content when the verification information is verified.

2. A distribution device that distributes to a recording device a sub-content relating to a main content, the main content and key data that is used for acquiring a public key being prerecorded on a non-rewritable recording medium, the distribution device comprising:
a verification information generation unit operable to, based on a secret key corresponding to the public key, apply a digital signature to relative information relating to the sub-content and generate verification information including the sub-content; and
an output unit operable to output to the recording device the verification information, whereby the recording device receives from the distribution device the verification information, records the verification information on a rewritable recording medium, a reproducing device acquires the key data from the first recording medium, acquires the verification information including the sub-content from the second recording medium, acquires the public key corresponding to the secret key based on the key data, verifies the verification information with the public key, and reproduces the sub-content included in the verification information when the verification information is verified.

3. The distribution device of claim 2, wherein
the verification information generation unit generates recovery-type signature data corresponding to the relative information, and
the output unit outputs the verification information that includes the recovery-type signature data.

4. The distribution device of claim 3, wherein the relative information includes the sub-content.

5. The distribution device of claim 4, wherein
the verification information generation unit acquires signature verification data that is the same as signature verification data stored in a terminal device that uses the sub-content, and generates the recovery-type signature data corresponding to the relative information that includes the signature verification data and the sub-content.

6. The distribution device of claim 3, wherein
key data, from which a public key is derivable based on a device key stored in an authorized terminal device that uses the sub-content, is recorded on the recording medium,
the verification information generation unit includes:
an encryption sub-unit operable to encrypt the sub-content based on a content key and thereby generate an encrypted sub-content; and
a signature generation sub-unit operable to generate the recovery-type signature data corresponding to the relative information that includes the content key, and the output unit further outputs the encrypted sub-content.

7. The distribution device of claim 6, wherein
the signature generation sub-unit acquires signature verification data that is the same as signature verification data stored in a terminal device that uses the sub-content, and generate the recovery-type signature data corresponding to the relative information that includes the signature verification data and the content key.

8. The distribution device of claim 2, wherein the verification information generation unit generates appendix-type signature data corresponding to the relative information, and generates the verification information including the appendix-type signature data and the relative information.

9. The distribution device of claim 8, wherein the verification information generation unit includes:
an encryption sub-unit operable to encrypt the sub-content based on a content key and thereby generate an encrypted sub-content; and
a signature generation sub-unit operable to generate the appendix-type signature data corresponding to the relative information that includes the content key.

10. The distribution device of claim 9, wherein the relative information includes the content key, and key information from which a content key is derivable based on a device key stored in an authorized terminal device that uses the sub-content, and
the verification information includes the key information.

11. The distribution device of claim 10, wherein if the content key is invalidated, the encryption sub-unit encrypts the sub-content based on another content key that is not invalidated, and
the verification information includes a piece of key information from which the another content key is derivable.

12. The distribution device of claim 8, wherein the relative information includes the sub-content.

13. The distribution device of claim 12, wherein key information, from which the content key is derivable based on a device key stored in an authorized terminal device that uses the sub-content, is recorded on the recording medium, and
the verification information generation unit includes:
an encryption sub-unit operable to encrypt object information including the sub-content based on the content key and thereby generate encrypted object information; and
a verification information generation sub-unit operable to generate the verification information including the encrypted object information.

14. The distribution device of claim 13, wherein the object information includes the appendix-type signature data.

15. The distribution device of claim 2, wherein the verification information generation unit generates appendix-type signature data corresponding to the relative information relating to the main content,
the distribution device further includes an encryption unit operable to, based on an exclusive content key corresponding to the main content, encrypt the object information including the sub-content relating to the main content and thereby generate encrypted object information, and
the output unit outputs the encrypted object information.

16. The distribution device of claim 2, wherein the distribution device further includes:
a management unit operable to manage a content key that is not invalidated, by giving a version number to the content key; and
an encryption unit operable to, based on the content key that is not invalidated, encrypt object information including the sub-content, and generate encrypted object information, and the verification information generation unit generates the verification information that includes the encrypted object information and the version number.

17. The distribution device of claim 16, wherein if the content key is invalidated, the management unit determines whether to use another content key that is not invalidated, and generates another key information based on which authorized terminal device that uses the sub-content is able to acquire the another content key, and
the output unit outputs the another key information and a version number that is given to the another content key.

18. A reproducing device used for a content recording/reproducing system, the system including a distribution device, a first storage unit, a second storage unit, and a recording device, the distribution device, based on a secret key, applying a digital signature to relative information relating to the sub-content, generating verification information including the sub-content and outputting to the recording device the verification information, the first storage unit comprising a non-rewritable area where the main content and key data that is used for acquiring a public key corresponding to the secret key are prestored, an authorized reproducing device being able to acquire the public key using the key data, the second storage unit comprising a rewritable area, the recording device receiving from the distribution device the verification information and recording the verification information on the second storage unit when the second storage unit is installed to the recording device, the reproducing device comprising:
a reading unit operable to (i) read, from a first storage unit, the key data when the first storage unit is installed to the reproducing device, and (ii) read the verification information including the sub-content from a second storage unit when the second storage unit on which the verification information is recorded is installed to the reproducing device;
a verification unit operable to derive the public key corresponding to the secret key from the key data and verify the verification information with the public key; and
a reproducing unit operable to reproduce the sub-content included in the verification information when the verification information is verified.

19. The reproducing device of claim 18, wherein the reading unit reads recovery-type signature data as the verification information, which is generated by applying a recovery-type digital signature to the relative information,
the verification unit generates recovered relative information by recovering the recovery-type signature data, and verifies whether the generated recovered relative information is correctly recovered, and
the reproducing unit reproduces the sub-content if the recovered relative information is correctly recovered.

20. The reproducing device of claim 19, wherein the reading unit reads the recovery-type signature data generated based on the relative information including the sub-content,
the verification unit verifies whether the recovered relative information, which includes the sub-content and is generated by recovering the recovery-type signature data, is correctly recovered, and
the reproducing unit reproduces the sub-content acquired by the recovery if the recovered relative information is correctly recovered.

21. The reproducing device of claim 20, wherein the verification unit acquires signature verification data that is the same as signature verification data stored in a server that outputs the verification information, and judges whether the recovered relative information includes the signature verification data, and the reproducing unit reproduces the sub-content if the verification unit judges in the affirmative.

22. The reproducing unit of claim 19, wherein the reading unit reads an encrypted sub-content that is generated by encrypting the sub-content based on a content key, and the recovery-type signature data that is generated based on the relative information including the content key, the verification unit includes:

a verification sub-unit that verifies whether the recovered relative information including the content key, which is generated by recovering the recovery-type signature data, is correctly recovered; and a decryption sub-unit that decrypts, if the recovered relative information is correctly recovered, the encrypted sub-content based on the content key to generate the sub-content, and the reproducing unit reproduces the generated sub-content.

23. The reproducing device of claim 22, wherein the verification sub-unit acquires signature verification data that is the same as signature verification data stored in a server that outputs the verification information, and judges whether the recovered relative information includes the signature verification data, and the decryption sub-unit decrypts the encrypted sub-content if the verification sub-units judges in the affirmative.

24. The reproducing device of claim 18, wherein the key data that is derivable based on a device key stored in an authorized reproducing device is recorded in the first storage unit, the verification unit stores a device key, and derives the public key from the key data with use of the device key stored in the verification unit, and the verification unit verifies the verification information with use of the public key.

25. The reproducing device of claim 18, wherein the reading unit reads the verification information that includes appendix-type signature data and the relative information, and the verification unit verifies the appendix-type signature data based on the relative information.

26. The reproducing device of claim 25, wherein the relative information includes a content key, the reading unit reads the verification information including an encrypted sub-content that is encrypted based on the content-key, the reproducing device further includes a decryption unit operable to decrypt the encrypted sub-content with use of the content key to generate the sub-content, and the reproducing unit reproduces the generated sub-content.

27. The reproducing device of claim 26, wherein the relative information includes the content key and key information from which the content key is derivable with use of a device key that is stored in an authorized reproducing device that uses the sub-content, the verification information includes the key information, and the verification unit stores a device key that is allocated to the reproducing device, derives the content key by decrypting the key information with use of the device key stored in the verification unit, and verifies the appendix-type signature data based on the content key and the key information.

28. The reproducing device of claim 25, wherein the relative information includes the sub-content.

29. The reproducing device of claim 28, wherein key information, from which the content key is derivable based on a device key stored in an authorized reproducing device, is recorded in the first storage unit, and the reading unit reads the key information and the verification information including encrypted object information that is generated by encrypting object information including the sub-content based on the content key, and the verification unit includes:

a storing sub-unit operable to store a device key that is allocated to the reproducing device;

a decryption sub-unit operable to derive the content key from the key information based on the device key, and decrypt, based on the content key, the encrypted object information to generate the object information including the sub-content; and a verification sub-unit operable to verify the appendix-type signature data.

30. The reproducing device of claim 29, wherein the object information includes the appendix-type signature data, the decryption sub-unit decrypts the encrypted object information to generate the object information including the appendix-type signature data, and the verification sub-unit verifies the appendix-type signature data included in the object information.

31. The reproducing device of claim 18, wherein the reproducing device further includes:

a receiving unit operable to receive the verification information; and a writing unit operable to write the verification information into the second storage unit.

32. The reproducing device of claim 31, wherein the second storage unit is a hard disk installed in the reproducing device.

33. The reproducing device of claim 31, wherein the writing unit writes the verification information into the second storage unit if the verification succeeds.

34. The reproducing device of claim 18, wherein the second storage unit is a portable recording medium that is removable from the reproducing device.

35. The reproducing device of claim 18, wherein the first storage unit and the second storage unit are implemented on a same recording medium.

36. The reproducing device of claim 18, wherein the reading unit reads, from the second storage unit, the verification information that includes a version number of the first content key and encrypted object information generated by encrypting, based on a first content key, object information including the sub-content, and the reproducing device further includes:

a third storage unit that stores version numbers of content keys and pieces of key information from which the content keys are derivable, the version numbers and the pieces of the key information being associated with each other on a one-to-one basis; and a decryption unit operable to acquire, from the third storage unit, a piece of the key information associated with a version number that is the same as the version number included in the verification information read by the reading unit, derive a second content key from the acquired key information, and decrypt the encrypted object information with use of the second content key to generate the object information.

37. The reproducing device of claim 36, wherein
the reading unit reads, from the first storage unit, a piece of the key information from which the first content key is derivable, and the version number of the first content key, and records the read piece of the key information and the version number in the third storage unit by associating the piece of the key information and the version number with each other.

38. A recording device used for a content recording/reproducing system, the system including a distribution device, a first recording medium, a second recording medium, and a reproducing device, the distribution device, based on a secret key, applying a digital signature to relative information relating to the sub-content, generating verification information including the sub-content, and outputting to the recording device the verification information, the first recording medium comprising a non-rewritable area where the main content and key data that is used for acquiring a public key corresponding to the secret key are prestored, an authorized reproducing device being able to acquire the public key using the key data, the second recording medium comprising a rewritable area, the recording device comprising:

a receiving unit operable to receive from the distribution device verification information that includes the sub-content; and a recording unit operable to record, when the second recording medium is installed to the recording device, the verification information in the second recording medium that is rewritable and different from the first recording medium that is non-rewritable and prestores the key data, the public key corresponding to the secret key is acquirable based on the key data, whereby the reproducing device (i) acquires the key data from the first recording medium when the first recording medium is installed to the reproducing device, (ii) acquires the verification information including the sub-content from the second recording medium when the second recording medium on which the verification information is recorded is installed to the reproducing device, (iii) acquires the public key corresponding to the secret key based on the key data, (iv) verifies the verification information with the public key, and (v) reproduces the sub-content included in the verification information when the verification information is verified.

39. The recording device of claim 38, wherein
the recording device further includes:
a reading unit operable to read the key data from the first storage unit; and
a verification unit operable to derive the public key from the key data, and verify the verification information with use of the derived public key, and
the recording unit records the verification information if the verification succeeds.

40. A method used for a reproducing device, the reproducing device being used for a content recording/reproducing system, the system including a distribution device, a first recording medium, a second recording medium, and a recording device, the distribution device, based on s secret key applying a digital signature to relative information relating to the sub-content, generating verification information including the sub-content, and outputting to the recording device the verification information, the first recording medium comprising a non-rewritable area where the main content and key data that is used for acquiring a public key corresponding to the secret key are prestored, an authorized reproducing device being able to acquire the public key using the key data, the second recording medium comprising a rewritable area, the recording device receiving from the distribution device the verification information, and the recording device recording the verification information on the second recording medium when the second recording medium is installed to the recording device, the method comprising:

reading, from the first recording medium, the key data based on which the public key corresponding to the secret key is acquirable, when the first recording medium is installed to the recording device;

reading, from the second recording medium, the verification information that includes the sub-content and is generated by applying the digital signature to the relative information relating to the sub-content based on the secret key, when the second recording medium on which the verification information is recorded is installed to the reproducing device;

acquiring the public key corresponding to the secret key from the key data and verifying the verification information with the derived public key; and reproducing the sub-content included in the verification information when the verification information is verified.

41. A program stored on a computer-readable recording medium for enabling a reproducing device, the reproducing device being used for a content recording/reproducing system, the system including a distribution device, a first recording medium, a second recording medium, and a recording device, the distribution device, based on a secret key applying a digital signature to relative information relating to the sub-content, generating verification information including the sub-content, and outputting to the recording device the verification information, the first recording medium comprising a non-rewritable area where the main content and key data that is used for acquiring a public key corresponding to the secret key are prestored, an authorized reproducing device being able to acquire the public key using the key data, the second recording medium comprising a rewritable area, the recording device receiving from the distribution device the verification information, and the recording device recording the verification information on the second recording medium when the second recording medium is installed to the recording device, the computer program comprising:

computer code for reading, from the first recording medium, the key data based on which the public key corresponding to the secret key is acquirable, when the first recording medium is installed to the recording device computer code for reading, from the second recording medium, the verification information that includes the sub-content and that is generated by applying the digital signature to the relative information relating to the sub-content based on the secret key, when the second recording medium on which the verification information is recorded is installed to the reproducing device;

computer code for acquiring the public key corresponding to the secret key from the key data and verifying the verification information with the derived public key; and computer code for reproducing the sub-content included in the verification information when the verification information is verified.

* * * * *